(12) United States Patent
Agrawal et al.

(10) Patent No.: US 10,760,334 B2
(45) Date of Patent: Sep. 1, 2020

(54) ELECTROCHROMIC DEVICE STRUCTURES

(71) Applicant: Polyceed Inc., Tuscon, AZ (US)

(72) Inventors: Anoop Agrawal, Tucson, AZ (US); Lori Adams, Tucson, AZ (US); John P. Cronin, Tucson, AZ (US); Maha Achour, Encinitas, CA (US)

(73) Assignee: Polyceed Inc., Tucson, AZ (US)

( * ) Notice: Subject to any disclaimer, the term of this patent is extended or adjusted under 35 U.S.C. 154(b) by 0 days.

(21) Appl. No.: 16/231,909

(22) Filed: Dec. 24, 2018

(65) Prior Publication Data

US 2019/0145161 A1 May 16, 2019

Related U.S. Application Data

(63) Continuation-in-part of application No. PCT/US2017/040876, filed on Jul. 6, 2017, which is a continuation-in-part of application No. PCT/US2017/068813, filed on Dec. 28, 2017.

(60) Provisional application No. 62/441,888, filed on Jan. 3, 2017, provisional application No. 62/425,567, filed on Nov. 22, 2016, provisional application No. 62/449,560, filed on Jan. 23, 2017, provisional application No. 62/501,607, filed on May 4, 2017, provisional application No. 62/501,659, filed on May 4, 2017, provisional application No. 62/405,837, filed on Oct. 7, 2016, provisional application No. 62/372,810, filed on Aug. 10, 2016, provisional application No. 62/358,935, filed on Jul. 6, 2016.

(51) Int. Cl.
*G02F 1/153* (2006.01)
*E06B 9/24* (2006.01)
*G02F 1/15* (2019.01)
*G02F 1/155* (2006.01)
*G02F 1/161* (2006.01)

(52) U.S. Cl.
CPC ............. *E06B 9/24* (2013.01); *G02F 1/15* (2013.01); *G02F 1/153* (2013.01); *G02F 1/155* (2013.01); *G02F 1/161* (2013.01); *E06B 2009/2464* (2013.01); *G02F 2001/1536* (2013.01)

(58) Field of Classification Search
USPC .......................................................... 359/275
See application file for complete search history.

(56) References Cited

U.S. PATENT DOCUMENTS

2010/0039690 A1* 2/2010 Agrawal .................. G02F 1/15
359/265

* cited by examiner

*Primary Examiner* — James C. Jones
(74) *Attorney, Agent, or Firm* — Rothwell, Figg, Ernst & Manbeck, P.C.

(57) ABSTRACT

An integrated window structure having opposing substrates that sandwich an electrochromic coating, a dye layer and an ion-isolating mechanism. In some embodiments, this is a selective ion-conductive layer and other embodiments incorporate nanostructures and polymers to tether the dye ions; these methods prevent dye ions from transporting into the electrochromic layer during redox activity. Control and systems to integrate the electrochromic elements in windows is provided.

21 Claims, 17 Drawing Sheets

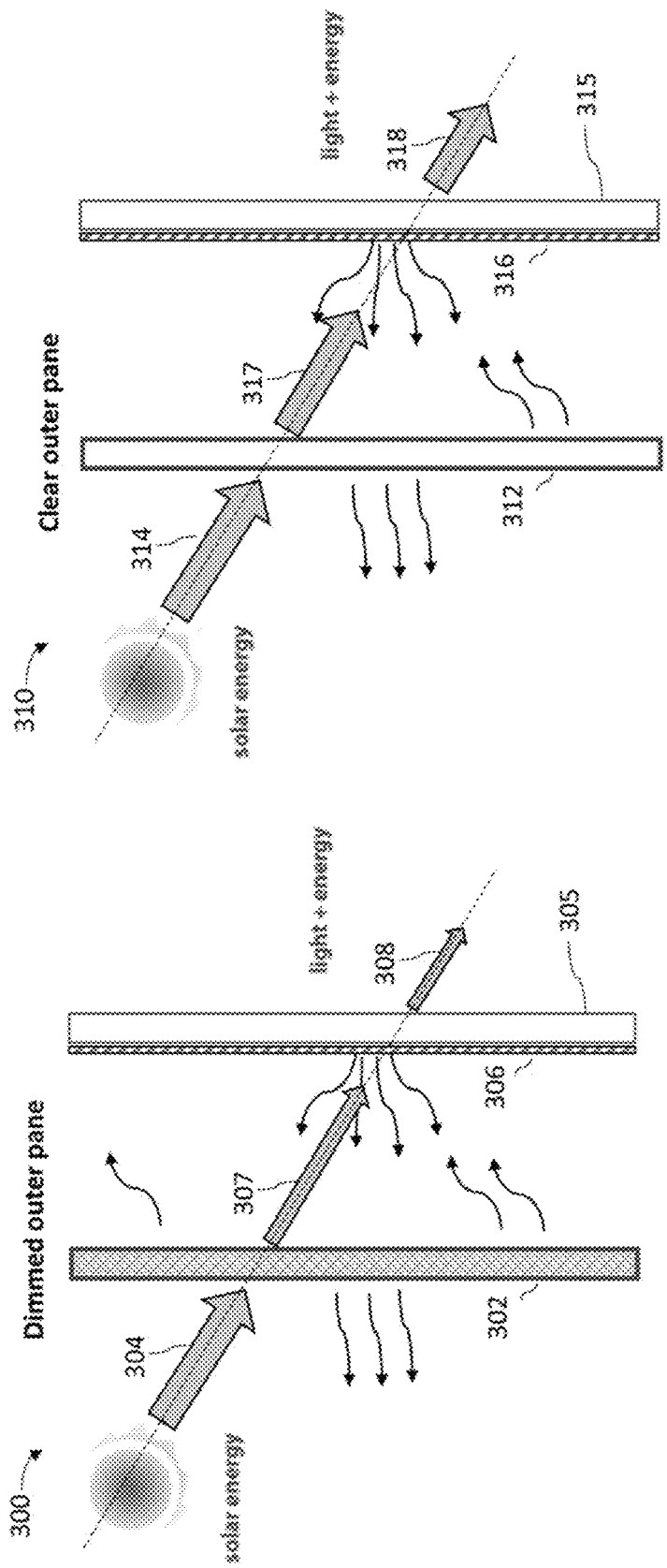

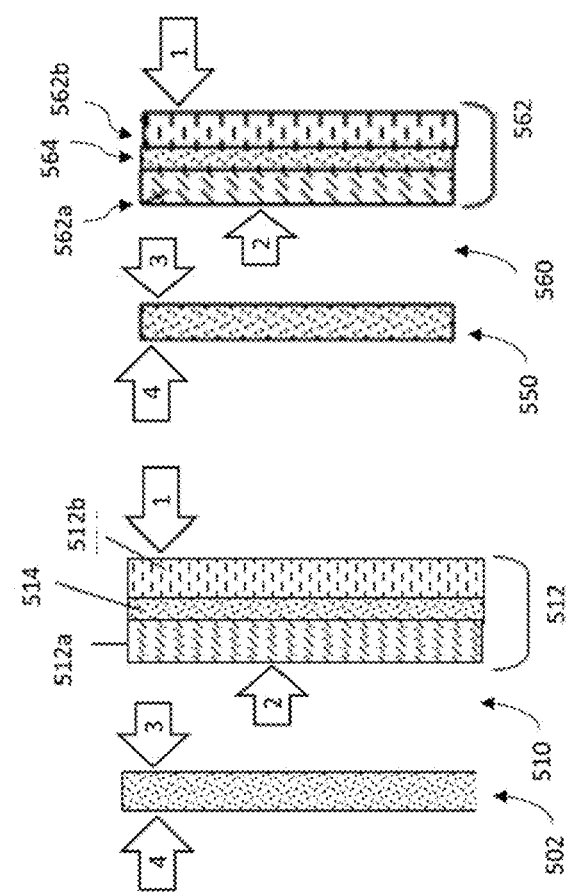
FIGURE 13
FIGURE 12
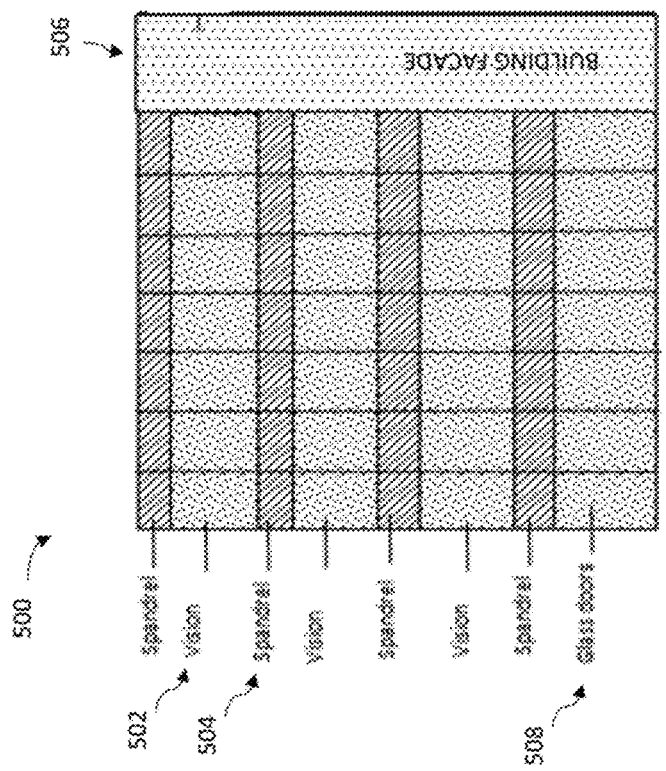
FIGURE 11

ELECTROCHROMIC DEVICE STRUCTURES

CROSS-REFERENCE TO RELATED APPLICATIONS

The present application is a continuation-in-part and claims priority to International Application Number PCT/US2017/40876, entitled METHODS AND STRUCTURES OF ELECITROCHROMIC DEVICES, filed on 6 Jul. 2017, and published as WO 2018/009645; which claims priority to U.S. Provisional Patent Application Ser. No. 62/501,607, entitled LOW-COST AND LOW-POWER CONSUMING ELECTROCHROMIC DEVICES, filed 4 May 2017; the International Application Serial Number PCT/US2017/40876 also claims priority to U.S. Provisional Patent Application Ser. No. 62/501,659, entitled SYSTEM AND NETWORK INTEGRATION OF SMART WINDOWS, filed 4 May 2017; the International Application Serial Number PCT/US2017/40876 also claims priority to U.S. Provisional Patent Application Ser. No. 62/449,560, entitled LOW-COST AND LOW-POWER CONSUMING ELECTROCFIROMIC DEVICES, filed 23 Jan. 2017; the International Application Serial Number PCT/US2017/40876 also claims priority to U.S. Provisional Patent Application Ser. No. 62/441,888, entitled LOW-COST AND LOW-POWER CONSUMING ELECTROCHROMIC DEVICES, filed 3 Jan. 2017; the International Application Serial Number PCT/US2017/40876 also claims priority to U.S. Provisional Patent Application Ser. No. 62/425,567, entitled LOW-COST AND LOW-POWER CONSUMING ELECTROCHROMIC DEVICES, filed 22 Nov. 2016; the International Application Serial Number PCT/US2017/40876 also claims priority to U.S. Provisional Patent Application Ser. No. 62/405,837, entitled SYSTEM AND NETWORK INTEGRATION OF SMART WINDOWS, filed 7 Oct. 2016; the International Application Serial Number PCT/US2017/40876 also claims priority to U.S. Provisional Patent Application Ser. No. 62/372,810, entitled LOW-COST AND LOW-POWER CONSUMING ELECTROCHROMIC DEVICES, filed 10 Aug. 2016; the International Application Serial Number PCT/US2017/40876 also claims priority to U.S. Provisional Patent Application Ser. No. 62/358,935, entitled LOW-COST AND LOW-POWER CONSUMING ELECTROCHROMIC DEVICES, filed 6 Jul. 2016.

The present application is also a continuation-in-part and claims priority to International Application Number PCT/US2017/68813, entitled ELECTROCHROMIC DEVICE STRUCTURES, filed on 28 Dec. 2017, and published as WO 2018/128906; which claims priority to the International Application Serial Number International PCT/US2017/40876 and to the U.S. Provisional Patent Applications Ser. Nos. 62/501,607, 62/501,659, 62/449,560, and 62/441,888.

Each of the patent applications listed above is hereby incorporated by reference in its entirety as if fully set forth herein, including Specification, Figures, Claims, and all other matter.

FIELD OF THE INVENTION

The present invention relates to electrochromic glass and devices, having ability to control the color and transparency of the glass, and specifically to electrochromic glass devices having inorganic and organic layers, incorporating dye and structures to improve performance.

BACKGROUND OF INVENTION

Electrochromic (EC) devices are based on the electrochromic characteristic of materials. When applied to glass, or other substrates. EC devices allow the color, opacity, and/or transparency of the substrate to change. Such EC devices are referred to as "smart glass" or "smart windows" as the characteristics of the glass, or other substrate, is changed by electronic switching. Used in buildings, these smart windows may provide shade, energy savings, privacy, partitions and so forth. The user may control the heat or light that passes through the glass using electronic switching, rather than shade, blinds or drapes. There is a great interest in the use of EC devices for energy saving; however, EC devices may be used for variable transmission windows, automotive mirrors for controlling reflectivity and displays.

Used in construction of buildings and in elements in transportation, these windows result in energy efficient building envelopes and transportation bodies (such as vehicles, trains, boats, etc.) by regulating the solar energy penetration through the windows. For building glaze applications, wide acceptance will make smart windows available at acceptable costs and enable smart windows to operate with low-power consumption. Low-power consumption allows EC products are able to avoid additional costs due to the installation of extensive wiring network throughout the building windows.

It is desirable to design such EC devices to be able to be produced at attractive costs and also reduce the power requirements, and thus the power consumption, using local power source(s) or generation device(s), such as a backup rechargeable battery circuitry along with the use of small solar cells mounted on the window frames, respectively. The present invention provides methods and apparatuses for design, fabrication, installation and power supply for EC structures and devices that achieve these goals. A brief description of conventional EC devices is provided in the section entitled "Conventional Construction Methods and Configurations" describing materials and compositions as background information to better understand the present invention.

BRIEF DESCRIPTION OF FIGURES

FIGS. 8 and 9 illustrate smart window IGUs in various configurations and their reactions to incident light according to embodiments of the present invention;

FIG. 11 illustrates a multistoried building with a glass exterior showing different regions, namely, façade, spandrel and vision areas:

FIGS. 12-13 illustrate an Integrated Glass Unit (IGU) configuration of an EC window and a building-integrated solar cell according to embodiments of the present invention;

DETAILED DESCRIPTION

An object of this invention is to provide durable electrochromic (EC) devices for glazing that lower cost by electing specific device construction. Such EC devices may be configured using a selection of certain substrates, coating materials, and electrolytes. There are also a variety of methods disclosed herein enabling reduced fabrication cost and reduced power consumption.

Another objective of the invention is to lower the fabrication cost of these EC devices by eliminating manufacturing steps, such as those requiring pre-reduction of coatings, and reducing the number of coatings and the coating thicknesses.

Yet another objective of the invention is to disclose electronic control and powering systems which lend to a low-cost installation of these EC windows.

A further objective is to provide integration of a photovoltaic unit(s) in an Integrated Glass Unit (IGU), wherein the IGU has an EC unit.

Still further objectives are to disclose powering schemes of EC panels with the capability to remotely detect when these EC panels require maintenance.

EC Panel Construction

For architectural use, EC devices or panels may be incorporated into windows as integrated glass units (IGUs) and used in building envelops. These building structures position two or three glazing panel structures approximately parallel to each other and separated by a space or gap, such as a gap of approximately 0.5 to 1.5 cm. These windows are referred to as "smart" windows, as the EC device enables window coloration either passively or actively. In a smart window application, one of these panels is a variable light transmitting panel, such as an EC panel, and another is a glass panel with optional coatings (such as a low-e coating). As discussed herein, some embodiments have two separate panels each with variable light transmission characteristics, but each having distinct and different attributes. For building interior partitions it is not necessary to use an IOU type construction.

The EC panel, or EC glass, of some embodiments of the inventions is formed by taking two transparent substrates, such as glass, and depositing a coating. For windows, the coatings on each substrate are electrically conductive and transparent; these materials are referred to as transparent conductors (TCs). There may be optional coatings deposited on these TCs, on one or both substrates. With the substrates positioned in a parallel configuration, and with the coatings facing each other, an electrolyte is sandwiched therebetween using a lamination process between the coated substrates. The perimeter is then sealed to encapsulate the layers. A coloration potential is applied between the conducting portions of the substrate coatings. Application of the coloration potential alters the color of the EC panel. i.e. of the aforementioned optional coatings and/or the electrolyte.

Figure 1:
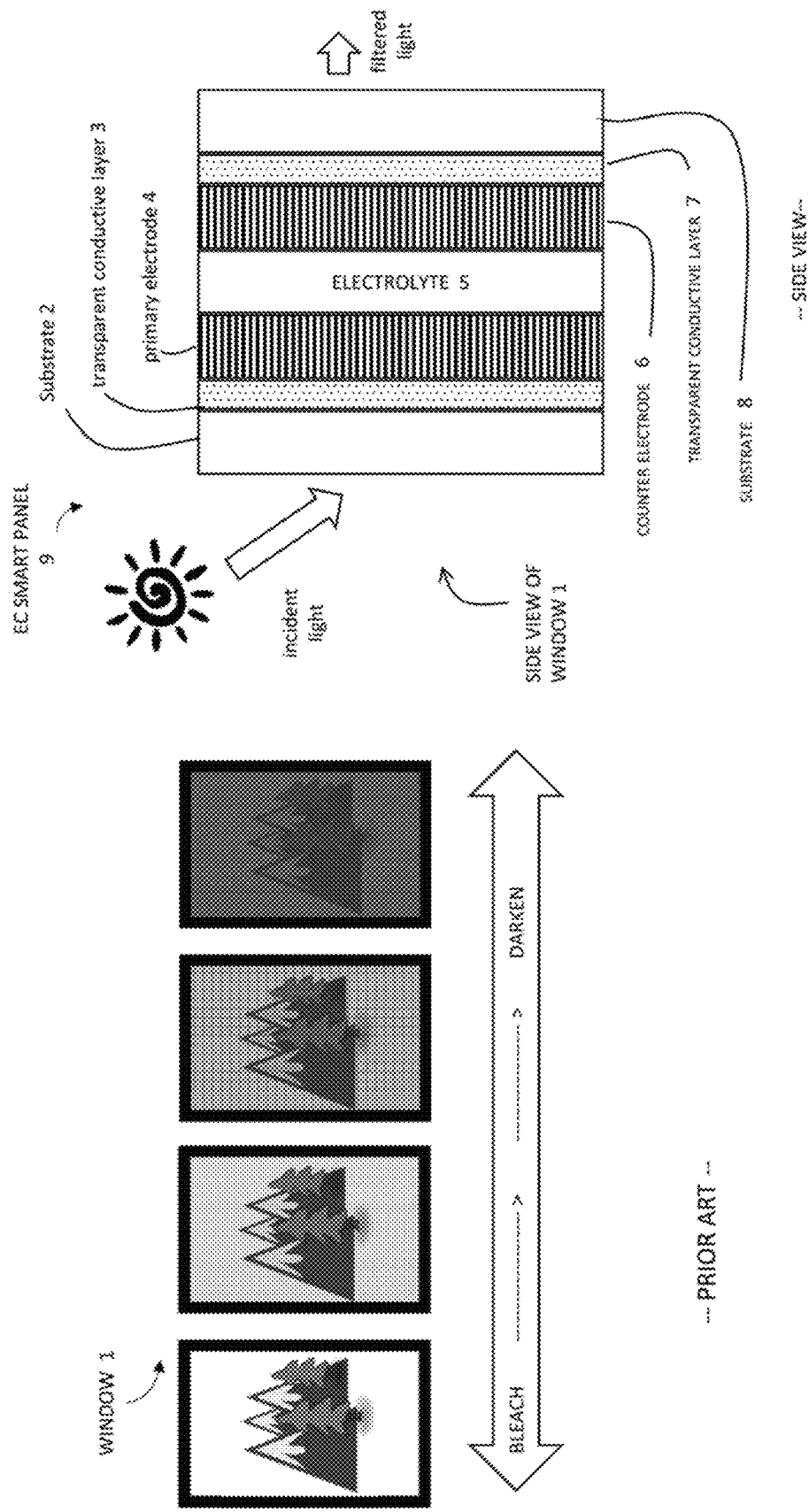
FIG. 1 illustrates an EC panel for use in a smart window integrated Glass Unit (IGU) to achieve color transitions, according to embodiments of the present invention, including a side-view of a smart EC panel.

FIG. 1 illustrates color transitions of a prior art smart window 1 having electrochromic glass; the smart glass transitions between bleached/transparent and colored/opaque/dark. A side-view of smart EC panel 9 is also illustrated in FIG. 1, having a multi-layer structure. A smart EC panel may have any number of layers. Please note that the prior art EC smart panel 9 is applicable to a building envelop as part of an IGU configuration for a complete window system 1. The primary electrode 4 is an EC coating (and the counterelectrode 6 may also have electrochromic properties) that enables electronic control of the coloration of the window system 1.

There are a variety of current solutions and configurations, and for clarity, the EC smart panel 9 of smart window 1 is illustrated in isolation. Other IGU components are not shown, such as configurations with additional transparent panels, incorporating an EC smart panel, which are separated by a small gap therebetween to form an IGU unit.

The side-view of EC smart panel 9 of smart window 1 is configured with two opposing substrates 2, 8, having layers therebetween. For a window application, the substrates 2, 8 are transparent. In the illustrated example, both substrates 2, 8 have a Transparent Conductive (TC) layer 3, 7, respectively. Other layers include layers 4, 6, which provide primary and counter electrodes, respectively. Between the electrodes 4, 6, is an ion-conducting material, which in this configuration is electrolyte 5. When electrodes 4, 6, are being reduced or oxidized, such as when the window is being colored or bleached, the potential difference causes lithium ions ($Li^+$) to move into the primary electrode 4, and out of counter electrode 6. In this example, a primary electrode 4 is formed by an electrochromic (EC) material; and a counter electrode 6 is also formed by an EC material, wherein the EC material of the counter electrode 6 has complementary redox properties to those of the primary electrode 4.

Complementary redox properties wherein the counter electrode is also electrochromic means that the counter electrode 6 will also color (as it oxidizes) under the applied coloration potential while the primary electrode 4 also colors (while it reduces).

Construction of an EC panel using conventional construction methods and configurations is described. The process involves various steps to build the illustrated EC device. The configuration of smart window 1 includes the counter electrode 6, wherein the primary EC electrode 4 is cathodic and operates to color the smart window 1 by reduction. In operation, the coloration of smart window 1 is produced by redox activity, where a voltage is applied between two electrically conducting layers electrodes 3 and 7. The voltage applied to conductive layer 3 results in the reduction of the material in electrode 4 by an injection of ions from the counter electrode layer 6 which travel via the electrolyte layer 5 and the electrons are provided through the electronic circuit and channeled via the TC layer 3. This causes the EC device 9 (or the window) to color or darken.

The reduction of the EC layer is simultaneously accompanied by of the counterelectrode layer 6. This oxidation occurs by removal of ions from counterelectrode layer 6 into the electrolyte layer 5 and transported to the other side of the structure with expulsion of electrons through the TC layer 7. The oxidation of material in counter electrode layer 6 may also cause this layer to color such that simultaneous coloration is seen from both the EC primary electrode layer 4 and the counter electrode 6. In some cases, the optical change in the counter electrode 6 is low, wherein most of the coloration is from the EC primary electrode layer 4. The former situation effecting coloration of both EC primary electrode layer 4 and counter electrode 6 is a more effective configuration, as the same amount of charge colors both layers (colors or bleaches) simultaneously, resulting in faster kinetics and deeper coloration. There are several optical configurations to achieve varying levels of darkening or coloration of smart window 1, each requiring a different maximum voltage and/or range of voltages. In some embodiments, the voltage application is continuously applied to maintain the desired optical state. Operation of such configurations consumes significant power to achieve window coloration control.

There are several differences in composition, structure, manufacture and performance of EC devices and their use in smart windows. These differences in performance are often due to selection of specific layers and the specific configuration used. The method of fabrication may incorporate custom processes and machines or may incorporate sensitive conditions for operation. These differences affect the electrochromic reaction, durability and the resultant behavior of the smart window. Several of these are described herein as conventional construction methods. This section is provided to facilitate understanding of the various methods, configurations, components, chemicals, processes and operations of smart devices and their use in IGUs. These constructions are typically used to fabricate electrochromic panels or devices; however, there are drawbacks to conventional methods. Many of these incorporate specific processing equipment and methods that incur additional cost. For example, some smart devices during fabrication incorporate reduction of at least one layer, such as the EC layer, the counter electrode, or an auxiliary electrode. This is an expensive process and is more readily subject to variation in results and performance of the smart device. During the reduction process a fixed number of ions are inserted which are expected to reversibly shuttle back and forth between the EC layer and the counter electrode layer during coloration and bleach of the finished device. Often, reduction processes during fabrication incorporate lengthy processing times for chemical reactions to treat the films and components and then cleaning any surface residues. Further, there may be a need to fabricate the device within an inert environment, else the results and yield are not consistent and stable. Such tight parameters may incorporate complex machinery and an esoteric fabrication set up, thus reducing the flexibility of design and increasing the difficulty of fabrication and cost. This is further complicated when different sizes and shapes of windows are specified for a project.

Once these devices are fabricated, a next step is to cycle the device a few times, or exercise, the devices between states, such as between a bleached state and a deeply colored state; this ensures that there will be ion movement during actual operation; this ensures that the inserted ions are not permanently bound within these layers where they were first inserted and thus available when the devices are powered during use. This incorporates additional steps, space, equipment, and so forth, and increases fabrication costs.

Further, some devices are to be cycled routinely during use, otherwise the ions are permanently bound or trapped within the layers of the EC device. This may occur, for example, while the devices are stored for long periods prior to installation or even if after the installation the building is not occupied, and the devices are left or maintained in a fixed state of coloration.

Additionally, conventional EC devices also offer a challenge in meeting UV, thermal and cycling durability. UV durability refers to being exposed to the UV radiation (in bleached or in colored states, or while transitioning from one state to the other) and still being able to cycle between various coloration states, for example from a colored state to a bleached state and back consistently and within acceptable kinetics. Thermal and the cycling durability also means that after the devices are subjected to elevated temperature (including thermal shock) and repeated cyclability that their characteristics of coloration and bleaching are still acceptable. Since the EC electrode and the counter electrode are made of different materials with inherently different aging characteristics (such as aging due to repeated cycling), temperature and light (such as in response to UV), it is difficult to maintain their pristine state with time, and/or to ensure that both layers will change at the same rate when aged, and/or that the fixed number of ions inserted during the manufacturing process are not lost due to any undesirable reactions. In practice, these problems occur, and the loss of ions causes faster failure, such as failure in terms of the device's ability to color to the same level and/or to bleach to the same level with aging. This is often overcome with expensive electronic designs so that the devices may be continuously monitored for their electrical characteristics so that the driving conditions (voltage, time, current, and so forth) may be continuously changed.

These shortcomings are overcome in the devices being taught in the current disclosure. Material selection for devices being taught in this invention is also a significant design step; the electrochemical or the ionic capacity of the electrode and the counter electrode does not have to be precisely coordinated with each other, and in this way, provides flexibility in design. There may be no pre-reduction of layers incorporated during fabrication and the device is not exercised, such as to transition from color to bleach several times, after manufacture or in some embodiments and applications, even during use, if the device is not operated for long periods of time. In addition, in certain innovative devices described here some of the layers where the redox activity takes place are incorporated into the electrolytic film so as not to incur the expense of a substrate coating and to further simplify manufacturing. For example, as discussed herein below, hydrophobic ionic liquids may be used in the electrolyte of an EC device. The desirable Ionic liquids for example, have a high electrochemical stability range and low ultraviolet (UV) susceptibility; and these are insensitive to moisture absorption and provide high inertness. These characteristics lead to more durable EC devices.

Embodiments of the Present Invention

EC Devices and Materials

The present invention provides methods and apparatuses of EC devices for use in glazing applications, such as architectural and transportation, where the EC devices reversibly cycle between various optical states. The optical states are the desired levels of darkened and bleached states of a window; in some applications, the native state is the clear or the bleached state.

Electromagnetic energy from the sun is broken into a variety of categories based on the wavelength of the energy, and includes ultraviolet (UV), visible light (VL), and near-infrared (NIR), energy. The present invention provides methods and apparatuses for providing control of privacy but also control of the building environments and conditions. UV and NIR energy are not visible to the human eye but influence the conditions which control the energy efficiency, comfort and protection of interiors from fading. The smart window may be specified as to how the window responds to various measures of these energies from the sun, and over what range of energy values the window has stable performance.

Much Solar UV energy is filtered or reflected by the earth's atmosphere and does not reach the earth. Some UV energy is rejected by conventional double-pane glass windows. Some UV energy may be blocked by films or coatings that reflect or absorb the energy. There are many benefits to block UV in both colored and bleached (more transparent state of the EC device), including the ability to reduce or prevent fading and deterioration of furniture, art work, wall paint, fabric and so forth. The measure of the UV transmission is the percentage of UV light or energy that will pass through a window, glass, IGU, or in this case, a smart window. Since the energy from the UV is less than about 5% of the UV+VL+NIR combined, it is usually sufficient for most buildings to block the UV energy permanently and to only dynamically vary the latter two to achieve the energy efficiency, glare reduction, privacy, etc.

VL is the portion of the sun's spectrum that human eyes see and includes natural daylight and rainbow colors. For privacy, the smart window is specified to reduce the amount of VL passing through the window. Reducing VL reduces glare and eye strain and impacts the energy performance. Control of VL enables a building or home to have natural light enhancing the environment and reducing the cost of lighting. A window in a darker or colored optical state will have lower VL transmission value.

Solar radiation from NIR energy is not visible to the human eye; however, we do feel the heat. When NIR energy hits a window surface, it may transmit through the window or be blocked. Windows transmitting more NIR will increase the temperature inside a building. Embodiments of the present invention enable control of the amount of NIR that passes into the building. This is referred to as the infrared transmission value and is particularly important to block in summer months and hot climates. Similarly, higher transmission is desired to capture that heat during winter months and in cold climates. The present invention thus improves the comfort of those inside the building while reducing carbon emissions and costs of air conditioning, cooling and heating. The ability of a smart window to control the entire solar energy transmission value is also measured by looking at the change in Solar Heat Gain Coefficient (SHGC) of the various optical states of the window.

The EC devices and smart windows of the present invention may also be kept in any of the colored states over time without application of continuous power, wherein this ability is referred to as having "memory" as the device holds its optical state with no, or in some cases, intermittent current consumption. EC devices with memory have on an average lower power consumption. The "memory length" is the time that an EC device will maintain its optical state without power. Memory length may be temperature dependent, for example, where the memory length decreases inversely with window temperature.

Characterization of the memory (or Memory length) of an EC device considers the starting transmission percentage, the change in transmission percentage over time (in open circuit conditions) and temperature of the window. Typically, a good measure to characterize optical transmission value is under photopic conditions which is well approximated by transmission at 550 nm.

Figure 3:
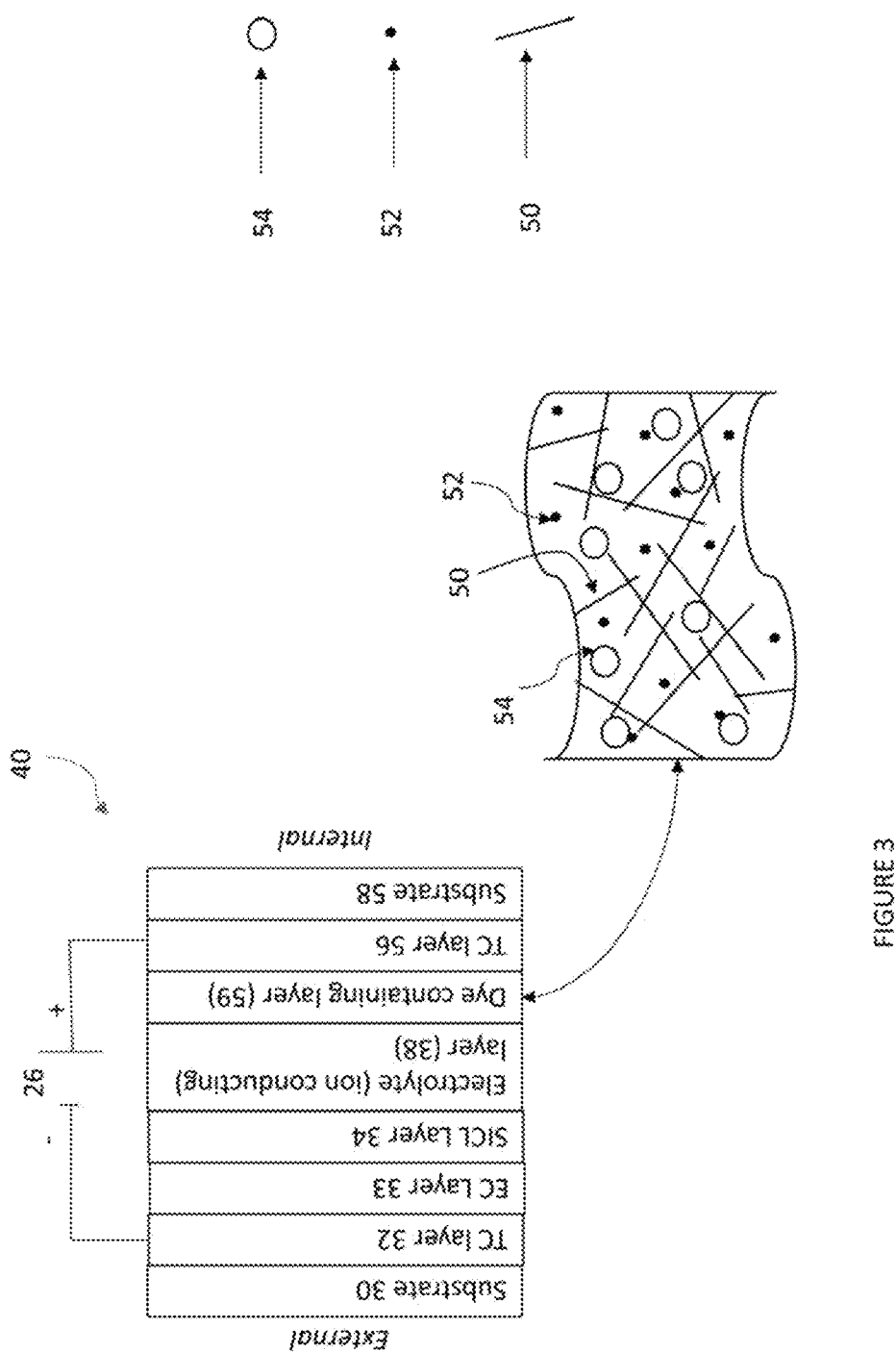

The memory length is the time during which the memory maintains relative transmission within 20% of the lowest transmission value that it is colored to rather than an absolute number. For example, when a coloring power is applied to an EC panel with a bleached transmission of 70% at 550 nm (e.g., panel 40 as illustrated in FIG. 3), the device would color (darken). When in the transmission at 550 nm reaches 10% the power is removed and the device is maintained in an open circuit mode at a certain EC panel temperature. The EC panel in open circuit will start to bleach and the Memory length would be the time it would take for this panel to change by 20% relative transmission. A change of 20% relative transmission change for a window colored to 10% transmission would mean a change in light transmission of 2% (10%×20/100=2%). Thus the time taken by the panel "$t_1$" to reach 12% light transmission would be its Memory length. The memory (or Memory length) of this device at that temperature is "$t_1$." The Memory length of the device will be 30 minutes at 25° C. when $t_1$=30 minutes and the temperature of the panel was 25° C. Thus, a device which is colored to 10% and then its power is removed, will continue to stay colored to 12% or lower at the stated temperature and time. Similarly, using a rule of relative 20% change a device colored to 5% upon removal of power will stay colored to 6% or less under similar temperature and temporal conditions. The number of 20% relative transmission change is selected, as this change is difficult to discern an EC panel by naked eye.

An alternative method to define and control the Memory or Memory length (rather than by a change in % transmission of the value it is colored to (e.g., at 550 nm) is to monitor a change in optical density (OD) at 550 nm. Since the change in optical density also generally correlates with a change in the open circuit device potential (or residual potential), one could calibrate an EC panel and measure the change in OD electronically by measuring this potential. i.e., without measuring the optical property of the cell. In some embodiments, the EC device has a controller that responds to the memory length, measured by a timer (tied to Memory length and temperature) or residual electrical potential of the cell or an optical input or a combination of any of these and will activate sufficient electronic charging to renew the electro-chemical reaction within the EC device and restore or maintain the specified optical transmission. In this way, the EC smart window maintains a coloration state without disruption. An increased Memory length leads to decreased power consumption. The materials used, and the configuration of the EC device determine the transmission range(s) and corresponding memory length.

The present invention provides embodiments of an EC device for use in glazing applications that allow smart windows to reversibly cycle between various optical states, also referred to as coloration or light transmission states such as darkening of a window and changes in transparency. These are applicable in architectural building, such as multistory and multi-use buildings, transportation, such as airplane windows and vehicle windows, manufacturing, such as production of light-sensitive or energy-sensitive products, and so forth. In some applications, it is desired that the default state of these devices is the clear or the bleached state (or the most transmitting state); however, the original or default state is determined by the type of device and the desired application. Default state means a device optical state where the potential difference between the two opposing electrodes is zero.

In some embodiments of the present invention, EC devices incorporate an inorganic EC layer and a redox dye containing layer on opposing electrodes, wherein the redox dye is isolated from the EC layer by an intervening electrolyte layer. During operation, the dye is reduced or oxidized, and the EC layer is oxidized or reduced, respectively. The dye in the reduced or the oxidized state is prevented from contacting the EC layer which imparts superior memory or higher "$t_1$". The redox dye may also have complimentary EC properties, wherein the dye colors or bleaches as the EC layer respectively colors or bleaches.

In another configuration, a multilayer film is formed comprising at least one dye-containing layer and an electrolyte layer. This multilayer film having an electrolytic layer and a dye containing layer film is sandwiched between a pair of coated substrates. The dye-containing layer also has ion-conducting (or electrolytic) properties. In a configuration, one of the substrates has a TC coating followed by an EC layer and the second substrate has a transparent conductor coating. The multilayer film is then assembled between these substrates with the dye containing layer touching the transparent conductor on the second substrate. There may be optional anti-iridescent coatings inserted between the TC and the substrate.

These and other embodiments of the present inventions isolate redox dye, or rather the reduced or oxidized dye molecules, from the EC layer such that they do not interact with this electrode. This isolation is implemented with a redox isolation mechanism, wherein the dye molecules are tethered within the layer they are present in so that oxidized (or reduced) dye ions are not free to migrate into other layers or contact the EC layers, and thereby maintain the coloration state or long Memory length and avoid the need to continuing to apply the electrical potential to maintain this coloration or desired optical state.

This redox isolation may also be maintained by incorporating an additional layer coating over the EC layer, for those cases where the dye ions are not chemically tethered in the dye layer and may move into the electrolytic layer. This overcoat will allow small ions such as lithium to pass through and reduce the EC layer, but block the larger dye ions to penetrate. This layer may also be electrically insulative so that the dye ions do not undergo redox activity at its surface, particularly when the underlying EC layer may acquire electronic conductivity properties when colored—which is often the case with EC layers containing tungsten oxide or certain polymeric EC layers. Since this layer blocks the larger dye ions and allow the transportation of small ions, this is called a selective ion conduction layer (SICL). Further, in these example embodiments, the small ions are generated in the dye layer only to the extent which may be accommodated in the opposing electrode (EC layer). For some embodiments, this obviates the process of matching capacities of the two electrodes during manufacturing. In a preferred embodiment the dye-containing layer is designed to have a higher capacity as compared to the opposing EC electrode coating, such as by a factor of 1.2 or more, and in another embodiment by a factor of about 2 or more and yet in another embodiment a factor of about 10 or more. This means that one of the electrochemically active layers, or layers where the redox activity takes place, has a higher capacity of reduction or oxidation sites as compared to the other layer. The ability to trigger the redox reactions, such as with an applied voltage, and to maintain isolation of the dye ions, results in a stable state of coloration without continuous voltage. In a system embodiment, an EC device configuration incorporates an inorganic EC layer and a dye containing layer. In a preferred embodiment, the capacity of the dye containing layer is higher as compared to the inorganic EC layer.

To reverse the coloration state, the redox ions return to their original respective states by either electrically shorting the two opposing electrodes (the leads connecting the two TC layers) and/or applying a potential with reversed polarity. In the latter, the reverse potential may be of the same magnitude or smaller.

In some embodiments incorporating dye as oxidizing coloration agents and an EC layer as inorganic cathodic electrode, the redox isolation mechanism may be a layer that keeps the oxidized dye ions isolated from the EC layer. Alternatively, the dye is tethered within the dye layer. The dye molecule may also be tethered to a larger entity or a molecule to reduce its mobility in the dye-containing layer so that the dye is able to only have restricted movement or undergo a conformational change within this layer without migrating into the adjacent electrolyte layer which does not have dye and conductive particles. The larger molecule may be another polymer such as a material with a molecular weight of 5 times the molecular weight of the dye or even larger. The system may even contain a material where several dye molecules are joined or attached to an oligomer to form a large molecular structure. The restricted movement as stipulated above will have certain advantages, i.e., the dye may be able to move and contact a conductive nanoparticle in its vicinity to get oxidized or reduced but not travel too far to be able to migrate into another adjacent layer(s).

The dye may be tethered in the dye layer by other means. The dye may be reacted or bound to the polymer which is used to make the matrix of this layer; or the dye is bound to a larger sized additive (as compared to the dye molecule) present in this layer which has no or low mobility. One type of an additive to the ion-conducting dye layer are electrically conductive particles (such as carbon nanotubes) which have larger in size than the dye molecules. In some embodiments, these additives have at least one dimension in the nano-sized range to keep light scattering low and allow good visibility (please note in some types of shapes such as circular tubes and fibers only two dimensions are needed to specify their size, such as their diameter and length). The isolation of the dye ions, or restriction from contacting an opposing electrode, maintains the coloration state without the continuous application of voltage to the device. In some embodiments, a redox isolation mechanism effectively prevents movement of oxidized ions from contacting reduced layers, to prevent reversion of ions to their original state.

Some embodiments of the present invention provide elegant solutions to reduce the complexity of prior art solutions and provide streamlined stable methods of fabrication. These include different configurations, as well as different methods for fabricating these devices. Further the present invention incorporates ways to further enhance the use of smart windows to capture energy, reduce build time, enable off-site build with minimal on-site modification of process, and couple the smart window technology with other energy saving techniques, including solar energy.

The present invention describes EC devices where an electrolyte is sandwiched between two conductive, largely parallel substrates. The substrates, which are generally non-conductive, are coated, or are pre-coated, with a transparent conductive material on the inward facing surfaces. For windows, both the substrates and the coatings are transparent (at least to the eye). There are many material combinations that may be used, such as the TC layers may be composed of indium tin oxide, fluorine doped tin oxide, and so forth.

Figure 2:
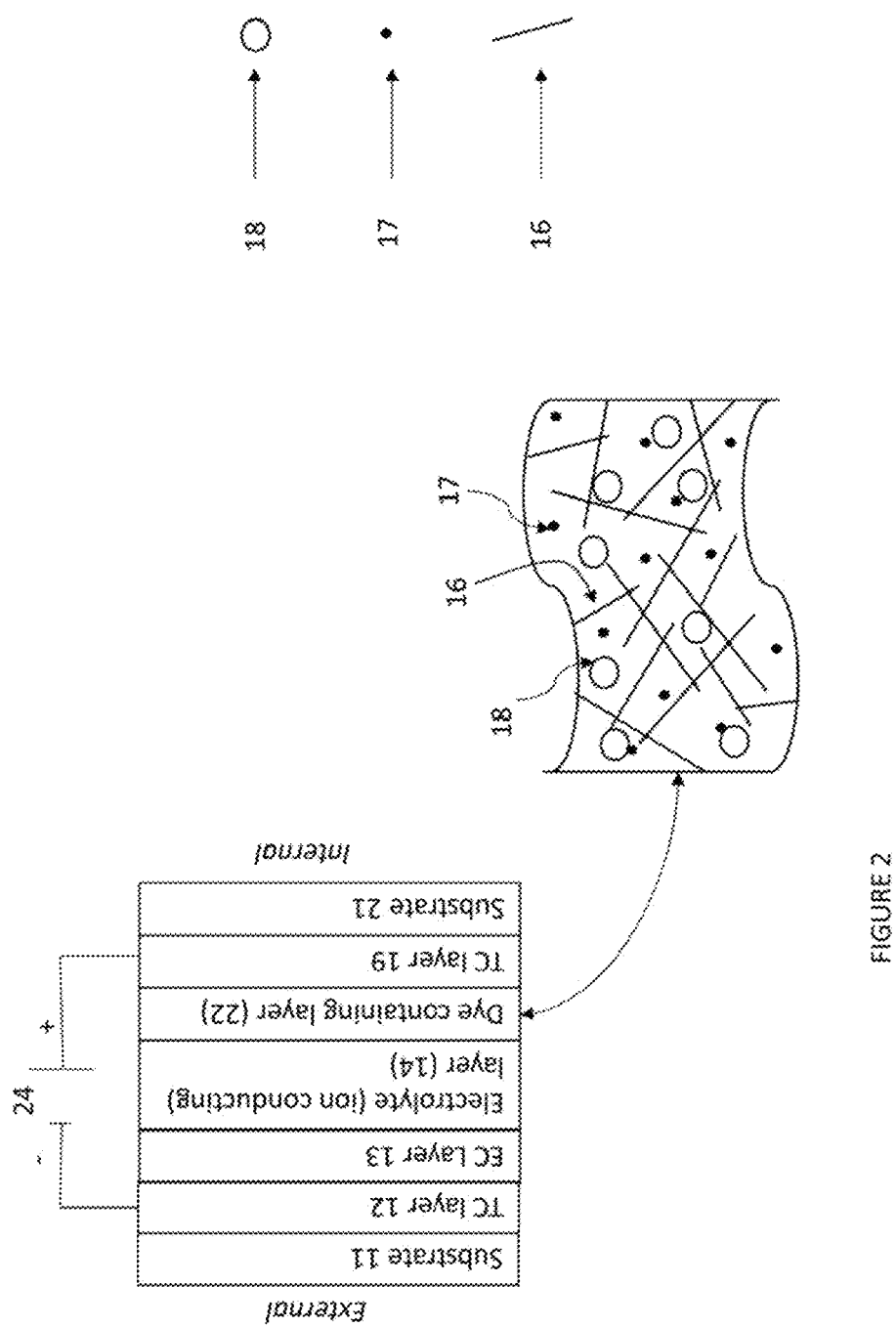
FIGS. 2 and 3 illustrate electrochromic (EC) devices according to embodiments of the present invention.

An example embodiment is illustrated in FIG. 2, wherein the redox isolation mechanism includes nanostructures 16 and dye molecules 18 within a dye-conducting layer 22, wherein at least some of the dye molecules 18 tether to nanostructures 16. The ion-conducting layer 14, or electrolyte layer, is proximate the dye-containing layer 22 and includes dissociable salts (e.g., lithium salts), which are shown as Lithium ions, $Li^+$ (17). The dissociable salts are also present in the layer 22. Please note the anions of the lithium salt or of the dye (if present) are not shown. The nanostructures 16 may be nanotubes, nanorods, nanodiscs, nanoparticles and so forth. The illustrated examples of FIGS. 2 and 3, have the electrolyte layer 14 separate from the dye-containing layer 22 for clarity, but these may take a variety of forms, wherein the $Li^+$ ions are able to travel between across the electrolyte layer 14. Proximate the electrolyte layer 14, and opposite the dye-containing layer 22, is an EC layer 13, which may act as a primary electrode may be a cathodic EC layer. The TC layer 19 along with the layer 22 acts as a counter electrode to the cathodic EC layer 13 in contact with TC 12 through power source 24.

In some embodiments, the cathodic EC layer 13 includes tungsten oxide, wherein, as used in this disclosure, tungsten oxide is generally written as WOx without a fixed W:O stoichiometry, and includes doped tungsten oxide, such as is doped with one or more other metal oxides. The tungsten oxide material is coated on top of a transparent conducting layer, TC layer 12, on a substrate 11. Usually these layers are monolithic coatings. They may also include nanoparticles of oxide EC materials along with conductive nanoparticles, but any such layers must meet strict optical properties for window uses as discussed below.

Tungsten oxide or other inorganic oxides may be doped with other materials to provide various attributes, such as to modify the reduction and oxidation potentials, to reduce photochromism, to improve kinetics of lithium diffusion, to change its optical characteristics in the colored and the bleached state, etc. Tungsten oxide may be doped with one or more metal oxides, such as alkali metal oxides (e.g., lithium oxide, sodium oxide, and potassium oxide), nickel oxide, titanium oxide, vanadium oxide copper oxide, cobalt oxide, nickel oxide, chromium oxide, iron oxide, manganese oxide, vanadium oxide, niobium oxide and molybdenum oxide. Some of these dopants described in U.S. Pat. No. 6,266,177 are explicitly used to improve UV performance of tungsten oxide due to photochromism. Tungsten oxides (with or without these additives) exhibit cathodic coloration, which means that they darken, or color, on injection of ions (e.g., protons, lithium, sodium, potassium, and so forth), referred to as ion intercalation. Typically for cathodically coloring doped tungsten oxide, the mole percentage of the other oxides may vary between 1 to 40% and the rest being tungsten oxide. Of this the mole percentage of the alkali metal oxides in the doped tungsten oxide may be up to 35% and the other metal oxides are typically less than about 20%. In another embodiment these numbers are less than 20% and 5% respectively. Typically these are always higher than 1% for alkali ions and higher than 0.1% for the others.

If anodic inorganic EC layers are used in the device with dyes having cathodic characteristics, there may be several choices for anodic layers, such as those containing nickel oxide, iridium oxide and vanadium oxide, for example. These may be mixed with each other or these may be doped. Although a variety of metal oxide may be used as dopants, some of the dopants in nickel oxide are lithium oxide and tungsten oxide, where typically tungsten oxide is about 20-30 mole % of Nickel oxide. Dopants for titanium oxide are vanadium oxide and cerium oxide. A dopant for iridium oxide is tin oxide. The thickness of the EC inorganic oxides, cathodic or anodic, is typically in the range of about 200 nm to 1,000 nm.

FIGS. 2 and 3 illustrate EC devices 10, 40, according to the present inventions. FIG. 2 illustrates some embodiments of an EC device 10 for use in a smart window, where opposing substrates 11, 21, each have a transparent conductive (TC) portion, TC layer 12, 19, respectively. The TC layer 12 may be a coating that is applied to a substrate 11. A cathodic EC layer 13 is configured proximate TC layer 12. The cathodic EC layer 13 is proximate the electrolyte layer (or ion conducting layer) 14. The layer 22 includes redox dye molecules 18, metal salt (such as lithium salt) 17 and nanostructures 16. The cathodic EC layer 13 proximate TC layer 12 acts as a cathode for EC device 10, and the dye-containing layer 22 proximate the TC layer 19 act as an anode for EC device 10. The electrolyte layer 22 conducts ions and may also contain lithium salts. There is a power source 24 coupled to the EC device 10 between cathodic EC layer 13 (or optionally TC 12) on the substrate 11 and the TC layer 19 on substrate 20. In this configuration, cathodic EC layer 13 along with TC layer 12 is the primary electrode and TC 19 along with the dye-containing layer 22 is the counter electrode. The power supply 24 provides energy for the redox activities that transition the coloration of the device 10.

The nanostructures 16 are illustrated as tubes but may take any of a variety of shapes sufficient to achieve the purposes of the application. The nanoparticles are designed to be electrically conductive. Nanoparticles are defined as those particles which have at least one dimension (width, thickness, height, diameter, and so forth) that is less than 100 nm. In some embodiments at least one dimension of the nanostructures is smaller than 20 nm and in other embodiments smaller than 5 nm. These may have any of a variety of shapes, including, but not limited to, spherical, ellipsoidal, cubical, cuboids, tubular, rods, discs, and so forth. In addition, these conductive particles are percolated, which means they form a conductive network throughout this layer and are in electronic contact with layer 19. Thus, dye-containing layer 22 has both electrolytic properties (ion-conductive properties) and electrically conductive properties. Therefore, the redox dye molecules in layer 22 may be oxidized throughout the bulk of this layer without having them physically transported onto the surface of the TC layer 19. Even further, in another embodiment the redox dye molecules may be fixed or tethered to a component in layer 22. Fixed or tethered means that the dye molecule is covalently bonded to a larger entity (e.g., polymer, conductive nanoparticle, etc.), to restrict its migration to another layer or being transported out of the layer it is present in. The tethering is to a larger molecule or a component that is within the matrix or to the surface of the conductive nanoparticles as long as they are larger than the dye molecules.

In this way, the oxidized ions do not move too much and are not able to enter the electrolytic layer 14; and they do not travel toward the EC layer 13, the oxidized ions are isolated from getting close and/or touching the EC layer 13. This arrangement enhances the kinetics of the device as the large ions do not have to move through the layers. Further, this arrangement stops a back-reaction that could lead to self-bleaching. This arrangement does not prohibit these molecules to change their conformation or have limited movement close to the tethered sites to undergo redox activity via the network of the conductive particles. In addition, in a system embodiment the EC layer 13 is made of an EC material, such as tungsten oxide described above. For low-haze and clear optical properties suitable for transparent windows, it is not desirable for the EC layer to have particles of inorganic materials such as tungsten oxide disposed in an organic ion conductive matrix along with conductive nanoparticles. In this way, the EC layer 13 is different from the dye-containing layer 22. This is because such EC particles are larger in size than the dye molecules and it is difficult to form haze-free transparent coatings with high loading in a polymeric (ion-conductive) binder. In addition, most inorganic EC materials have a high refractive index as compared to the ion-conductive binder and will lead to excessive light scattering or haziness for use in a window application. Thus, EC layer 13 essentially comprises only a particle free composition (organic or inorganic), such as a clear coating (with haze less than 1%) of tungsten oxide or doped tungsten oxide (doped with mainly with other metal oxides) when cathodic EC layers are desired and a total device haze of less than 2%. Exception to the use of such particles are discussed later only if the haze is kept under control.

To meet the haze/optical requirements, if any of the EC layers or the counter electrode layers are formed using inorganic oxide nanoparticles along with conductive nanoparticles (such as conductive nanofibers, nanotubes or nanorods) in an organic ion conductive matrix additional constraints are required. Some of these constraints are also important from a processing perspective, as coatings with a high concentration of nanoparticles are difficult to process. Since many of the inorganic oxides for electrochromic use have high refractive index (usually about 1.8 refractive units or larger in bulk) as compared to the ionically conductive organic matrices (which are typically in the range of about 1.4 to 1.55). When complex notation of refractive index is used, this value corresponds to the real part, as the imaginary part relates to optical absorption. In addition, since refractive index is wavelength dependent, refractive index values used are at 550 nm, the peak of photopic eye response. Organic matrix includes all polymeric components, plasticizers, dissociable salts such as lithium salts and other organic components. First, the average particle size of any of the high index oxides should be less than 50 nm in an embodiment, and in another embodiment less than 25 nm. For some practical considerations, the average particle size is specified to be larger than 2 nm. Second, the concentration of these particles should be less than 5 volume % in one embodiment and less than 2 volume % in another embodiment. From practical considerations, to have reasonable electrochromic activity, the minimum volume % is about 0.05%. Thirdly the thickness of these layers is to be less than 100 microns in one embodiment and less than 500 microns in another embodiment. Again, from a practical consideration minimum thickness for a reasonable electrochromic activity is specified to be one micron. The conductive nanoparticles may also be added to this layer to achieve percolation threshold as discussed elsewhere in this disclosure, and typically these particles do not have inherent electrochromic properties. Specifically if particles tungsten oxide are used as EC material, these particles should be doped with the materials and concentrations of other metal oxides as discussed for coatings.

Fabrication of EC device 10 involves configuring the layers in the desired proportions and positions to enable control based on environmental conditions or in response to user control. As illustrated in FIG. 2, the configuration of layers for an EC device 10 is designed for use in a smart window, and the substrates 11, 21 are transparent, such as: (i) glass, such as soda-lime glass, (ii) plastic, such as polyester, polycarbonate, acrylic, fluoropolymer and so forth, or (iii) some other transparent material. The EC device 10 of FIG. 2 has opposing electrodes with two coated substrates and then these are assembled with an electrolyte sandwiched between them. The process used to build the EC device 10 starts with a first substrate 11 and forms or places TC 12 on the substrate 11, wherein TC 12 is capable to conduct an electric charge. The two substrates 11, 21 may be pre-coated with TC materials. The surface of TC layer 12 is further coated with the EC layer 13. The combination of substrate 11 and TC layer 12 in collaboration with the EC layer 13 forms the first electrode. Similarly, the combination of substrate 21 and TC layer 19 forms the foundation of the second electrode. In a system embodiment, layer 22 may be coated on TC layer 19 and then the two are assembled using the electrolyte layer 14. Electrolyte layer 14 may be a polymer containing solid. The electrolyte may be a film that is used to laminate the two substrates, or the electrolytic coating is deposited on the EC layer 13, and then the two coated substrates are combined together to form the laminate. In another embodiment, a multi-layered solid film comprising of layers 22 and 14 which is then laminated between the two coated substrates, for example, substrate 1 coated with layer 12 and layer 13; the substrate 21 is coated with layer 19. The electrodes oppose each other, and the coloration potential may be applied across the electrodes to initiate coloring of EC layer 13 and in this way color the window 10. More details of the layer 22 are shown in an expanded view of the cross-section. During the coloring operation, in a system embodiment which uses a cathodic EC layer 13, the dye ions 18 oxidize and lithium (from the lithium salt in this layer) are released to travel through the electrolyte layer 14 into the cathodic EC layer 13. The electrons from TC layer 19 travels through the external circuit to cathodic EC layer 13, which reduces and colors the EC layer 13.

The embodiments illustrated in FIG. 3 include another type of redox isolation mechanism, which may be incorporated into the device 10 of FIG. 2 or may be used without the nanostructures 16. The combination of the two redox isolation layers enhance performance and improve the EC memory of a device. In the illustrated example, EC device 40, the redox isolation mechanism is SICL 34 as a redox isolation layer that filters out larger dye ions (if they are free to move about or some are inadvertently released from the layer 59) and allows the smaller ions such as lithium ions to pass. SICL. 34 is formed on, or positioned approximate, EC layer 33, which is a material that will allow the transport of lithium ions, or other small cations, such as protons, sodium and potassium ions. The SICL 34 acts as a filter to enable specific ions to transfer but prevent other ions from passing. The lithium cations ($Li^+$) 52 are relatively small compared to the dye cations 54 formed by the oxidation of the dye in the electrolyte. The SICL 34 allows the $Li^+$ ions to pass through to EC layer 33, these are intercalated with the EC layer 33 for coloration; the SICL 34 blocks the oxidized dye cations 54. In this example, the dye ions 54 are tethered to the nanostructures 50 or to the polymer matrix in the dye-containing layer 59; however, in applications without this dye-tethering mechanism, SICL. 36 acts to separate the cathodic EC layer 34 from the electrolyte layer 38. More details of the layer 59 are shown in an expanded view of the cross-section. This separation enhances performance of the EC device in another unique way by enhancing its durability, as when a semiconductor material is use in EC layer 33. In some examples described herein EC layer 33 incorporates tungsten oxide, which is a semiconductor. When the semiconductor contacts an organic electrolyte in presence of solar radiation, there may be charged species generated in the semiconducting layer and promote an irreversible reaction therebetween. In such a device, this irreversible reaction would occur at the interface of electrolyte layer 38 and EC layer 33 when no SICL is present. When subjected to solar radiation, these devices have a potential to decrease the EC device lifetime. Thus, an inorganic SICL layer which is not a semiconductor will prevent direct interactions between the electrolyte layer 38 and the semiconducting EC layer 33. This means that the charged species generated in the semiconductor are quenched in the SICL layer 34 and do not reach the organic electrolytic layer.

Continuing with FIG. 3, embodiments of the present invention further incorporate reduction and oxidation agents such as a dye material in the dye-containing layer 59 proximate electrolyte layer 38 and the EC layer 34 which acts as a cathode. The EC material reversibly colors when oxidized (or reduced depending on materials and configuration) by an electric stimulus, such as a voltage applied to the electrode formed by EC layer 33 and/or TC layer 32. The dye molecules 54 provide a balancing reaction and create the other electrode in combination with TC layer 56. The dye-containing layer 59 may also have complimentary coloration properties to those of the EC layer 33. In some examples, the cathodic EC layer 34 uses a tungsten oxide-containing layer, while the dye molecules 54 are designed to possess anodic properties and they color on oxidation.

These EC devices may be fabricated by positioning opposing coated substrates with a gap therebetween; the gap is later filled with an electrolyte. The substrates may have layers developed thereon such that one of the substrates has layers forming a cathode and the other substrate has layers forming an anode. In some embodiments, the layers are built up on each substrate, including the electrolyte layer, and then they are laminated together. In still other embodiments, the layers are built on a substrate, wherein during assembly an electrolyte is sandwiched between the two substrates, wherein the substrates may have multiple layers as described herein.

As illustrated in FIGS. 2 and 3, the cathodic EC layer 13, 33 is formed of a material that will act as a cathode into which ions are injected from the electrolyte layer 14, 38 when a coloration potential is applied across by the electrodes via coloration potential source 24, 26. The magnitude of the coloration potential applied across the electrodes (cathode to anode) determines the amount of dye molecules oxidized as well as the resulting Li$^+$ ions transported via the electrolyte layer 14, 38 and injected into the EC layer 13, 33. Further, in EC device 40, the magnitude of the coloration potential applied at potential source 26 determines the number of ions created and then transported through the SICL layer 34. Similarly, the coloration potential source 24, 26 controls the level of coloration in EC device 10, 40. The redox dye molecules 18, 54 are shown in the expanded cross-sectional view in FIGS. 2 and 3. The lithium salt in electrolyte layer 14, 38 and dye-containing layer 22, 59 is expressed as Li$^+$A$^-$, where A$^-$ is the anion of the lithium salt, for simplicity the Figures only show lithium ions although the salt is present along with its anions. In some embodiments where the cathodic EC material is tungsten oxide (WO$_x$), the coloration reactions in the various layers may be expressed as follows, the symbol ↔ shows that the reactions reverse when the device is bleached, e$^-$ stands for an electron, and "D" for the redox dye molecule:

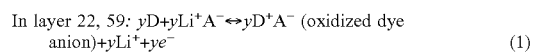
(1)

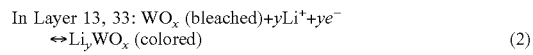
(2)

Reaction 1 above is the oxidation reaction for the dye, as in dye-containing layer 59 in FIG. 3 or layer 22 in FIG. 2. Reaction 2 is the reduction reaction, as in the EC layer 33 of FIG. 3 or layer 13 of FIG. 2. The Li$^+$ ions are transported via electrolyte layer 38 and SICL 34 into tungsten oxide, wherein the electron is transferred into the tungsten oxide-containing layer 33 or 13 via the external electrical circuit. The oxidized dye anions may also change to a more colored state.

The redox isolation mechanism is illustrated clearly in FIG. 3, and the isolation is due to the presence of SICL 34, which acts as a filter to prevent dye ions (D$^+$) from passing through to the cathodic EC layer 33, while allowing the Li$^+$ ions to pass. The dye ions 54 tether to nanostructures 50; those oxidized dye molecules that are not tethered in layer 59 and more freely travel through the layer 38 are blocked by the SICL 34, which transports lithium ions. In addition, the SICL layer 34 is designed to have poor electronic conduction, such that no redox activity takes place at the interface of SICL 34 and electrolyte layer 38.

In some embodiments, a substrate configuration is assembled with substrates spaced apart, forming an empty cavity therebetween that is enclosed with a perimeter sealant (not shown). An electrolyte material is then introduced in this cavity, such as through a hole in the sealant or the substrate which is later sealed. Alternatively, an electrolytic sheet is laminated between the two coated substrates and then the perimeter is sealed.

In operation, application of a coloration potential across the electrodes (cathode to anode) will act to color the EC device when the cathode is connected to the negative terminal. From the colored state, reversing the polarity or short circuiting the electrodes together will bleach the EC device. It is noted that the maximum potential to color may be very different from the maximum bleach potential when the polarity is reversed.

In some embodiments, once the EC device achieves a desired coloration state, whether colored, bleached or partially colored, the voltage applied to the electrodes may be opened (open circuit) and the EC device will maintain that coloration state, i.e. imparting memory to the device.

Manufacture of an example EC device as in FIG. 2 or FIG. 3, reduces at least some of the elements and processes of a conventional configuration manufacture, such as the use of counter-electrode coatings on TC layer 19 or 56. Some embodiments incorporate stoichiometrically more dye material in the dye-containing layer as compared to the electrochemical capacity of the EC layer so that the latter is not starved of lithium ions for reduction. Since lithium is present as a salt and the lithium ions are generated when the dye oxidizes (see Reaction 1 above), the lithium salt may also be present in excess of what is used to reduce the EC layer. Furthermore, if the two layers 22 and 14, and the two layers 59 and 38, are each made as a single multi-layered film, then a separate deposition step of layers 22 and 59 on the respective TCs is avoided; this has the potential to considerably simplify the manufacturing process. The present invention is different from prior art devices, as these prior devices have a counter electrode layer on the opposing electrode and need a separate oxygen and moisture (air) sensitive reduction process.

The electrical power for coloration is provided by source 24, 26, which is illustrated as a power source (voltage or a current source with a voltage limitation), representing the various circuit configurations, connected power source, open circuit and short circuit.

The EC devices 10, 40 of FIGS. 2 and 3 may be oriented between the outside and inside of a building, and specifically, one side of substrate 11, 30 is external to the building, and another side of substrate 21, 58 is internal to the building.

Several types of dyes may be used in devices 10, 40. Some examples of organic anodic dyes suitable for use along with a cathodic layer (organic or inorganic) are those containing pyrazoline, metallocene, phenylenediamine, benzidine, phenoxadine, phenothiazine, tetrafulvalene, phenazine, TEMPO (2,2,6,6-tetramethyl-1 piperidinyloxy derivative), and so forth. If an inorganic or organic anodic EC layer is used then a suitable cathodic dye examples may contain viologens and anthraquinones.

Preferred dyes are those which art stable to UV light, particularly in the colored form (i.e., oxidized or reduced state). For example, the oxidized state of ferrocene dye is not UV stable. The UV stability of ferrocenes may be improved by attaching electron-donating groups to the cyclopentadienyl rings, such as alkanes and cycloalkanes. For example, consider tertiary butyl ferrocenes, n-butyl ferrocenes, and decamethyl ferrocenes. However, the UV stability of the bridged dyes discussed below are examples of dyes with particularly good UV performance in these applications.

A class of dyes that provide high UV stability have accepter-donor type structures, such as ferrocene-viologen, phenazine-viologen, phenothiazine-viologen, bisphenazine, phenazine-phenothiazinetriarylamine-phenothiazine. These tend to belong to a class of bridged dyes where the accepter and the donors are linked. Bridged dyes typically contain at least two moieties with different functionalities which are linked together. These may be two different dye structures with different redox properties or even similar redox properties. However, the linked system may exhibit redox properties which are different from the moieties when they are not linked. A nonconjugated bridge, such as σ-type —(CH2)n- chains or a conjugated moiety link the two groups. The photoexcited states formed in the accepter-donor of these linked dye systems may transfer photoelectrons internally and relax without causing damage to the dye structures or to the other materials nearby. In this description ferrocene-viologen means that a ferrocene or a ferrocene derivative is covalently linked to a viologen or a viologen derivative; ferrocene may also have additional substitutions on the cyclopentadiene rings discussed above. Similarly, in bisphenazine, two phenazines are linked (e.g., 2,2'-bis-5,10-dimethyl-5,10-dihydrophenazine), and in phenazine-viologen, phenazine and viologen are linked. In addition, ferrocenes and phenazines show an anodic coloration character, which means that they may be oxidized electrochemically in the device. Viologen shows a cathodic character, which means that its colors when it reduces electrochemically in the device. Thus, in many of these examples, the bridged dyes have both an anodic and a cathodic character in the same molecule. For example, when a tungsten oxide coating is overcoated with an SICL layer and an electrolyte and/or a layer with tethered dyes in contact with an opposing electrically conducting layer, and a voltage is applied to color tungsten oxide, the cathodic part of the dye does not participate in the redox activity. Still, such bridged dyes may be used as their anodic component and will participate in the redox activity.

As discussed earlier, many of the bridged dyes provide superior UV resistance. Tungsten oxide coatings show EC behavior in both visible and near infra-red (NIR) region of the solar spectrum (about 400 to 2,500 nm). For EC devices designs having high contrast in both regions, dyes which also color both in the visible and in the NIR spectrum may be used with these type coatings. The bridged dyes which show activity in both the visible and the NIR regions may incorporate at least two similar or disparate anodic groups, such as bisphenazines and triarylamine-phenothiazines respectively.

Another type of redox dye that may be used in these systems (which is not bridged) are iodine (or iodide) containing materials such as LiI, NaI, KI and other iodide salts containing photostable cations. In the electrolyte, a system may also use materials that may complex with iodide ions along with iodine containing salts. Materials used for this purpose include polyvinylpyrolidone (PVP), as well as monomers and copolymers comprising PVP.

Those devices which use tungsten oxide as cathodic EC layer (layer 13 and 33 in FIGS. 2 and 3 respectively) another source of degradation is the formation of the photoexcited states in the semiconducting materials such as tungsten oxide when it is exposed to solar radiation. These excited states may degrade dyes or organic materials and also interact with small amounts of water or hydroxyl groups present in or close to the coatings. One way to reduce this is by doping the EC layer with other components (dopants) to the tungsten oxide coating so that its absorption edge in the UV is blue shifted to lower wavelengths, as the semiconducting activity is eliminated or decreased when exposed to solar radiation. A mild effect on blue shifting was measured by measuring photocurrent of devices containing EC layers with doped tungsten oxide, such as described in U.S. Pat. No. 6,266,177 where the dopants used are other metal oxides, particularly the transition metal oxides of group 4. Organic dopants, such as UV absorbers/stabilizers and quenchers, which inhibit photo-excited states may be added to such coatings. The EC coatings containing tungsten oxide may be deposited with the dopants or after the deposition of the coatings a solution containing the UV agents is applied on these coatings so that they are absorbed into the porous structure of such coatings.

An effective SICL material is selected to reduce the leakage current in order to impart memory. Leakage current refers to the current required to maintain the desired coloration state, or the current required to overcome self-bleaching of the device. The SICL layer acts as a barrier between the organic containing electrolyte and the semiconducting EC layer, such as $WO_3$. As mentioned earlier, the SICL is specified to conduct the ions used to reduce or oxidize the underlying EC layer during the device operation. In most devices, lithium ions are used for this purpose. In addition, this layer can also serve to enhance the UV stability of the device.

Examples of SICL materials suitable for use in an EC device include organic or inorganic materials or their hybrids. Examples of organic SICL layers are polystyrene sulfonate, lithium or sodium salts (abbreviated as PSSNa or PSSLi). The SICL may also be made of inorganic materials which are inherently stable to UV and do not have semiconducting properties (but are rather electronic insulators), so there is no UV activation in this layer and this layer blocks any activated species formed in the EC layer from cross over. SICL layers may also be formed of inorganic materials including inorganic fluorides which are not semiconductors and have ionic conductivity, such as cryolite type compositions (materials containing lithium fluoride and aluminum fluoride). Inorganic lithium ion conductors include lithium containing nitrides, oxides, fluorides, phosphides and combinations thereof. Some of the specific materials are lithium oxyphosphonitride (LIPON), lithium aluminum fluoride (LiAlF), lithium niobate, lithium aluminum silicate and lithium β alumina, and so forth. In a system embodiment the ion conductivity is to be at least $10^{-8}$ S/cm at room temperature, in another embodiment this are to be at least $10^{-6}$ S/cm and yet in another embodiment it is to be at least $10^{-4}$ S/cm. These conductivities are temperature dependent, and for most EC device applications, including building windows, EC devices operate in the range of approximately −40 to 90° C. in which these are to function and have the above ionic conductivities in the ranges specified above.

When using an organic SICL layer, appropriate UV stabilizers are added to this layer reduce the degradation caused by the interaction of the photoexcited states originating from the EC layer. In these designs, the UV agents (UV stabilizers/photo quenchers) are compatible with the SICL layer but are not soluble in the electrolyte. This is to reduce the possibility of substantial amounts of UV agents leaving the SICL layer into the electrolyte. For example, when anionic polymers are used as SICL layers (e.g., polystyrene sulfonate—sodium or lithium salts), ionic UV stabilizers such as anionic UV stabilizers may be used. An example of an anionic UV absorber is sodium benzotriazolyl butylphenol sulfonate and a compatible photo-quencher is tetramethylhydroxypiperidinol citrate. These two may be used together. The electrolyte may have a different set of UV absorbers which have superior compatibility with it. In the SICL layer, the concentration of the UV absorbers (or quenchers if used) per the above described embodiments is about 10% or lower by weight, and in some cases 5% or lower by weight. When photo-quenchers are included in these components, the characteristics of the photo-quenchers are matched with the characteristics of the EC dyes, so the materials do not interact with the dyes to kill/reduce their desired EC activity. Care is taken in design incorporating photo-quenchers (or antioxidants) in the electrolyte to ensure that the dye ions produced by the electrochromic reaction are not reduced by the quenchers leading to irreversible reactions. Prior to the deposition of SICL layers EC coatings may be optionally treated with UV agents, unless the deposition of SICL layers from solutions containing the UV agents will also cause the UV agents to intercalate in a sufficient quantity within the pores of the EC layers to be effective.

EC devices with an SICL layer, which is ion-conductive and non-electrically conductive, experience low leakage current. As seen from the detailed disclosure contained in U.S. Pat. Nos. 6,178,034 and 6,317,248, the lower currents are obtained when the SICL layer has an ionic nature and low electronic conductivity. These references illustrate the use or a cationic polymer PSSNa or PSSLi in the SICL layer, the leakage current was measured at about 10 to 100 times lower compared to the other SICL layers used, including lithium niobate, known as inorganic lithium ion conductor. However, it has been seen that EC devices with these cationic polymers work better when a small amount of water is added in the electrolyte; the addition of water is not desirable for a high durability device as water interacts electrochemically, which reduces cyclability and UV performance. An aspect of the current disclosure is to use and demonstrate SICL layers which do not require the use of water in the electrolyte and yet have low leakage current. Other ionic SICL may be fabricated using acidic polymers which are neutralized with alkali metal bases. For example, acrylic acid and poly(2-acrylamido-2-methyl-1-propanesulfonic acid) (POLYAMPS® available from Lubrizol Corporation, Wickliffe, Ohio) may be converted to lithium or sodium salts by reacting them with bases such as lithium hydroxide and sodium hydroxide respectively. For use with EC coatings containing tungsten oxide the SICL layers where the acidic polymers are converted to their salt state (including partial conversion) their specified pH is in the range of 3 and 8 and more desirably between 5 and 7. The pH of the converted polymers may be measured by forming a 5% (by weight) solution in water and measuring its pH.

Fluorinated cationic polymers have inherently high durability to UV radiation. Some specific examples of these are Aquivion® materials from Solvay (Brussels, Belgium) which are lithium salts of perfluorosulfonic acid (e.g., $PFSO_3Li$ represents the lithium salt form ($-SO_3Li$) of PFSA or perfluorosulfonic acid). Some of the grades that work for some applications are D79-25BS Li and PW79S Li. Another example of a material is Flemion™ from AGC Chemicals (Tokyo. Japan). Another example is lithiated Nafion® called Lithion™ (available from Ion Power, New Castle, Del.). The SICL layer may also be formed using a monomer which is polymerized and/or crosslinked after deposition.

The electrolyte (layer 14 in FIG. 2 or layer 38 in FIG. 3) may be a liquid or a solid, but for large area windows, such as for buildings and transportation, solid electrolyte is desirable. The electrolyte with a monomeric component may be positioned in the desired configuration and then polymerized. Polymerization also includes crosslinking. For example, when a monomer in an electrolyte formulation is polymerized, the fabrication may form a cross-linked polymer, or the oligomeric or polymeric materials already present in a liquid electrolytic formulation may be crosslinked. A thermoplastic electrolyte may also be processed above its melting or softening point temperature, and then solidified by cooling. In the case where crystallization of the polymeric component takes place upon cooling, the selection of material considers the resulting crystal size to facilitate visibility. In some applications, the crystal size will be less than the wavelength of light, and typically less than 500 nm. Crystal size may be measured by X-ray diffraction or by microscopy. In some embodiments, the crystal size is smaller than about 100 nm or even about or smaller than 10 nm, so that the visibility through the window is not compromised due to light scattering. These crystals are not considered spacers between substrates. The electrolyte may also be formed as a film of a thermoplastic material and laminated.

Electrolyte 14, 38 of EC device 10, 40 respectively (FIGS. 2 and 3) may be a solid which contains one or more electrolytic plasticizers, wherein the plasticizers are stable in the electrochemical range in which the window is powered. The plasticizers include material such as propylene carbonate, γ-butyrolactone, tetraglyme, sulfolane, monofluoroethylene carbonate, difluoroethylene carbonate, hydrophobic ionic liquids, and so forth. Polymers that enable the electrolyte to solidify include poly methylmethacrylate, aliphatic polyurethanes, fluorinated polymers and copolymers such as copolymers of polyvinylidene fluoride. Other additives in the electrolyte include UV stabilizers, tinting dyes, rheology modifiers (such as fumed silica), and dissociable salts such as lithium salts. Solid polymer electrolytes which are plasticizer free may also be used. These contain polymeric salts with covalently bonded anions and the charge balanced by lithium cations.

Hydrophobic ionic liquids in electrolytes, wherein ionic liquids may also be considered as a part of the plasticizer components, (part of the liquid component to dissolve the salt) to further increase the device durability. The full disclosures of the U.S. Pat. Nos. 6,853,472 and 7,300,166 are included herein by reference. The ionic liquids may be used for partial or complete replacement of the plasticizers discussed earlier. Ionic liquids include quartenary ammonium cations, such as pyridinium, pyrrolidinium, pyridazinium, pyrimidinium, pyrazinium, imidazolium, pyrazolium, thiazolium, oxazolium, and triazolium. These may have various substitutions or substituents, such as H, F, phenyl and alkyl groups with 1 to 15 carbon atoms. Rings may even be bridged. Some embodiments incorporate anions that are fluorine containing such as triflate ($CF_3SO_3^-$), imide ($N(CF_3SO_2)_2^-$), beti (($C_2F_5SO_2)_2N^-$), methide ($(CF_3SO_2)_3C^-$), tetraflouroborate ($BF_4^-$), hexaflourophosphate (PF6-), hexafluoroantimonate ($SbF_6^-$), bis(fluorosulfonyl)imide ($N(FSO_2)_2^-$) and hexafluoroarsenate ($AsF_6^-$). Of these, imide, beti bis(fluorosulfonyl)imide and methide anions may perform better in some applications as these are hydrophobic. An example of an ionic liquid (IL) is 1-butyl-3-methyl pyrrolidinium bis(trifluoromethanesulfonyl)imide (BMP). When ionic liquids and lithium salts are used, in some embodiments the anion for both are similar. The electrolyte may contain both the ionic liquids and non-ionic plasticizers. Typically, the electrolyte contains dissociable salts, particularly lithium or sodium salts, ionic liquids and redox materials (includes electrochromic dyes). Ionic liquids, lithium salts. In those devices where the electrolyte layer contains redox dyes which have salt structures with anions and cations, this anion may be the same as that of the ionic liquid and/or for the lithium salt. For example, use of bis(trifluoromethanesulfonyl) imide anions in the ionic liquid, lithium salt and the dye (for dyes with salt structure) the EC device has shown good performance in some applications. In those embodiments where ionic liquids are not used, the system may use the same anion for the lithium salt and the redox dye. In those devices where the dye-containing layer is separate from the electrolyte layer, the redox dyes, lithium salt, ionic liquid, and other plasticizers are also present in this layer.

One method to prepare a solid thermoplastic electrolyte for a device shown in FIG. 2 is discussed below. A plasticizer is used to dissolve the ion conductive salt, such as lithium salt, and the redox dye. Further, to this composition polymer(s) and UV stabilizer(s) are added. After the components are mixed properly, if used, the rheology modifying nanoparticles are also mixed in (e.g., compatible hydrophobic fumed silica in a size of about 1 to 500 nm). The ingredients are mixed at elevated temperature (typically between 80 and 150° C.) under inert conditions. This mixture may also contain a removable solvent to facilitate processing. The mixture is then removed and cast as sheets (and solvent removed if present) which is then used to laminate the coated substrates to form the device. Since the electrolyte is specified to be solid at all use temperatures, the application and use of the EC device determines the operating temperature range. For example, a smart window in New York City may be specified to be solid for at least 50° C. above the maximum anticipated use temperature. The maximum use temperature is the temperature which the place reaches in summer. This is because the EC glass in the colored state will heat up further due to the absorption of the solar radiation. Generally, windows which would meet temperature requirements in all geographic areas for architectural use are specified to be functional at least up to a temperature of 85° C., and in some embodiments up to 95° C. These may be capable of being stored at 110° C. and/or briefly tested by powering at this temperature and in some embodiments to 120° C. To make a bilayer film, two such films may be produced by casting, where one will not have the redox material and the conductive nanoparticles and then the films are combined as one sheet; or a first sheet is formed and a second composition is coated on the first sheet, giving a bilayer or a tri-layer sheet depending on whether one or both sides of the first sheet are coated.

In some embodiments, the solid electrolyte sheets, or multilayer electrolytic sheets containing the electrolyte and the dye layers discussed earlier, are fabricated first (cast, extruded, and so forth) and then incorporated into the EC devices. For solid electrolytes, transparency is to be high with low optical haze. Both transparency and haze are measured on a laminate which is formed by laminating the electrolytic film of the thickness to be used in the devices between two clear non-coated pieces of soda-lime glass substrates with a thickness in a range of about 2.1 to 2.3 mm. Transparency is specified to be greater than 75% at 550 nm. Typically, the haze is specified less than 2% as measured by ASTM D1003 method. In another embodiment the haze is specified lower than about 0.5%. The ionic conductivity of the electrolyte, and the dye layer without electrically conductive particles, at 25° C. is specified equal to or more than about $10^{-6}$ S/cm. In another embodiment these are to be more than about $10^{-5}$ S/cm. Use of solid electrolytes also reduces the hydrostatic pressure at the perimeter seals of the EC devices. The solid electrolyte is specified to resist deformation within the EC laminate due to wind loads, thermal or other stresses, such as in large window sizes. As discussed in this disclosure, part of the deformation may be reduced by using thicker substrates; but mechanical properties of the solid electrolytes are also important. To avoid deformation and keep the hydrostatic pressure in the seals low, the hardness of these electrolyte sheets is generally in the range of Shore A10 to D55 and its thickness in a range of about 0.1 to 2 mm. For example, if the electrolytic sheets are thinner, then a harder sheet may be used if the ionic conductivity requirements are met. In addition, the properties and adhesion of the solid electrolytes also impart other characteristics if they are selected properly, particularly as it relates to reduction of sound transmission and improving scatter resistance. Scatter resistance is the ability to support or keep the small pieces of the substrate adhered to the electrolyte film when the substrate or device is broken; and this property is typically measured by a ball drop method. Reduction in sound transmission is governed by the loss or damping ability of the sound frequencies (in about 5 to 20,000 Hz range). The scatter resistance is governed both by the adhesion of the electrolyte to the substrate and by its elongation and strength. A desired adhesion to the substrate at room temperature (25° C.) is specified to be at least 1.8 kg/cm as measured using a peel test as described in ASTM D3167 (see U.S. Pat. No. 6,995,891 for additional test details and mechanical incorporations of the solid electrolytes, the disclosure of which is contained herein by reference. In some embodiments, the solid electrolyte at room temperature is specified to have adequate strength, such as 5 kg/cm$^2$ or greater, and an elongation to failure, such as 100% or greater, as measured by ASTM test method D638.

UV stability of an EC device and system is further improved in embodiments of the present invention using UV stabilizers incorporated in the electrolyte and the dye-containing layers or any other organic layers including polymeric substrates and lamination materials and adhesives used to bond EC devices to additional inorganic glass substrates. Different types of UV stabilizer, each having different mechanisms to thwart the UV threat and each with activity in different wavelength ranges, such as those covering about 280 to 400 nm, may be mixed or combined to achieve composite or hybrid characteristics. UV absorbers include benzotriazoles, triazines, benzophenone, cyanoacrylates salicyclates and others (e.g., Tinuvin® 1130 is a benzotriazole and Tinuvin® 400 is a triazine from BASF (Germany)). Hindered amine light stabilizers (HALS) may be used along with the above absorbers (e.g., BASF's Tinuvin® 123 and Tinuvin® 292), wherein generally, specific HALs are much more effective in preventing degradation when such HALS have substitution on the hindered nitrogen by hydrogen or alkyl. U.S. Pat. No. 7,595,011 provides additional details on specific type of materials, combinations and their use. A system may also use nitroxyls, hydroxylamines and hydroxylamine salts (see U.S. Pat. No. 7,718,096) along with other UV absorbers. The presence of these HALS also extends the usable lifetime of the UV absorbers. Usually the concentration by molarity of each of the UV absorbers/stabilizers (including HALS) is about 0.1 to 10 times that of the EC dye being used, and in some embodiments, are in the range that is between 1 to 5 times of that of EC dye used. Although there are many methods of measuring UV stability of EC devices, one widely used standard method for window devices in an IGU configuration is ASTM E2141.

Conductive nanoparticles are used to provide electronic conductivity in the dye-containing layer, in addition to the ionic conductivity—which is provided by the electrolytic additives. These particles may also be bonded to, or reacted with, the dye molecules, to largely immobilize the latter, assuming that the nanoparticles themselves are largely immobile. Nanoparticles are defined as having at least one dimension about 100 nm or smaller, and in some embodiments, are desired to be in a range of approximately 0.3 nm to 100 nm. The other dimensions may be in the nano-range or larger. It is important that the conductive particles are present in a concentration which is above the percolation threshold to form a network in order to provide conductivity to the dye containing layer and electrically connect to the electrically conductive electrode (e.g., TC), i.e., be able to provide conductivity through the thickness of the layer. Further, the concentration of these particles has to be optimized to also allow high visible transmission and low haze. Typically, the visibility through this layer (photopic or at 550 nm) are to exceed 40% in one embodiment, and 60% in another embodiment and 80% in yet another embodiment. Haze in these layers are to be lower than 2% in one embodiment, less than 1% in another embodiment and less than 0.5% in yet another embodiment. Transmission and haze in an dye layer containing the above nanoparticles may be established by coating this layer on a 2.3 mm thick clear (uncoated) soda-lime glass and measuring haze using American Society for Testing and Material (ASTM) method D1003.

At low temperatures, the ion conductivity of the electrolyte, SICL, dye layer and the EC layer decreases, which results in sluggish kinetics. It is desired that the EC functionality of the windows be preserved at least to 0° C. and specified down to −20° C. even if the response is sluggish as compared to that of room temperature. The EC panels of these windows are usually constructed of both inorganic materials and organic materials. In some embodiments using glass (e.g., soda lime glass) as the substrates, TC and the EC coating are inorganic, and the other layers and seals would usually have an organic matrix. Typically, inorganic materials have a lower thermal expansion as compared to the organic materials. In addition, there is a large change in thermal expansion coefficient at glass transition temperature (Tg) of the amorphous materials, and many of the amorphous organic compounds may have their Tg in the range of use temperature, such as from −40 to 120° C. The material selection assumes that during use at temperature there are no glass transitions of organic layers or perimeter sealant. The Tg of the electrolyte, organic SICL, the dye-containing layer and the perimeter sealant are specified lower than the use temperature. Since the electrolyte, dye layer organic SICL compositions may be plasticized, the freezing or the glass transition point of the composition is specified below −20° C. or in some embodiments below −40° C. The plasticized solid electrolytes comprise 20 to 50% plasticizer, 4 to 40% polymer which also acts as a binder (thermoplastic or monomer by weight which may be later polymerized and or crosslinked under lamination conditions), ion conductive salt—such as lithium salt 1 to 10%, redox dye 0.5 to 10% (if present in the layer) and UV stabilizer 0.1 to 10%, and viscosity modifiers such as fumed silica or fumed alumina about 5 to 50% by weight of the electrolyte. A system may even use a solid polymer electrolyte with inherent ion conduction (e.g., cationic polymers neutralized using lithium base) which may not incorporate plasticizers or the viscosity modifiers and will also act as a binder. Such electrolytes are formed as sheets which are then laminated between the coated substrates. The polymer partially or completely may be substituted with a monomer which is polymerized after the sheet is formed, or after it is laminated to the coated substrates used to make the device. Polymerization may lead to the formation of thermoplastic or thermoset (crosslinked) electrolytic components. Other components, such as adhesion promoters, tinting agents, spacers, catalysts (photo or thermal catalysts) for polymerization (includes crosslinking) may be used.

The conductive particles in redox layer may also be conductive nanowires, nanofibers, nanotubes, discs, spherical, elliptical, or mixtures of these or other nanostructures having conductivity, such as those described in U.S. Pat. No. 8,593,714, which is incorporated by reference in its entirety. However, now it has been found that there are other aspects of these materials which are important for their incorporation in EC devices. When conductive carbon nanotubes (or fibers or nanowires) or graphene (collectively called nanocarbon products) are used in the electrode are to have low free metal content, so that the cyclability of the devices is not impacted, i.e., irreversible reactions involving free metals are reduced or eliminated. In a system embodiment, the free metal content of the carbon products is to be less than 10%; in another embodiment, the free metal content is to be lower than about 5%. In another embodiment, free metal are to be less than about 2%; and yet in another embodiment, the free metal content is to be lower than about 1%. In another embodiment this is less than 0.1%. The system may tolerate metal content if they are in a form of inert compounds such as oxides, carbides, etc., that do not participate in electrochemical reactions, i.e., stable within the electrochemical window in which the device operates. It is also desirable that any carbon impurity, other the intended nanotubes or graphene, be minimized, there may be carbon present in other forms or even the above carbides. The reason is that such impurities cause unnecessary load on the system by decreasing optical transmission without contributing to the conductivity. If these are large particles, they may also contribute to haze. Thus, impurities in a nanotube or a graphene product which is used are to be less than 25% in a system embodiment, less than about 10% in another embodiment and less than about 5% in another embodiment.

Further, the nanotubes of some embodiments, as described herein, are selected as having high conductivity and low optical absorption. For example, the carbon nanotubes with single walls have the lowest optical absorption and highest conductivity. Thus, increasing the number of walls predominantly increases the optical absorption. Thus, materials with few walls, such as those including single and double walls or their mixtures, are used in some embodiments. In another embodiment, multi-walled carbon nanotubes with a diameter of less than 10 nm may be used to result in high conductivity, stiffness and acceptable optical absorption. In a system embodiment, the length of the carbon nanotubes is to be at least 100 times their diameter, and in another embodiment at least about 1,000 times their diameter.

The chirality of the nanotubes, i.e., the direction in which the hexagonal network of carbons forming the nanotubes is wrapped to form these tubes, also influences its conductivity. In principle, the carbon nanotubes are characterized as having metallic type conductivity phase or semiconducting type conductivity phase, and usually in many carbon nanotube production methods mixtures of these phases are produced. In a system embodiment the type of carbon nanotube incorporated in the electrochromic devices are to have a higher proportion of metallic phase nanotubes i.e., about or higher than 50% metallic-phase, in another embodiment the metallic-phase content is about 70% or higher and yet another embodiment the metallic-phase content is about 80% or higher. Please note that the phrase "metallic phase" as used herein, has only to do with the type of conductivity of the carbon network and has no bearing on the metal content of the material.

The concentration of these fibers in a coating (or the dye containing layer in the electrolyte film) is important in ensuring that this layer is still quite transparent. Typically, when conductive carbon nanoparticles are used they are to be percolated and to be 2% or less; and in another embodiment, may be specified less than about 0.1%, and in yet another embodiment less than about 0.02%, all by weight. This ensures a layer is still transparent, and that fibers, or conductive discs or particles, are well dispersed so that they achieve the percolation threshold at the lowest concentration. In addition, this also keeps the cost of such layers low. Using higher purity nanoparticles, and using graphene and nanotubes with fewer layers as described above, results in using lower weight percentages of these layers, where the particles are still percolated, and this results in high transparency and low haze.

When redox dyes are tethered to the conductive nanowires, then it is done prior to incorporating them into the layer composition. This ensures that a substantial amount of the dye molecules is in contact with the conductive element; they do not have to travel to the conductive layer for the redox activity to take place. This also results in faster device kinetics, or faster color change if the charge transport is not limited by the resistance of the transparent conductor. One way of achieving this is to make or synthesize conductive nanowires with organic functional groups (or functionalized surfaces) and make dye molecules which have complimentary groups so that these may react with the functional groups on the surface of the nanowires. Some of the common functional groups that may be attached to the conductive particles are hydroxyl, amino, carboxyl, aldehyde, vinyl, and so forth. These may react (for example condense) with functional groups on the dye molecules. For example, amino or hydroxyl groups on the nanofibers may react with hydroxyl and carboxyl groups on the dye molecules, or the carboxyl groups on the surface of the nanofibers which could react with hydroxyl or amino groups on the dyes. Any material may be functionalized with any group if it may react with a group on the other material. This reaction between the dye and the nanowires is done prior to adding the nanowires to the polymer to form the electrochromic layer. Nanowires with attached dyes may be mixed with nanowires with no dyes attached in the electrochromic layer. Carbon nanowires with functionalized surfaces (single and multi-walled) are also available commercially, e.g., some sources are Cheap Tubes Inc (Grafton, Vt.); FW100, CG100 and CG300 from Chasm Technologies (Boston, Mass.); Nanointegris, (Quebec, Canada); US Research Nanomaterials Inc (Houston, Tex.) and; Nanostructured and Amorphous Materials Inc (Houston, Tex.).

One is to be careful in functionalizing the surface of the carbon nanotubes so as not to cause excessive reduction in their conductivity. A system may also use functionalized graphene sheets to attach the dyes instead of the nanofibers. A system may also contain mixed graphene with nanofibers, or conductive particles of different shapes. When forming the EC layers containing the immobilized dyes reacted with conductive particles, the concentration of the conductive particles including the particles attached to the dyes are specified to be at least at or above the percolation threshold. The conductive particles are also transparent having a high visible transmission and low visible light scattering as discussed hereinabove. It is not necessary that the conductive particles be made of carbon, but that the surfaces of these nanoparticles are not to be electrochemically active, save the dye molecules if they are attached to these surfaces. Some other choice of conductive nanoparticles, including fibers, sheets spherical or any other shapes, are conductive metal oxides, such as indium tin oxide, coated with carbon or conductive oxides so that metal reactivity with the electrolytic materials may be eliminated.

Another method to make EC structures shown in FIGS. 2 and 3 is by depositing the dye containing layer on the TC layer 19 or 56 respectively. This is then laminated using a single layer electrolyte film 14 or 38 with the other substrate with the coatings. This means that the dye layer and the electrolyte layer is not first formed as a two-layer structure and then laminated.

Figure 21:
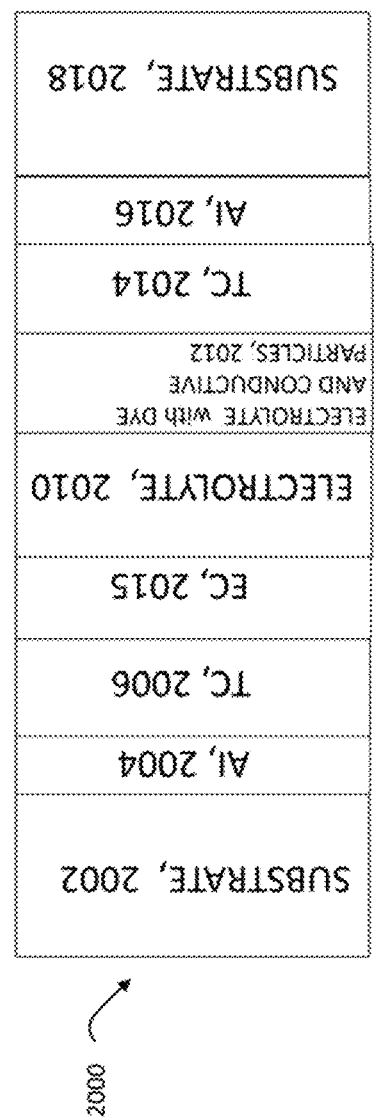
FIG. 21 illustrates an EC device having a multilayer film, the multilayer film having an electrolyte and dye-containing layer that is for lamination with substrates, according to embodiments of the present invention.

FIG. 21 illustrates an EC device construction 2000 for use in a window, and has an electrochromic (EC) coating 2015, such as with a thickness in the range of about 200 to 1,000 nm, on one substrate 2002 which is combined with (or laminated with) another substrate 2018 coated with an anti-iridescent (AI) layer 2004, 2016. (thickness about 1-20 nm) followed by transparent coating (TC) 2006, 2014. The material joining or combining or laminating the two substrates is a multilayer electrolyte film which comprises two layers, one an electrolyte layer 2010 (thickness range about 100 to 2,000 μm) and a redox dye-containing layer 2012 (thickness range about 1 to 100 μm).

Figure 5:
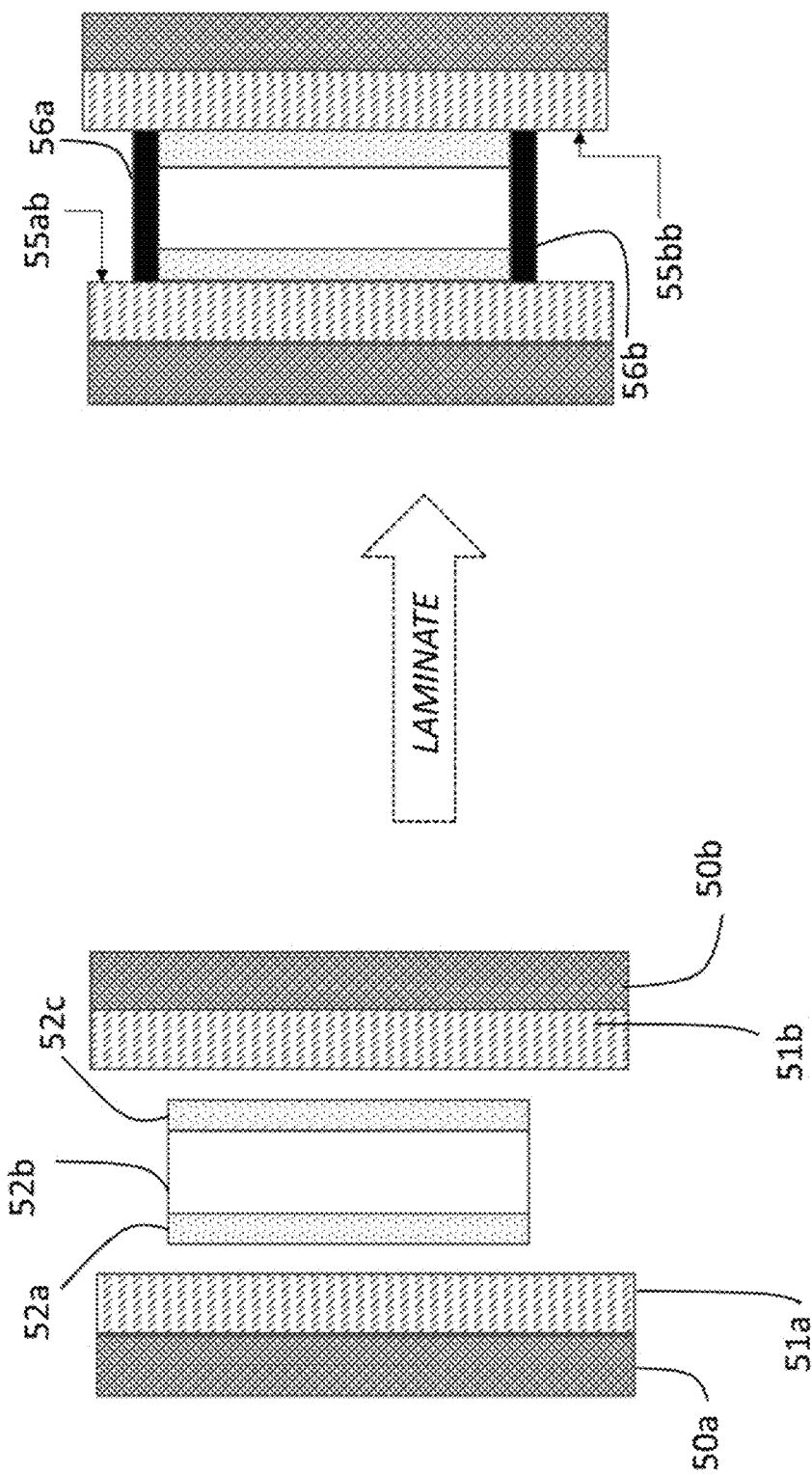
FIGS. 5 and 6 illustrate EC device constructions incorporating a lamination of a multilayer electrolyte film according to embodiments of the present invention.

FIG. 5 illustrates EC devices according to some embodiments containing multilayer electrolytic compositions. Anti-iridescent layers if used between the TC and the substrates if used are not shown. This EC device has two opposing substrates 50*a* and 50*b*, which are respectively coated with TC layer 51*a*. 51*b*. In this case the multilayer electrolyte has three layers 52*a*, 52*b*. 52*c*. The layers 52*a* and 52*c* have redox materials incorporated, where at least one of these materials has electrochromic properties. For example, if layer 52*a* has cathodic EC dye then layer 52*c* will have an anodic material, which may also have complimentary EC properties. Since many of the bridged dyes have both anodic and cathodic behavior, a system may incorporate the same bridged dye in these layers. When this device is powered to color then anodic part of the bridged dye is activated in one layer (e.g., in layer 52*c*) and the cathodic part of the bridged dye is activated in the other layer (e.g., in layer 52*a*). The U.S. Pat. No. 8,115,984 is incorporated herein by reference and details some options for these devices.

Continuing with FIG. 5, the central layer 52*b* does not include redox materials. The dyes or the electrochromic materials in the layers 52*a* and 52*c* are immobilized to reduce transport into layer 52*b*. In a system embodiment, layers 52*a* and 52*c* contain conductive nanoparticles in a percolated concentration or higher. Immobilization may be done by reacting dyes with the polymers comprising the matrix of layers 52*a* and 52*c*, which may be optionally crosslinked. However, this crosslinking is preferably done during the lamination process. Alternatively, layers 52*a* and 52*c* may be thermoplastics and layer 52*b* may be a thermoset. Similarly, dye immobilization may be achieved by attaching the dye to the conductive nanoparticles present within this layer; or immobilization may be done using both methods, such as to attach some dye molecules to the conductive particles and immobilize others by reacting to the polymer or some other non-mobile components in the matrix. The conductive network of the nanoparticles in the outer layers of the electrolyte helps in reducing or oxidizing the dye molecules throughout the layer without having the dye to travel. This also improves the kinetics of the device, such as at low temperatures when mobility of large molecules/ions is limited.

The device (FIG. 5) is configured by laminating the multilayer electrolyte and sealing the perimeter 56. The device is connected electrically by connecting electrical leads at the transparent conductor exposed at the perimeter as shown by 55*ab* and 55*bb*. The type, amount, configuration and positioning of the nanostructures are designed such that the use of conductive nanoparticles does not produce an unacceptable visual haze or darkening. In manufacture and production, EC device of FIG. 5 for window use is designed to have a visible haze of approximately less than 2% and often less than 1%, before it is incorporated as a panel into an IGU or window. For skylights or those windows which are far from where a user's vision and good visible transmission is not required, a system may have higher amounts of haze, as sometimes the purpose of these skylights and windows is only to let the light in but not to view the outside.

If the electronic conductivity provided by the conductive particles in the outside electrolytic layers (layers 52*a* and 52*c*) is high, then a system may use lower conductivity TC on the substrates. TC's may even be eliminated where the substrates may be coated with a perimeter of a conductive current collector (this conductive current collector which is inert i.e., does not react with the electrolyte, and provides a means of communicating the power from inside of the cell to the outside past the perimeter sealant which protects the electrolyte). This concept is discussed in more detail in FIG. 6 below. This type of an EC device using multilayer electrolyte is particularly favorable when plastic substrates (flexible or rigid) are used, as the transparent conductors available on these substrates are not highly conductive or may not even be present.

The thickness of the electrolytic layers 52*a*, 52*b* and 52*c* combined in some embodiments is approximately 0.1 mm to 2 mm. In some embodiments, thickness of each of the layers 52*a* and 52*c* is is in the range of 1 to 100 μm and in some embodiments, 10 to 50 μm. In those layers where the EC dye is present, its concentration may be approximately 0.5M or less, and in some embodiments 0.1M or less.

The concentration of lithium salt and plasticizer in each of the three electrolytic layers, 52*a*, 52*b* and 52*c* may be similar to encourage good ionic conductivity throughout the multilayer configuration. The other additives, such as UV stabilizers and polymers, may be different or the same in these layers. Also all of these three layers may be thermoplastics or thermosets, or the central layer may be a thermoset and the outer ones thermoplastics, or vice versa.

Figure 6:
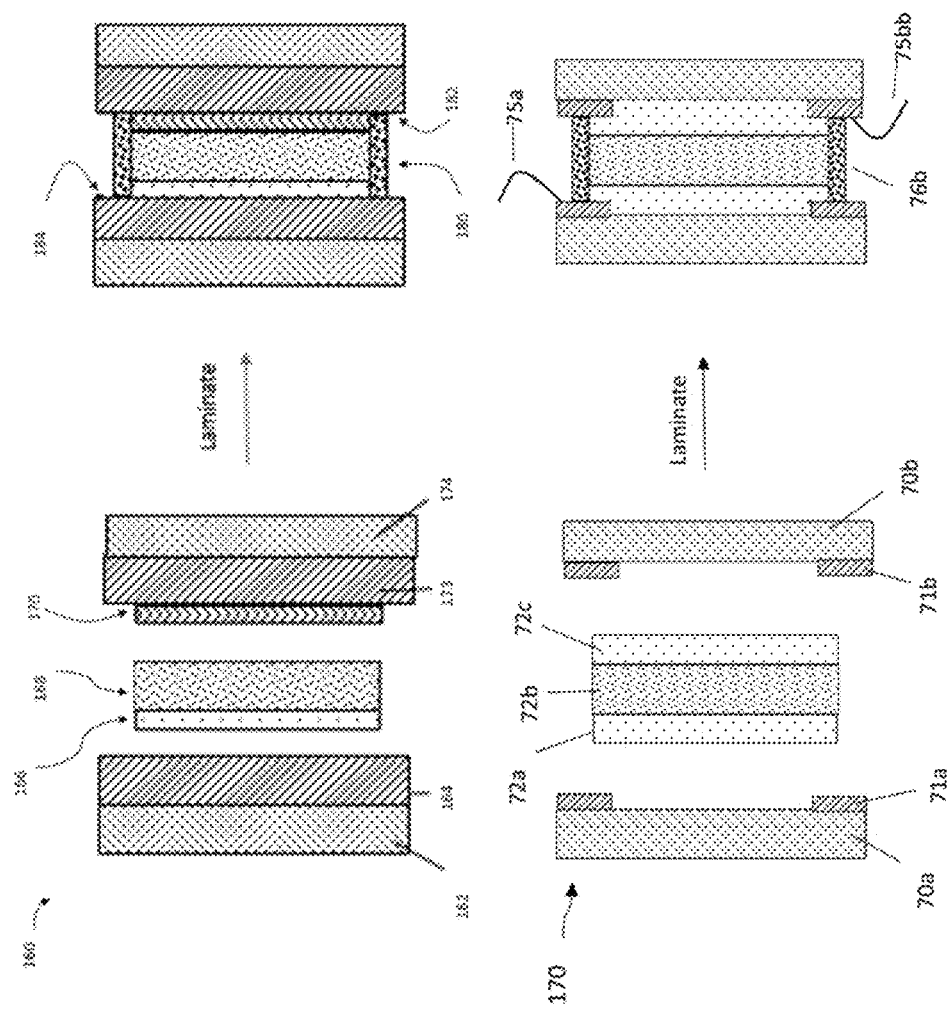

FIG. 6 illustrates two devices, where device 160 has a similar configuration as in FIG. 5 where the electrolyte layer has only two layers, 166 and 168*b*, where the composition of these layers is similar to the layers 52*a* and 52*b* (in FIG. 5) respectively, i.e., layer 166 has redox materials and conductive nanoparticles. Anti-iridescent layers if used between the TC and the substrates if used are not shown. Layer 170 has a composition similar to layer 52*c* in FIG. 5, i.e., this layer also is electrolytic with electronic conductivity comprising redox materials and conductive nanoparticles. Layer 170 assembled in the device as a coating deposited on substrate 174 which has already been coated with a transparent conductor 173, which is then laminated using this bilayer electrolyte with the other substrate 162 coated with a transparent conductor 164. The figure after lamination shows the sealant 180 and the points where the electrical leads are attached 184 and 182 to power the device. In an alternative assembly method, the layer with composition 166 may be coated on top of 164, and then an electrolyte with one layer i.e. 168 may be laminated to complete the device.

Another variation of an EC device of FIG. 5 is shown in FIG. 6 as 170, wherein there are no transparent conductors on either side. The substrate 70*a* has a layer of conductive material 71*a* (current collector) which runs substantially around the perimeter, similarly 71*b* runs around substantially the perimeter of substrate 70*b*. When the tri-layer film which comprises of layers of electrolyte 72*b* (which does not have redox materials and conductive particles) with the EC layers 72*a* and 72*c*, where both have electrically conductive and redox materials, is laminated and sealed at the perimeter using sealant 76*b*. Since layers 72*a* and layers 72*c* also are electrically conductive they are able to transfer the charge to the perimeter conductor (or current collector) 71*a* and 71*b* respectively. A system may have yet another busbar on top of 71*a* and 71*b* outside the sealant area (not shown) to further augment the conductivity of the current collector. The surface of the perimeter conductors that contact the trilayer film are to be made of materials which will not interfere with the EC redox reactions. For small devices (typically smaller than about less than few inches (e.g., interior EC mirrors for cars and small displays) a system may have the perimeter conductor only run on a system side of the device rather than around the perimeter. It is not necessary that the current collector is transparent. This layer may comprise multiple layers such as a metal which is covered by an inert conductive metal oxide to ensure that the EC and the counterelectrode layers 72a and 72c only touch the inert metal oxide of the busbar, but the underlying metal provides most of the conduction. As also explained in various variants of FIG. 5 (FIG. 6, device 160), that one or both of the layers 72a and 72c may be coated on the respective substrates and then assembled. The important issue is the presence of perimeter current collectors, and how the device is sealed so that the current collectors are able to allow the in-flow and out-flow of the electrons from the device while keeping the redox layers and the electrolyte sealed from the environment.

Substrate Considerations for Rigid Glass Windows

In various configurations, such as illustrated in FIGS. 1-3, rigidness of the structure is critical to some applications. For example, use in large area devices such as building envelops (i.e., exterior windows). In some of these situations, a polymer-containing electrolytic layer is laminated between two substrates, and where substantial amount of color is contributed from both of the electrodes, and the electrodes are separated by the electrolyte layer. Similarly, this includes situations where an EC layer is present on one substrate and there is a redox dye in the electrolyte. To maintain the rigidness of the EC structure as well as the electrolytic gap over a variety of conditions and stresses requires specific designs and applications. This is the case where the EC panel experiences large stresses during use. These large stresses in glass substrates may come into play due to differential thermal expansion of components and/or wind loads and so forth. If the electrolytic gap is not maintained, these conditions and stresses may give rise to splotchy coloration, such as during the coloration and the bleaching events. When a Substantial amount of color is contributed from both of the electrodes separated by the electrolyte, each of the electrodes shows more than 20% change in their optical transmission at 550 nm from their bleached to the most colored state of the device. In some embodiments, a cathodic EC electrode contains tungsten oxide which colors substantially and the anodic EC layer may have materials containing iridium oxide, nickel oxide, Prussian blue, and so forth which also color substantially. An example of this embodiment where both layers color substantially is discussed in US Patent Application having Publication Number 20140205748 for devices containing tungsten oxide and nickel oxide, which is incorporated herein by reference. Large area device means where the smallest dimension, such as width or height or length, of the window is about 0.5 m or more.

The rigidity of the structure may be improved by various methods. In a first example, the structure is made rigid by making at least one of the substrates forming the EC element thicker, such as the substrate facing the outside of the building. Another example uses heat for strengthening and/or tempering these substrates. In still another example, the structure incorporates rigid spacers within the electrolyte layer to bear the stress without deforming the soft electrolytic layer if the substrates experience deformation stresses. The glass substrates, particularly if the outside substrate has an EC coating which is in colored state, may reach a temperature of about between 65 to 90° C. or higher in hot bright climatic conditions. This is because the solar energy is absorbed in this layer and converts to heat. Thus, this sheet is thick so that it may be effectively tempered, or heat strengthened. Secondly if this is a thicker glass, this will hold up better against wind loads and will not deform easily; this also provides higher protection against deformation of the inner layers or substrates.

The glass substrates forming the EC element, particularly a system facing the outside of the building having a thickness of 3.2 mm or higher; and in another embodiment may be specified 4 mm or higher. In still another embodiment this may be 6 mm or higher. A typical desired range is about 4 mm to about 13 mm. Substrates greater than 4 mm in thickness are easier to heat strengthen to a higher degree (which includes tempering). The range between 4 and 11 mm has effective properties and keeps the weight of the windows reasonable. Further, this substrate is coated with an EC material or electrode having higher absorption or attenuation in the solar range (visible and NIR) compared to the complimentary coloring layer on the opposing electrode; and structures containing tungsten oxide in the EC device may be coated with this material. Depending on the attenuation of the solar energy from the first coated substrate, desired rigidity of the EC panel, the other substrate that is laminated may have similar properties (thickness or degree of strengthening) or they may be different in thickness. If the EC panels are used for interior partitions for privacy a non-strengthened glass may be used, and also thinner substrates may be used ranging from about 1.6 mm to 4 mm in thickness.

In another embodiment, spacers, generally spherical in shape, are introduced within the electrolyte to increase the rigidity of the gap, as the spacer size is close to the electrolyte thickness, and perhaps slightly smaller about 85-95% of the electrolyte thickness. The spacers may be polymeric, metal oxide or glass and having a higher rigidity or hardness as compared to the electrolyte composition within the temperature range of use. Further, in some embodiments, these spacers are porous, may have a specified pore size 5 to 300 nm, or be index matched to the electrolyte. Use of porous spacers allows the electrolyte or some of the electrolytic components during processing or use to penetrate its pores so that the spacers with filled pores have a refractive index similar to that of the electrolyte. Generally, if a laminatable polymer sheet is made, such spacers are dispersed in the electrolytic formulation prior to casting or extruding the film. Any of these methods allow spacers to be less visible while viewing through a window comprising these spacers. The index matching means that the refractive index of the spacers and the electrolyte is within 0.05 units or lower and may be specified within ±0.02 units to reduce their visibility, such as the published US Patent Application Number 20130128333. Both methods may also be combined that is thicker substrates are used along with the above described spacer types within the EC element of the windows. The use of spacers is particularly useful for semi-solid or gel like electrolytes, however for solid electrolytes with shore hardness in the range of about A10 to D55 (at room temperature) addition of spacers is not necessary.

Figure 20:
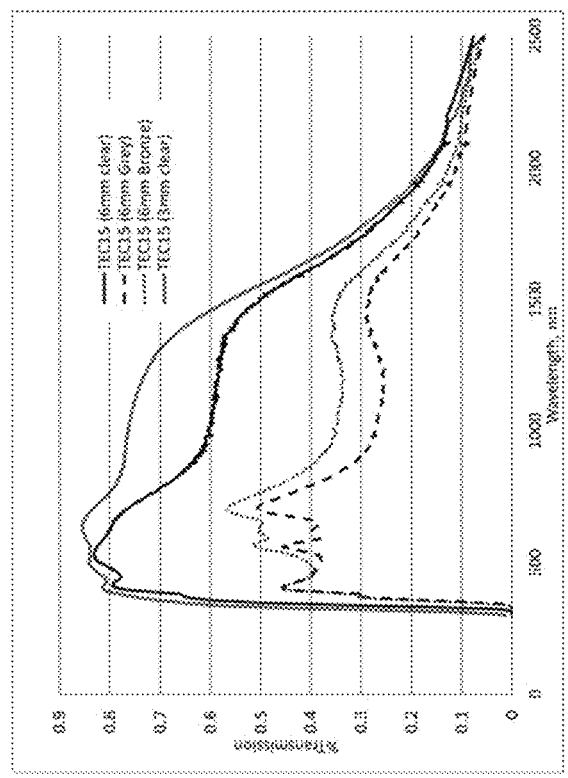
FIG. 20 illustrates a graph of some of the spectral characteristics of soda-lime glass substrates coated with transparent conductors according to an embodiment of the present invention, providing example behavior of an EC element relating transmission percentage to wavelength.

Further, one of the substrates forming the EC element may have an absorptive or a reflective tint. When used on the substrate facing outside such tint helps in reducing the solar energy on the EC element thus protecting it and optionally even imparting a hue to the light transmission. In a system embodiment the tint is complimentary in color as compared to the colored state coloration of the EC device if a system needs to impart more neutral color to the device in the colored state. For example, if the EC element turns to a blue color (in the colored state), combining that with a substrate with a permanent bronze hue will result in more neutral colored light passing through the window. In addition, during the daytime the perception from the outside is more indicative of the color of the outside panel rather than the color emanating from the EC layers placed inside of this panel. This assists with the building appearing more uniform from the outside regardless of the various EC tints selected by the occupants inside for their rooms or units. In some embodiments, this tint is more of a reflective color. The tint will reduce the light transmission through the window even when the EC element is clear. Thus, in some embodiments, when the EC devices are fabricated using the two substrates only the substrate facing the outside is tinted (for example substrates 11 and 30 respectively in FIGS. 2 and 3 or substrate 512*b* in FIG. 12). This reduction in visible light transmission due to tint through the substrate may be reduced by about 10 to 30% for residential constructions and about 10 to 50% for commercial constructions. FIG. 20 illustrates the transmissive spectrum of a TC coated fluorine doped tin oxide coated glass (surface resistivity 15 ohms/square) sold under the trade name of TEC® from Nippon Sheet Glass (Toledo, Ohio). Note the different tints and the thickness of glass. These substrates could also be obtained with different surface resistivities such as 15, 10 and 6 ohms/square and lower which are useful for windows, these coated glasses also have an anti-iridescent (AI) coating between the glass substrate and the conductive coating. In case their conductive coatings are deposited on substrates, it is desirable to have AI coatings so that objectionable colors are not seen when EC windows are viewed from different angles. For EC devices used for glazing that in the colored state appear blue or green, in some embodiments, at least one of the substrates (e.g. the substrate facing outside of a building envelope) may be tinted in a complimentary color such that the average light transmission in the region between 600 nm to about 700 nm are to be greater as compared to the average light transmission in the 400 to 500 nm region.

A system may also use a laminated substrate as a system of the starting substrates but has a total thickness of greater than 4 mm and has a tint. This would mean that the EC device construction will use three panes of glass rather than two. These constructions may be more suitable for those climates where significant wind loads are expected. One of the laminating glass elements may have a conductive coating which will face outside the lamination region to be a part of the EC device. For a tinted laminate, if used, the tint may come from the glass or from the lamination medium (typically a polyvinyl butyral, polyvinyl acetate or a polyurethane containing film is used in a thickness of about 0.5 to 2 mm, and more generally in the range of 300 to 800 μm).

Devices on Flexible Polymeric Substrates

In some cases, it is desirable to produce EC devices using flexible polymeric substrates (e.g., flexible polymeric films which are generally in a thickness of about 500 microns or less in thickness, and in some embodiments 250 microns or less) so that these devices may then be retrofitted (or adhesively bonded) on existing windows. For retrofitting, these may have adhesive layer (e.g., a pressure sensitive adhesive) on one of the outer surfaces of the substrates, which may be protected by a release layer until the EC film is ready to be applied on the window. This adhesive and/or the substrate on which this adhesive has been applied may also have UV additives to reduce UV transmission into the rest of the device. It is specified in some embodiments to cut 90% or more, and in some embodiments 99% or more of the solar UV energy in the wavelength range of 280 to 400 nm.

The polymeric substrate (or films) s may be single polymer films or multilayer film constructions to achieve better barrier properties as discussed below. Some examples of materials with better barrier properties against moisture and oxygen are polyethylene terephthalate (PET), polyethylene naphthalate, polyacrylonitrile (PEN), polyacrlyonitrile (PAN) containing copolymers, polyvinylidene chloride and copolymers containing polyvinylidene chloride, polyvinylidene fluoride, and a multilayer structure such as Polypropylene (PP)/Polyvinylalcohol (PVOH)/Polypropylene (PP), and so forth. A system may also use tie layers between various polymeric layers in a multilayered substrate to avoid any delamination. An important property of the plastics materials used are their barrier properties against water transmission and oxygen permeation, both are to be quite resistive to permeation of these materials (or the polymers are to have high barrier). For example, PET, PEN, and PAN are considered to have good barrier properties against water and oxygen, whereas PP has good barrier properties against water and PVOH has high barrier properties against oxygen. For devices designed to last long the superior barrier properties are specified to be superior. The permeability properties at room temperature of the flexible plastics substrates used are to be less than $1\times10^{-17}$ mol/(m·s·Pa) for oxygen permeability and less than $5\times10^{-17}$ mol/(m·s·Pa) for water permeability, and in another embodiment these numbers may be specified less than $0.1\times10^{-17}$ and $1\times10^{-17}$ respectively. These may be measured using ASTM methods D1434-82 (for gases) and E96/E96M-16 (for water).

Further, since these devices may get hot during use, particularly under bright warm conditions, they are specified to have low activation energies for permeation. i.e., their permeability increase with temperature is low. In some embodiments, the ratio of their increase in permeability from room temperature (25° C.) to 65° C. may be less than 3, or less than 2. The increase in gas permeability of the substrates with changing humidity are to also be low, this may be specified within a factor of 2 when the humidity increases from 50% to 90% at a given temperature in the range of operation. When EC devices are made using flexible substrates, they may also be bonded on to existing glass window. If the outside surface of the polymeric EC device will interact with users, and is not protected by another glass sheet, the EC device may incorporate a hard coat, or an abrasion-resistant coat, to reduce scratching. The hard coats are usually in a thickness of about 10 microns or less and may comprise inorganic oxide nanoparticles and when evaluated by ASTM method D1044 result in less than about 1% haze. Although any devices described in this disclosure may be made using flexible plastic substrate, but the devices described in FIGS. 5 and 6 are easier to fabricate using these substrates.

The TC's for the plastic substrates may be selected from two different categories, a system where conductive oxides are used, such as doped indium oxide and doped zinc oxide (such as ITO, AZO, respectively). However, since these oxide coatings are not formed at high temperature on plastics, their conductivity is limited. Another way is to put down coatings which has a dielectric/metal/dielectric type of structure, the dielectric may be conductive oxides mentioned above or other materials with limited electric conductivity but high transparency and inertness towards electrochemical reactions (e.g., SiN). The metals used are gold, silver, and so forth. These multilayer coatings have higher conductivity. Another way to enhance the conductivity is by having internal busbars. Details of this may be found in U.S. Pat. No. 6,317,248 the disclosure of which is included herein by reference. Particularly when metallic internal busbars are used then their surfaces need to be passivated from contacting the electrolyte.

Figure 10:
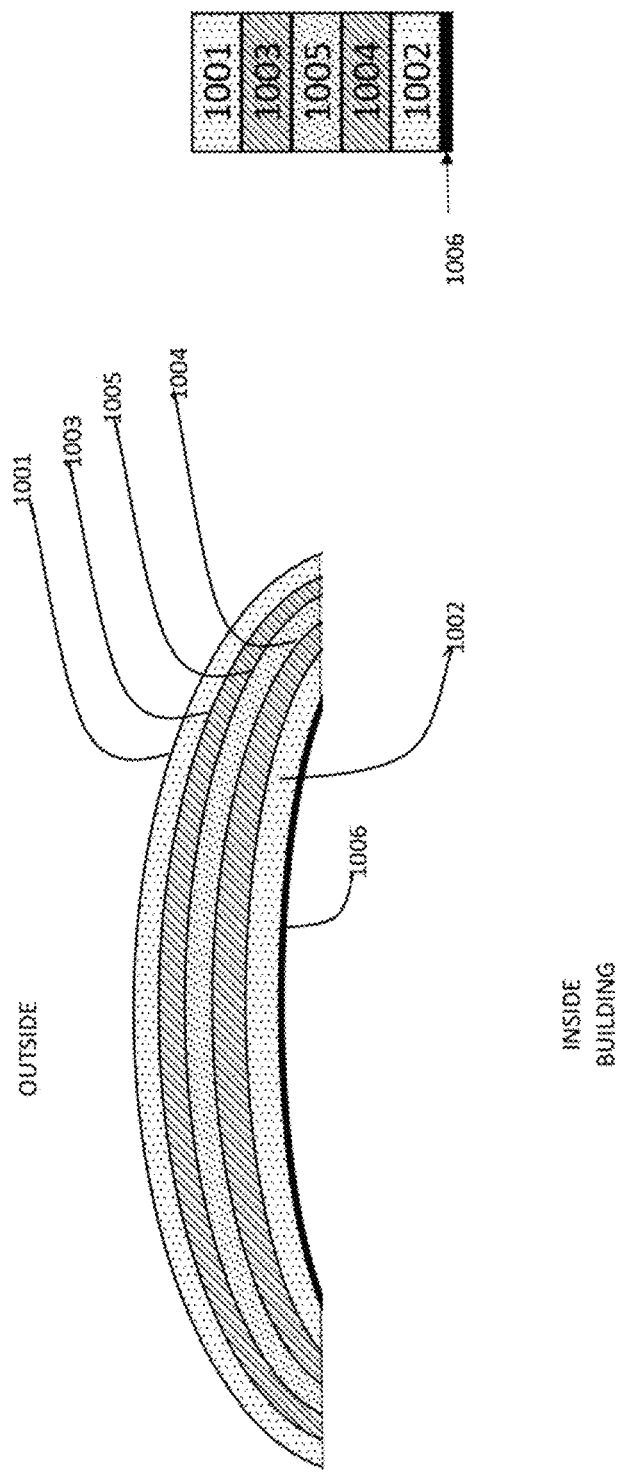
FIG. 10 illustrates a smart window system adapted to curved glazing, according to embodiments of the present invention.

Another use of flexible EC devices formed using flexible substrates is their use in non-flat glazing applications such as automotive windows or other applications. The curvature of the glazing may be non-planar (i.e., the bend is along at least two or more axes). Schematically this concept is shown in FIG. 10. In this figure details of the EC device are not shown. Typically, the flexible EC device (1005) is laminated between the two substrates of glass (or rigid plastic shown as 1001 and 1002) using two layers of adhesives or laminating sheets shown as 1003 and 1004. The outer glazing is 1001 and glazing side facing the inside of the vehicle or passenger cabin is shown as 1002. The adhesives may be formed on the outer surface of the EC devices and protected by release layers which are removed at the time of lamination. Given the curvature of the glazing, the thickness of the adhesive or the laminating sheets is important to ensure that the EC device is not unduly stressed after the lamination. Thus, thicker adhesives or the laminating sheets are used in situations where curvature is high or the tolerance or conformation of the bent substrates relative to each other is low. Typically, a thickness range of about 50 to 2000 µm for the adhesive or the laminating sheet is adequate for most applications. The outer glazing substrate 1001 and/or the outer adhesive layer or sheet 1003 may also be tinted as needed. The outer adhesive layer or the laminating sheet are to also provide high UV absorption by attenuating radiation below 400 nm by 99% or more or in another embodiment 99.9% or more to protect the underlying EC device.

Increasingly with the use of electric vehicles, the temperature management of the cabin (heating or air conditioning) is becoming more challenging as these functions require significant battery consumption. In order to make glass more energy efficient (and reduce glare) by imparting EC functionality, the glazing surface facing the interior may be coated with a low-E coating. One type of low-E coating is hard or pyrolytic type coating so that it is highly scratch resistant. The Low-E coating will reduce the radiative losses from the cabin in the winter while providing solar heating when it is bright outside if the EC element is clear. In summer under bright conditions, the EC component may be darkened to provide relief from solar heating, however, radiative heat (black body radiation) will be blocked from entering inside the cabin and reduce the air-conditioning requirements. The optional low-E coating, particularly for use in transportation glazing is shown as 1006 in FIG. 10.

Uses of EC Panels in Window Systems, their Operation and Powering

Figure 4:
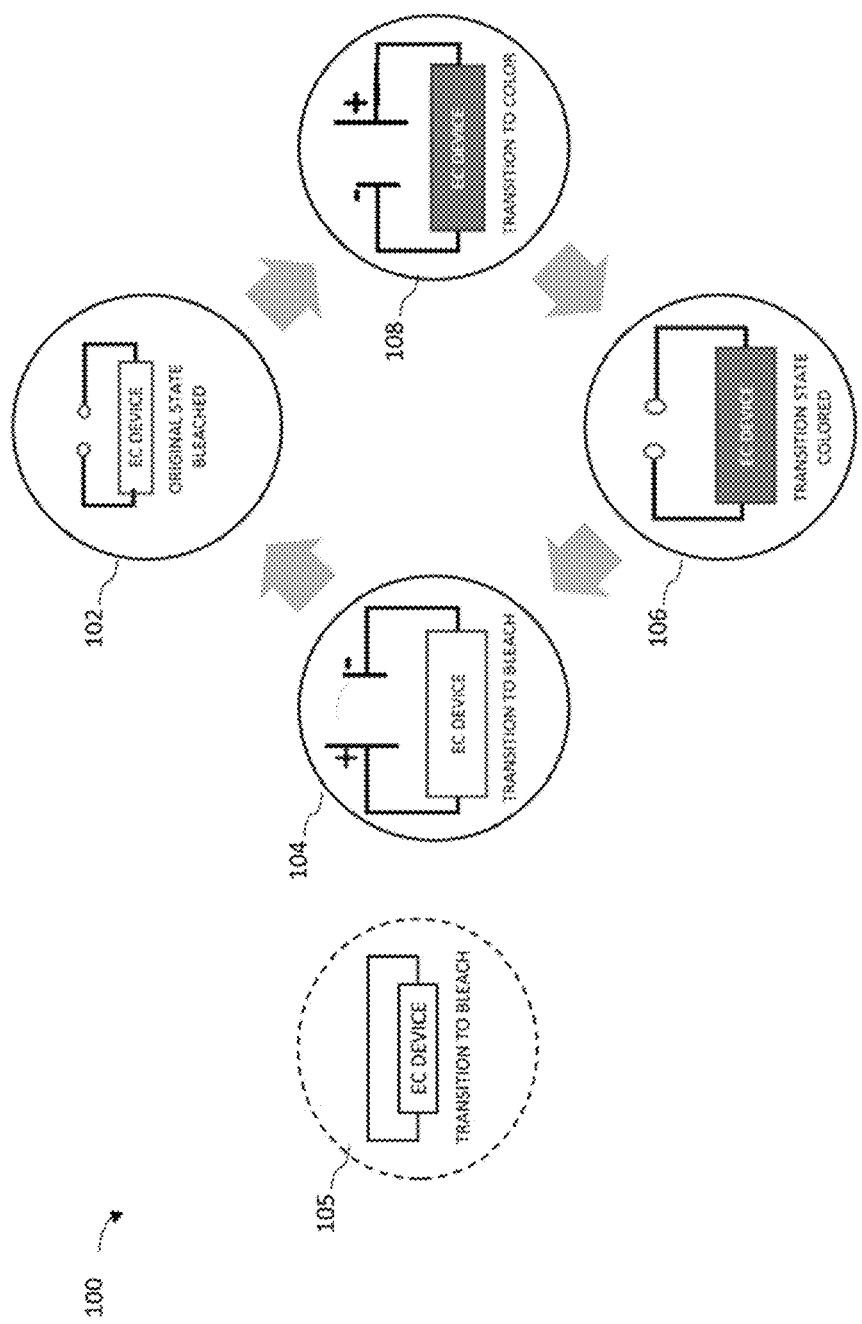
FIG. 4 illustrates circuit equivalents of an EC device as in FIG. 3, according to embodiments of the present invention.

FIG. 4 illustrates states and relationships in the coloration processes of EC device 40 of FIG. 3 and the equivalent circuits in the operational sequence.

State 102 has the EC device configured as an open circuit in an original bleached state. This corresponds to an equivalent circuit similar to circuit illustrated.

To transition to a desired coloration state, a coloration potential voltage is applied across the electrodes, state 108. This condition results in the redox activity that causes the EC layer to reduce (redox reaction) and transition to the desired color. The dye oxidizes and transitions to a colored state in response to the coloration potential. As discussed hereinabove, the dye may have a complementary coloring behavior to that of the EC layer, so that a negative voltage applied to the cathode, has a similar behavior as illustrated in state 108, they both darken.

Once the device transitions to a desired color, the state 106 removes the applied voltage. The equivalent electrical relationship is an open circuit, where the coloration state is maintained. This may be thought of as a hold step, where the EC memory causes the ions to stay in their transitioned locations.

To transition to a bleach state, state 104, a reverse coloration potential is applied across the electrodes. Once the bleach state is reached, the circuit equivalent is again an open circuit, state 102, which maintains the bleached state. Alternatively, to get to the bleached state, from state 106, the electrodes are short circuited, state 105, which pushes the redox relationships to return to their original states, specifically, the EC layer oxidizes, and the dye ions reduce. In the bleached state either open or a close circuit is maintained.

In the EC devices of various embodiments of the present invention, the configuration is designed to achieve efficient power consumption. This enables such device to be kept in a desired state of coloration with little-to-no additional applied power. The ability to reduce the power consumption makes these inventive configurations particularly applicable to large buildings, where the EC devices may be powered by a solar cell (or any other type of energy harvest module) connected with a capacitor to be able to provide instantaneous power required for transitioning or maintaining the color during intermittent periods of power which is then backed-up rechargeable battery and/or another capacitor. The energy harvester also replenishes any power drained or used by the backup For those windows, where the solar cells are mounted in the window frames for retrofit systems, the types of solar cells (taking into account their efficiency and local climate including solar radiation intensity and directionality characteristics) are to be those so that their area is small, typically less than 2% or less as compared to the window area and in another embodiment typically less than 0.5% or less as compared to the window area. The solar cell, powering circuitry, communication circuitry and backup power devices, if used, may be integrated in a system electronics package. This allows these packages to be easily assembled in the window frames and then have these windows retrofitted in buildings without any external wiring.

In some embodiments, a smart control mechanism determines the optical state of the electrochromic device (or panel), which could be indirectly monitored by its electrical characteristics. The electrical characteristics may also be used to determine if a device malfunctions. There may be several ways to accomplish this, however, one embodiment is discussed below. This smart control mechanism measures parameters of the EC device, such as peak current, current decay rate, steady state (or leakage) current, and/or total current consumed in the coloration or bleach step, as well as its optical state (if it is colored to a certain extent or bleached) while keeping a record of the device temperature, its shape and size, and open circuit potential decay after removal of powering potential (coloration or bleach). These numbers are compared with those in a look-up table and/or based on the historic data both for feedback in terms of continued application of power and to ascertain that the window is working as expected. In case it is assessed by the control system that there is a malfunction, the user and/or a service provider could be alerted.

Some of the parameters which are indicative of EC panel malfunction under similar temperature and powering potential conditions for a window of a given shape and size are excessive increase or decrease in peak current, excessive increase in the steady state current and excessive decay of the open circuit potential after powering voltage is removed. In a system embodiment, excessive means more than 30% change or more in these parameters and in another embodiment excessive means a factor 60% or more change in these parameters as compared to an established norm. The nominal numbers are dependent on the inherent details of the device, for example, details of the materials, layer configurations, material types and their concentrations used in device fabrication, thus it may be difficult to list these for a generic device.

When a powering voltage is applied (a ramp or step), the current reaches a steady state signifying that the coloration or the "maximum optical density" corresponding to the "maximum potential" being applied has been reached. Again, the value of this current is dependent on the inherent device characteristics, the temperature and the shape and size. After the "maximum potential" has been applied or reached, the clock is reset, and the current is measured on a periodic basis to determine when the steady state value is reached. The steady state current is defined as equal to or less than "xc" percent change in current over any previous measurement 15 seconds before, and in a system embodiment "xc" is 5% and in another embodiment, it is 2% and yet in another embodiment it is 1%. Once the steady state current is reached the initial value of the open circuit potential is measured. As discussed later, for a given device, the open circuit potential is an indication of the optical density (or extent of coloration) of the EC device. The open circuit potential is then measured on a periodic basis which may be several seconds, or minutes or tens of minutes or hours apart. This time period may be temperature dependent, where it is shorter at higher temperature. The EC devices of this invention may be considered more closely as a charged capacitor. This capacitor loses its charge (or color) gradually, the rate of which depends on the temperature and the level of coloration (charge amount). The rate of charge or color loss is higher at more elevated temperatures and higher if the open circuit potential is higher (i.e., deeper color). When the open circuit potential decreases below "y" of the initial open circuit value, then the "maximum potential" is applied again as a step or a ramp from the open circuit potential reaching the "maximum potential". The "maximum potential" is applied until the current reaches a steady state as discussed above. This sequence is repeated until the user or the system determines to change the optical state of the panel, wherein a different potential is applied. In one embodiment "x %" and "y" are 40% or lower and 0.3V or lower respectively; and in another embodiment these numbers are 20% or lower and 0.1V or lower respectively.

Typical "maximum potential" applied to color the devices of this invention are generally limited to about 2.5V. In the colored state, the steady state (or leakage) current or loss of charge in the colored state under open circuit conditions are to be minimized. As a low value of charge loss under a given condition leads to a higher memory (i.e., the devices keep their optical state without applying the power for a longer time period). In a system embodiment the loss of charge measured as current in the fully colored state may be designed to be less than approximately 1 $\mu A/cm^2$ or 10 $mA/m^2$ (area is of the active area of the device) at 25° C.

In some embodiments. EC devices may be bleached by shorting the electrodes and therefore, this means that the system does not need to apply a reverse potential, wherein the reverse potential is opposite the coloration potential or charging polarity. When shorted the charge previously accumulated to color the device is leaked, and rather than wasting this charge, the system may use this to recharge (or recycle the power) the power source. In some embodiments, energy is directed to a secondary energy storage unit, such as into the electronics with enough capacitive storage or a rechargeable battery. This is then used for replenishment when backup power was used or a discharge occurred in the battery. This increases the efficiency of power consumption in these glazings. The recycled power is then used for any of the desired operations such as for communication, operation of power supply, change in the optical state of the EC device, or to maintain its coloration, etc.

Figure 7:
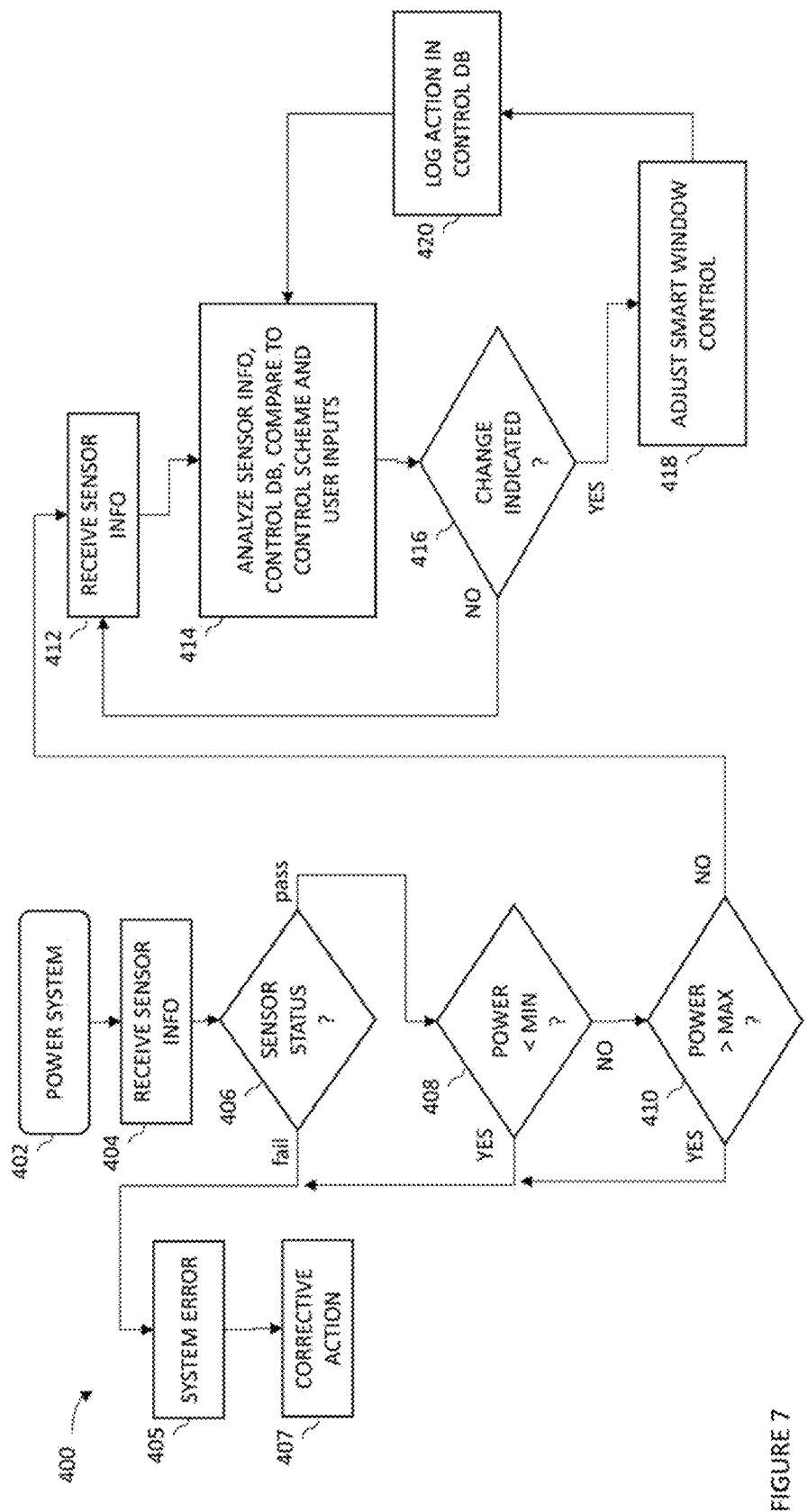
FIG. 7 illustrates operation of an EC device and system according to embodiments of the present invention.

FIG. 7 illustrates a process 400 for operation of an EC system where the power system 402 initiates and receives sensor and/or user information 404. The sensor status is evaluated 406 to determine if the system is ready for operation. If the sensor status fails, the system error is identified 405 and corrective action taken 407, else the system determines if power is less than a minimum 408. If the power does not satisfy the power range, processing goes to identify the error 405, else processing continues to determine if the power is greater than the max 410. If the power is out of range, processing continues to identify the system error 405, else the system receives additional sensor and/or user information 412. The system then analyzes the sensor information to determine the information indicated 414. The sensor information is compared to a control database that includes scenarios and actions to be taken on given conditions. This is considered with respect to a control scheme predetermined for the system, or which may be adjusted dynamically in response to sequences of events or trigger conditions. The system also considers user inputs, such as where the user desires a darker room during the day such as to view a video presentation. If a change is indicated by this analysis and processing, 416, processing continues to adjust the smart window control 418 and log the action in a control database, 420; else processing returns to receive more sensor information, 412, and analyze same, 414. If actions are logged into a control database, this information is available for analysis as in step 414.

In this way, the system uses the sensors available to determine operational continuity of the system. A system may be configured to take specific actions in response to various sensor levels. A room scenario is built considering a variety of environmental conditions. For example, the system may use temperature and light in the room to determine the correct shading of the window. The sensors may provide room temperature, thermostat setting, number of people in the room, the humidity in the room, as well as external conditions. External conditions may include temperature, haze, visibility, precipitation, brightness, cloud cover, direction of the sun relative to the window and others. Additionally, the external information may include energy harvested power, such as solar cell power, which may be used to power the smart window and where such harvested energy may be stored locally in a battery for a backup or a super capacitor for later smart window use. The electric power being harvested from the solar cell may also be used as information on the solar intensity incident on the window. This information is mapped or allocated to specific scenarios for action to take. This action may take the form of applying and/or adjusting the coloration potential across the electrodes of the smart window EC device.

Many external conditions originate from incident light from the sun, as illustrated in FIGS. 8 and 9. This construction shows a window for architectural use in a double pane IGU configuration 302, outer pane having an EC panel, which itself is a laminate as identified in FIGS. 2, 3, 5 and 6. Another glass panel or pane 305 includes a low-e coating or film that allows most of the solar radiation in the VL and NIR to pass through. For EC devices as described herein for a variety of applications, as illustrated in FIGS. 2, 3, 5 and 6. This gap between the panels of the IGU may have air, or a low thermal conductivity gas such as argon, krypton, xenon, sulfur hexa-fluoride, mixture of these gases or be even evacuated for lowering the thermal conductivity through the glass section of the unit. For very high-performance windows, it the edge spacers used to separate the various panels in the IGU are to be of very low thermal conductivity. One surface of the EC panel of the outer pane that faces the gap, or the inner pane, is coated with a low-e coating. In this figure, the surface of the inner pane facing the gap is coated with a low-e coating (as shown by 306 and 316). When the outer pane is dimmed, as in FIG. 8, much of the incident light is blocked by the outer pane. Since most of this blockage occurs by the outer EC pane absorbing the solar light (mainly in the visible and the Near infra-red or NIR region, between 400 to 2,500 nm, this energy converts to heat which raises the temperature of the outside panel and radiates the heat both outside and in the gap. It is desirable in most buildings (for example, other than green-houses) to attenuate the UV at all times. The UV stabilizers and absorbers in the electrolyte and the redox containing layers will attenuate most of the UV, and in a system embodiment it is desirable to reduce UV (radiation below 400 nm) by 99% or more and in another embodiment by 99.9% or more. Radiated heat is shown by squiggly lines of FIG. 8. The low-e coating on the inner panel prevents this heat from entering the building and reflects it back towards the outer pane. Thus, only a reduced portion of energy reaches the inside of the building, such as direct unattenuated solar radiation in the visible and NIR, as the energy converted to heat is blocked by the low-e coating. Control of the solar energy is managed by control of the EC transmissivity on the outer pane. When the outer panel as in FIG. 9 is clear, solar energy in the visible and NIR passes through the EC panel and also through the low-e coated inner panel into the room. This visible and the NIR energy is not blocked by the low-e coating. Only the radiated heat energy (i.e., black body radiation) entering the room is controlled or blocked by the low-E coating. Black body radiation is typically between 2.5 m and 50 µm or generally more concentrated in 5 µm to about 50 µm.

The EC devices and their use in IGU described herein aid the design of energy efficient buildings and operations. In summer or hot days, the EC panel is colored to block the transmission of the solar visible and the NIR from entering into the building, and in addition any excess blackbody radiation created by hot EC panel is blocked by the low-e coating. In winter or colder days when heating from the solar energy is desired, the EC panel is clear and most of the Visible and the NIR energy passes through this panel and also through the low-e coating and enters the building. Thus, the low-e coatings which are suitable for use with those EC panels that are able to control the solar energy both in visible and NIR are to be of the type that only block radiation typically above 2.5 µm. These are different from the low-e coatings used on passive window systems where the transmission is not varied. In the passive windows depending on an average climate of the reason these coatings are designed to block most of the solar energy in the NIR region and maintaining just an adequate transmission in the visible region, sometimes also called as Solar low-e. Thus, in a system embodiment, the solar transmission of the low-e glass used is greater than 50%, in another embodiment this is greater than 60% and yet in another embodiment it is greater than 70%. Further, in a system embodiment the emissivity of the low-e coatings used in the applications envisioned in this document is 0.2 or less, in another embodiment 0.1 or less and yet in another embodiment 0.05 or less and in some other embodiments this may be less than about 0.025.

In a multistoried building 500 shown in FIG. 11, where each story has multiple windows, such as window 502, where one or more of the windows is a smart (EC) window IGU and also these windows may have different transparency requirements. The various methods and techniques described herein may be used in this building, where a single type of smart window may be used throughout or a combination of different types of smart windows may be used for optimizing the flexibility and responsiveness to meet the goals of the builder. In the building example 500, the solar cells are placed in the spaces between the see-through regions of windows called the spandrel area, where the EC element is only located in the see-through area. In this way, the solar cell does not have transparent portions, but rather may be configured in a variety of ways. The ability to place the solar cells proximate the smart windows dramatically reduces the conventional methods of extensive wiring throughout the building and around the window. In the embodiments of the present invention, the wiring is configured minimally at the perimeter of the window as only a small amount of power is used for color transition and low-to-no power is used to reverse the color transition. The solar cells may generate more energy than incorporated to power the EC windows, and that may be used for other tasks in the building and/or returned to the utility grid.

FIGS. 11-13 illustrate more detailed views of a multistoried building 500, wherein the façade 506 is coupled to spandrels 504 configured between windows 502 and also proximate glass doors 508. The placement and configuration may be designed according to design goals and usage patterns of the building 500. The doors and windows 508, 502 may have electrochromic elements and the spandrels 504 may have building integrated solar cells.

FIG. 12 illustrates the window in a double pane IGU configuration comprising an EC element 512 made by the present invention coupled to another glass pane 502, both placed in parallel with a gap 510 as discussed earlier. The EC element 512 comprises of the two substrates 512*a* and 512*b*, with various layers and electrolyte as discussed above shown collectively as layer 514. At least one of the window surfaces 2, 3 and 4, identified by numbered arrows, are coated with a low-e coating (not shown).

The system may use an EC panel as one of the three panels in a triple glazing to increase insulation, where each panel is separated by a spatial gap. In some embodiments, the EC panel is used as the outermost panel (and in other embodiments the EC panel is used as the panel in the center). The chambers between the panels, i.e., between the outside and the middle panel or between the middle and the inside panel is filled with an insulating gas or be evacuated. In a triple glazing structure, a low-e surface is typically stationed on a surface which is interior with respect to the EC panel.

FIG. 13 shows schematics of a building integrated solar cell configuration for the spandrel area. This is also integrated using an IGU type construction. Where the laminate 562 includes solar cells. Typically, the solar cells are placed in layer 564 with laminating films on both sides (these sub-details are not shown), and then laminated to the substrates 562*a* and 562*b*. This is assembled in an IGU configuration as discussed above for the EC panel with substrate 550 providing a gap 560 which is filled or evacuated as above. The solar cells for use in spandrel area are generally opaque and substrate 562b is highly transparent to maximize the amount of light hitting the solar cell. Optionally as above at least one of the surfaces identified by arrows 2, 3 and 4 may be coated with a low-e coating (not shown) as discussed above.

Figure 14:
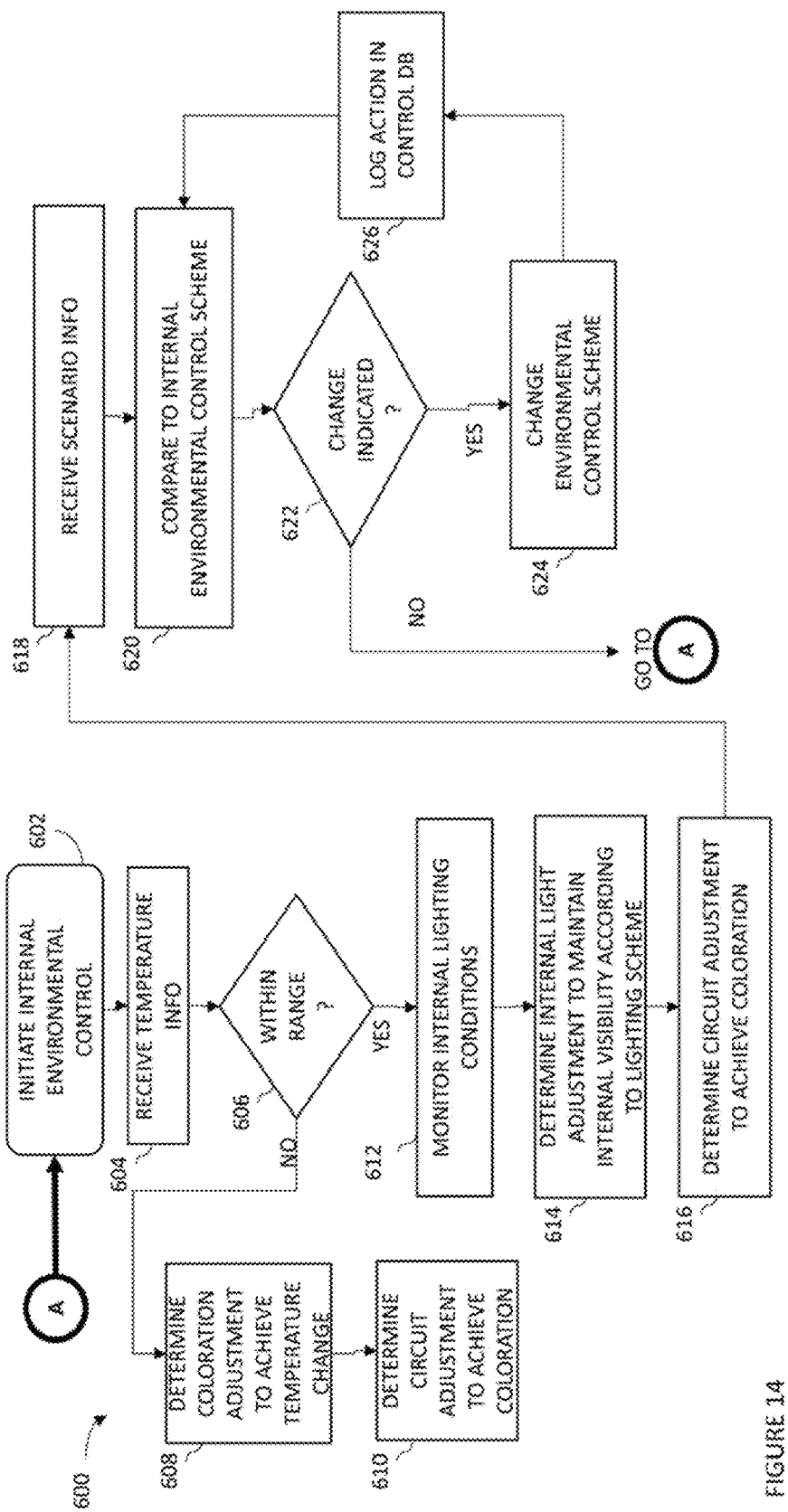
FIGS. 14 and 15 illustrate operation of a smart window system in a building according to embodiments of the present invention.

FIG. 14 illustrates a method 600 to control the internal environment and the smart window operation. The process initiates for the internal environmental control, 602. The process receives temperature information of the building interior and exterior, 604. If the interior temperature is within range, 606, processing continues to monitor internal lighting condition 612; else processing continues to determine if there is a coloration (tint) adjustment suggested to achieve temperature change, 608. The system then determines the circuit adjustment to achieve a desired coloration. 610.

From step 612 the process determines internal light adjustment to maintain internal visibility according to a predetermined or user-adjusted lighting scheme, or maybe overridden by the user, 614. The system then determines the circuit adjustment to achieve the desired coloration, 616. The system receives or retrieves scenario information based on the information received so far, 618, and compares the internal environmental information to the control scheme corresponding to the scenario information, 620. If no change is indicated, 622, processing returns to A, and if a change is indicated, 622, processing continues to change environmental control scheme, 624, and the action logged into control database, 626. This information is fed back into step 620.

Figure 15:
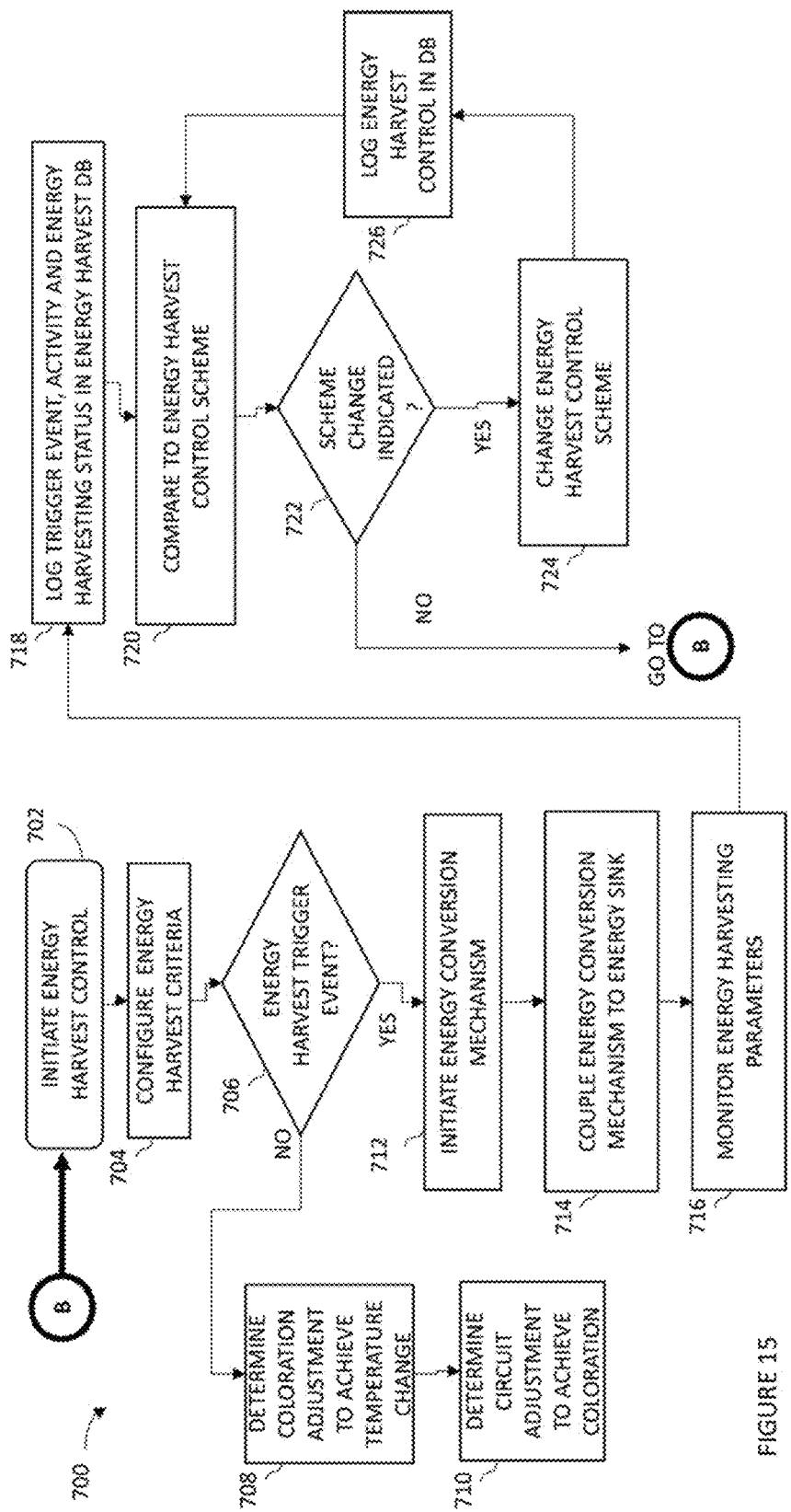

FIG. 15 illustrates a process 700 for control of energy harvest control, initiated at step 702 where the system then configures for energy harvest criteria, 704. If an energy harvest trigger event is detected, 706, processing continues to initiate energy conservation mechanism, 712; else processing continues to determine coloration adjustment to achieve temperature change, 708. The energy conversion mechanism initiates to couple energy conversion mechanism to energy sink, 714. The process logs the trigger event, the activity, and energy harvesting status in an energy harvest database, 718. This is then compared to an energy harvest control scheme 720. If a scheme change is indicated, 733, the process changes the energy harvest control scheme, 724, and logs the energy harvest control in the database, 726.

Figure 16:
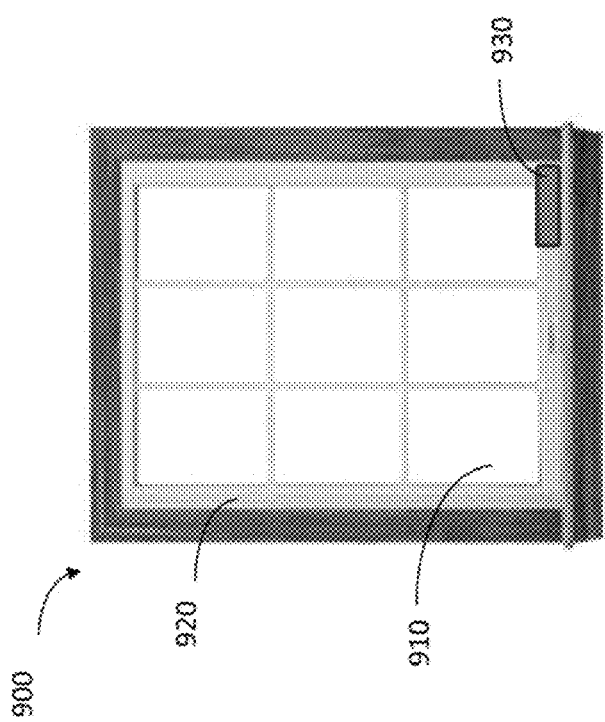
FIG. 16 Illustrates a window schematic and a powering system for a variable transmission element in a window system according to embodiments of the present invention.
Figure 17:
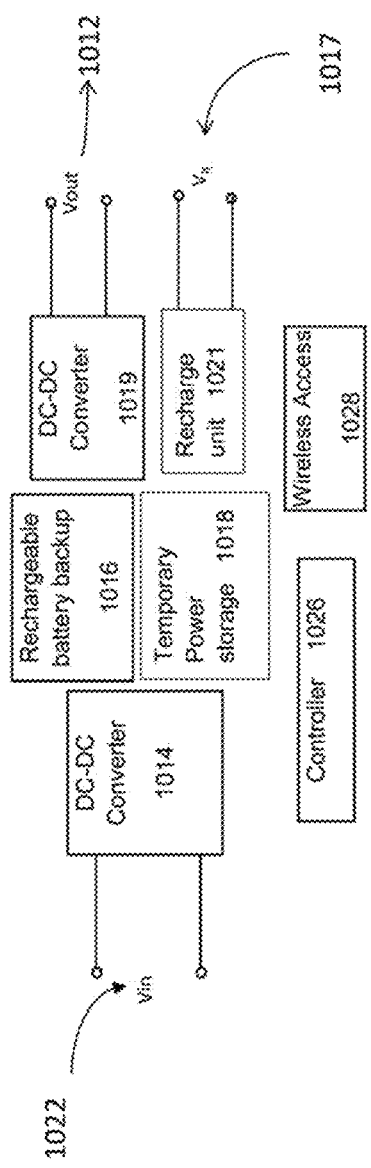
FIG. 17 Illustrates a control system for the window system comprising the variable transmission element according to embodiments of the present invention.
Figure 18:
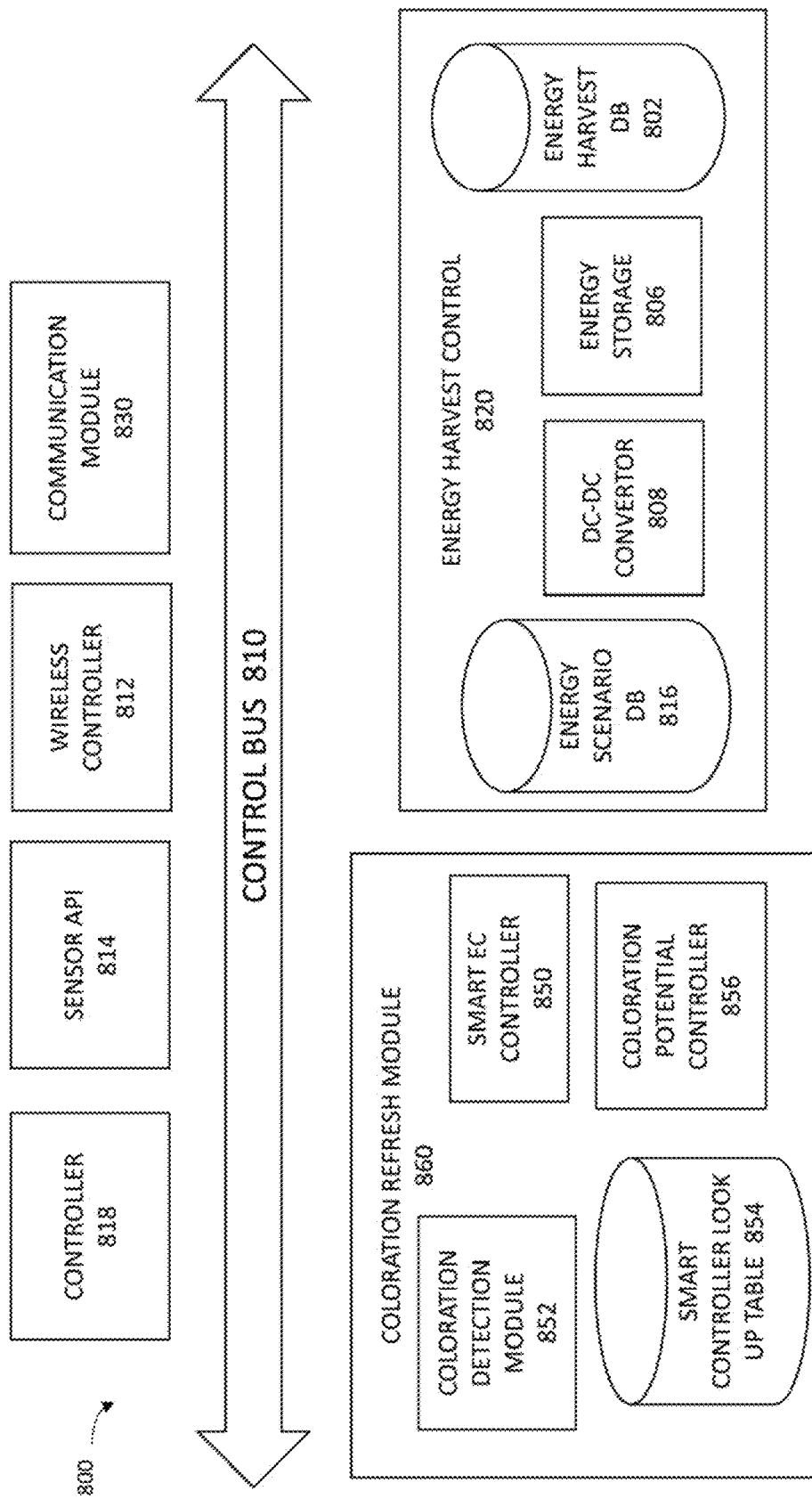
FIG. 18 illustrates a control system for window system according to embodiments of the present invention.

FIG. 16 illustrates a window 900, or IOU, having a control device 930, a window pane 910, and a window perimeter 920. This window is an example to illustrate the features and placement of devices in a smart window of the present invention. FIG. 17 illustrates a control system, such as in window 900 and is described herein below. FIG. 18 illustrates a smart window system and energy storage control system 800 configured to receive electrical energy as energy harvesting for storage in the energy storage 806, and includes DC-DC Converter 808 (coupled between the storage unit 806 and the EC panel of the window) and energy harvest database 802. The control bus 810 manages communication within the system 800. The system 800 includes a wireless controller 812 to enable wireless control of the system by a user. A sensor Application Programming Interface (API) 814 is configured to retrieve and receive sensor inputs from a variety of sensors in the environment. An energy scenario database 816 stores specific details of the sensor conditions and ranges that correspond to specific control schemes. These are used to control the energy harvesting activity, storage of energy, use of energy in control of smart windows, and storing information related thereto. The system controller 818 is configured to learn from behavior of the system, including the system's response to actions taken and the incorporation of user control. In this way, the system receives feedback as to sensor input combinations that resulted in a specific action(s) and the results of those actions. A system consideration may be such as when a user fine tunes or adjusts the automated response of the system; this action may be stored and tracked to determine if the automated settings are sufficient. This information is put into the databases and part of the controller 818 analysis.

EC devices are powered by low voltage DC power. Typical safe coloring potentials are from about 0.8V to 3V, and bleach may be carried out by shorting the devices or applying reverse potentials up to about 3V. These potentials are dependent on the type of devices and the materials used to make them (including the type of redox dye species and the EC layers used in the device of the present invention). The devices of this invention with the redox species in the electrolyte, typically incorporate a coloring potential of about 0.8 to 2V at room temperature. At 0.8V coloration is shallow and becoming more intense with increasing potential, thus providing a gray scale capability. When using voltage as a driver a system may also detect the end point and remove the voltage once the current falls below a certain level or a certain amount of charge is passed. It is usually not desired for the longevity of the devices to keep applying a potential after the desired state has been reached. Although a system may intermittently apply the voltage to keep the device in an optical state and remove this after the current falls below a certain level or a certain amount of charge is passed, or even time the voltage application period if the device characteristics are known. All these parameters may be temperature dependent.

As the device size increases, the device kinetics slows down due to the charge carrying limitation of the transparent conductor (or the resistivity of the transparent conductor). For most practical devices, the powering may also be done (coloring and bleaching) using current sources subject to a maximum safe potential. The powering safe potentials also depend on the temperature of the device and this dependence are to be established for a given type of device. Typically, lower voltages are used with increasing temperature and higher voltages are incorporated at lower temperature for devices with redox dyes. As an example, for the devices of this invention, the maximum coloration potential at 80° C., is lowered by about 0.1 to 0.3V as compared to 25° C. Similarly, at lower temperature, e.g., at 0° C. it may be increased by about 0.1 to 0.2V as compared to 25° C. to provide adequate kinetics (this is primarily due to the change in resistance of the cell, ionic movement in the electrolyte and in the electrodes and a change in redox potentials). The temperature of the EC panel or window may be measured and then a look-up table stored in the system memory is used to determine the desired powering conditions.

When a step potential is used as the driver for windows then with increasing window size a step potential to color the window may cause the window to color non-uniformly during transition. That is the window will start coloring at the edges (near the perimeter busbars) more deeply and gradually the color will migrate to the center of the window. Similarly, when a bleach voltage is applied, the window may first bleach near the edges and later from the center. This is also called an iris effect and for windows it is often desired to reduce or even eliminate this.

The iris condition may be overcome by judiciously choosing the powering conditions. A voltage driving method to overcome this is disclosed. For a given device at a given temperature, a minimum voltage $V_1$ is applied before discernable color change takes place, and $V_2$ is the voltage at which the device is powered to achieve a desired optical state. Further, had $V_2$ been applied as a step voltage to the window (or the EC panel) for coloration while starting from the bleached state, the window would have taken time "$t_1$" to color while showing the iris effect. Time to color means for the panel to color to 80% of the total range as measured in the center of the panel. For EC devices, this speed will decrease with increasing size, such as with increasing distance between the edge busbars. As a first step, to reduce iris, a system may use the following multistep or a ramp process; (a) apply a step of $V_1$, (b) apply the additional voltage using a linear ramp increasing at the rate of $(V_2-V_1)/(t_1 \times f)$ and (c) hold the voltage at $V_2$ until the end condition is reached, wherein the current reaches a steady state value. In some embodiments where the leakage current is lower than about 10 mA/square meter of the active area, a system may measure the total amount of charge passed (or charge passed/active area of the device) to determine the end point without introducing significant error in the "charge calculations". The factor "f" ranges from about 0.3 to 5 to modify the time for ramp. If using f=0.3, the ramp period is 30% of the time to color when applying a step potential only. If use of f=0.3 does not reduce the iris effect to a desirable level, a system may increase the value of "f" as much as five, until the desired condition is reached or may also utilize a non-linear ramp. As explained below, control of these parameters allows a system to control the transition rate of windows of different shapes, sizes and which may also be experiencing different temperature conditions.

The value of $V_1$ and $V_2$ will depend on the type of EC device, the redox potentials of the EC materials including their concentrations, ion conductivity, and conductivity of the transparent conductors. Since, these are temperature dependent for a given device the potentials will be also temperature dependent. For large devices (where the powering busbars are about 0.5 m or wider) $t_1$ and f will also depend on size, shape along with temperature as explained above. Since a room may have several windows with large variation in shapes and sizes and may even experience different temperature depending on their direction and solar intensity, it is important that in most situations when the system calls for changing the optical density of the windows that they transition uniformly and at about the same rate, at least as it appears to average human eye (photopic). Assuming the EC devices will use the same materials, $V_2$ and $V_1$ will be the same at a given temperature and with the same temperature dependence. This data is stored in a look up table and depending on the conditions factor "f" is calculated for the windows so that this may be different for different windows but the transition rate for the windows is approximately the same. For larger windows, "f" would be smaller. As a practical step, a system may determine the condition for the slowest (typically the largest) window, the "f" value and use that driving protocol for the windows. The largest window in this context is a system where the separation between the powering perimeter (or edge) busbars is the widest. In summary when a condition is imposed by a user or the system to drive a set of windows of different shapes, sizes and stages of aging, so that they transition through the optical densities at the same rate, then different driving conditions have to be used for these windows. These driving conditions may be calculated by the controller automatically.

Temperature dependence of the various factors such as safe redox potentials, peak currents, times, etc., are typically measured experimentally and stored in a table at several temperature points or at the end points as in the system for the application, and then these may be interpolated between these using linear or non-linear relationships. If non-linear relationships are used these could take the form of an Arrbenius or Williams-Landel-Ferry (WLF) type relationships, where coefficients used in these relationships are determined experimentally.

Aging factor is explained below which may be different for different windows depending on their orientation to the sun, shading or shadows casted from nearby structures or vegetation, number of cycles experiences as compared to the other windows in a set, etc. As the device ages and its resistance changes, a system may again actively measure this change and accordingly vary the powering protocols and adjust the lookup tables discussed above, particularly increasing the $V_2$ value in steps of about 0.1V subject to a pre-determined maximum safe potential after which the window has to be replaced. The aging may be seen by measuring the integrated current (charge passed) until the steady state value is reached after which the device is maintained in to an open circuit mode. The integrated current will typically decrease with aging, and a predetermined limit can be set after which the window is to be serviced. The integrated current is normalized to the active area of the window. Similarly, a sudden increase in steady state current (under a specific temperature conditions) being supplied to a window, or a gradual increase, both by a pre-determined factor shows a malfunction of the window which would then need servicing.

Figure 19:
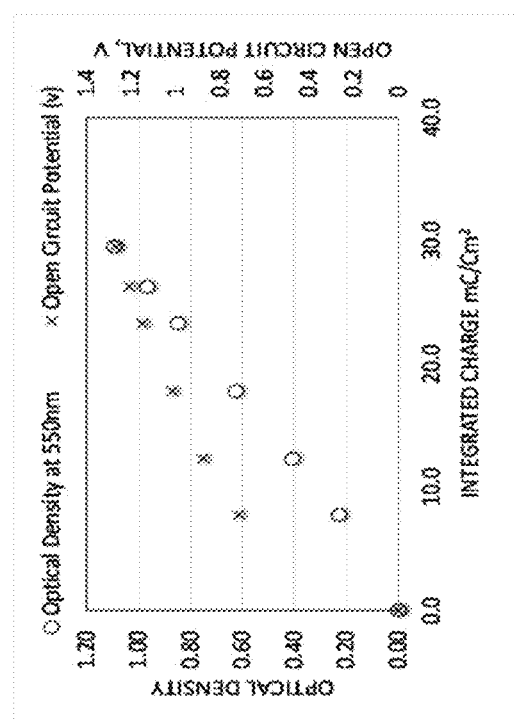
FIG. 19 illustrates a graph of optical density as a function of integrated charge, according to embodiments of the present invention, providing example behavior of an EC element related to voltage, coloration and charge consumption.

In the devices of this invention a substantial advantage is that most of the charge stored in the colored state of the EC device may be recovered during bleaching, i.e., going from a first optical state where the electric potential difference between the two opposing electrodes forming the EC device is high to the second optical state where this potential is low. FIG. 19 illustrates the potential across the two opposing electrodes of a device, coloration level and the amount of charge (see Example 10 for device details) as in an example embodiment. It is interesting to note that both optical density (OD) and the open circuit potential are linear against the injected charge and also OD and the open circuit potential are linear against each other. For those wire-free devices where locally generated power (e.g., by a small solar cell) is used to power an EC device, power recovery may be important. The solar cell may not be able to generate sufficient power to meet the peak power requirement required by the cell, particularly when a an EC cell is being colored soon after being bleached. The recovered power may be temporarily stored, such power may be used to augment the power supply. The storage may be capacitors and also a backup rechargeable battery. This allows the device to draw upon the instantaneous power requirements if the power generator is not able to supply this power and the rechargeable battery and/or the capacitor is not charged sufficiently due to a recent window coloration. This helps to reduce the size of the power generator/storage (solar cell, capacitor or rechargeable battery) thus reducing both their foot print and cost. Of the charge present in the colored state (or the first optical state), in one embodiment a minimum electrical charge of 20% is recovered while bleaching, in another embodiment 40% or more, and in yet another embodiment 60% or more of the charge is recovered when the device is transformed to the bleached (or the second optical state). When this charge is recovered from an EC device, the potential across the two electrodes continues to decrease (see Example 10), and in most cases it is difficult to recover 100% of the charge as the voltage drop across the two terminals becomes too small and/or may take too long a time to drain this charge. Thus, in one embodiment the maximum charge recovered is less than 80% of what is present in the colored state (first optical state) and in another embodiment it is less than 65%. The value of 100% charge contained in the device is measured by coloring the device to the darkest state and then electrically shorting the two electrodes and determining the amount of charge passed (or integrating the charge passed from one electrode to the other) until equilibrium is reached, i.e., the charge decays to zero. Even for wired devices, the charge recovery is an important aspect, where the recovered charge may be converted to power to feed back to the building electric system for other uses or to feed to the grid.

Since the optical state of an EC device may be varied over a wide range as desired by the user for calculating the 100% charge value, the colored state is taken as the darkest optical state which the device (or EC panel) is configured to achieve, which means that the two opposing electrodes of the EC device will have the largest difference in potential or highest energy contained in the system when the device is darkest. The bleached state for the purpose of determining the charge recovery is that optical state which is achieved when the two opposing terminals in an electrochromic device are electrically shorted and the equilibrium optical state is reached, i.e., there is no potential difference between the two electrodes. For some electrochromic devices this may be the clearest or the most bleached state while for some this may not represent only an intermediate state of clarity, because to get to the clearest state a reverse potential may have to be applied. Regardless the 100% charge is calculated by shorting the device.

Regardless of the type of the EC device the charge recovery percentages refer to the electrical energy contained in the darkest optical state that the device is configured to achieve as compared to that bleached state which is achieved by shorting the two opposing electrodes. For the EC device shown in Example 10, the potential difference between the opposing electrodes increases with increasing depth of coloration and the lowest potential difference also corresponds to a completely bleached state. That is when the two electrodes are shorted then the device bleaches completely. The highest potential difference and the coloration achieved is limited by the damage threshold of the device, and typically this is capped off depending on the device construction, and the materials used for the electrodes and the electrolytes, etc.

When rechargeable batteries are used, their role are to be limited to a backup mode only, i.e., they are to be used when no other power source is available, rather than use them as a power source each time the window is colored this helps to enhance the battery life. Some designs, configurations, and materials are applicable to different situations. For example, in a configuration having a high cyclic durability, such as EC windows for such use (typically 20,000 to 100,000 cycles), this may far exceed the cyclic durability of the currently available rechargeable batteries (typically 1,000 to about 5,000 cycles). Designers will determine the most compatible configurations for each application.

Since the windows in a system embodiment may be powered wirelessly, i.e., by a combination of solar cell and or a combination of solar cell and a battery, the solar cells are to be small, and it is desired that when such cells are mounted in the window frame, their area are to be less than about 100 sq. cm for every square meter of the window area (i.e., not exceeding about 1% of the window area when the solar cells are mounted on the frame). This size is easily accommodated in window frames without them being too aesthetically dominant. When part of the electronics involves a backup battery, or a supercapacitor, the battery or the supercapacitor mounted in the window frame are to be capable of functioning in about a temperature range of at least 0 to 50° C. in a system embodiment, at least −20 to 70° C. in another embodiment and at least −40 to 85° C. in yet another embodiment. Further, those batteries which output the voltages close to the requirements of the driving voltage of the EC devices are preferred but not necessary. This reduces power losses due to voltage conversion in charging them by stepping up the potential and power losses when down-stepping the potential to power the EC devices may be minimized. In a system embodiment batteries output voltage are to be within +100% of the nominal voltage to power the EC devices. For example, if the EC device is nominally powered at 1.2V, then a battery output voltage according to this will have an output potential of about 1.2V to 2.4V. In another embodiment batteries output voltage are to be within +50% of the nominal voltage to power the EC devices. The above is only based on nominal voltage because EC powering voltage may be varied to get different depths of coloration. Nominal voltage is obtained by powering EC devices that changes its transmission from bleached state to the colored state by a factor of 10 as measured at 550 nm. Higher voltage batteries are only to be used in situations where battery size becomes important, as the size gets smaller with increasing output voltage for an equivalent power capacity.

For example, nickel metal hydride batteries may satisfy a desired chemistry due to their safety, low-cost, stability in extreme temperature range and long life (e.g., 5 years or longer or even 10 years or longer, e.g., battery BK-1100FHU, BK-210AH and BK-250SCH from Panasonic). Although other type of rechargeable batteries such as lithium ion, zinc-air, Ni—Cd, etc., may also be used.

The battery and the solar cells are sized so that the windows are generally powered by only the solar cells, and the battery is only used as a backup nm de so that its long life is preserved. Only a part of the battery capacity (typically less than about 50% under most scenarios) is discharged before it is recharged. The battery is also recharged by the solar cell, when the solar cell is not powering the window. In a system embodiment, the battery capacity is typically sized to deliver about 3 times or more the daily requirements to power the window once, and in another embodiment, it is sized about 10 times or more the daily requirement. In another embodiment, the power source further consists of a capacitor that is powered by the solar cell and is used as a power source to power the window, and any additional power generated by the solar cell goes to recharge the battery. In the event that the capacitor is not fully charged, the battery may supply the power, i.e., it primarily acts as a back-up power source. The power source is not only used to power the optical change of the windows but also for any wireless communication modules present in the windows.

Windows which are wired together in a building structure (e.g., a skylight, roof, or windows for a particular room, or a building façade) may be temporarily connected in "electric series" to amplify the voltage so as to eke out more recoverable charge.

FIG. 17 illustrates a smart window control according to a system embodiment for control of a window as in FIG. 16 and illustrates the integration and operation of the EC device and controller/power generator sub-system. In FIG. 16, a smart window 900 that includes the EC device 910 and the power generator 930 as a solar cell is shown. The frame 920 may include multiple solar cells. These solar cells may face in different directions, e.g., a system solar cell may face inside the building and a system outside to generate electric power both from the illumination outside of the building and also from the inside. Other type of energy harvesting systems other than the solar cells which could be used are thermoelectric devices capitalizing on the temperature differences between the indoor and the outdoor surfaces of the window or between the window panes, piezoelectric devices converting deformation on windows to electricity caused by wind; or RF antenna and circuitry to harvest energy from RF electromagnetic waves. In case the harvester is an AC type device then rectifiers and appropriate circuitry will likely be incorporated from AC to DC conversion.

FIG. 17 illustrates the control system corresponding to power generator 930, having input voltage 1022 to DC-DC converter 1014. The system 930 also includes a rechargeable battery backup 1016, temporary power storage 1018, and controller 1026, which manages operation of the system 930. The temporary power storage 1018 responds to controller 1026 and is coupled to recharge unit 1021, to receive Vg, and a DCX-IC converter 1019, providing output voltage 1012.

As illustrated in FIG. 17, a high-level block diagram of the power controller system 930 comprising of several functions, the input voltage, $V_{in}$, is the voltage generated by the solar cell or any other harvesting circuitry 820 (FIG. 18). The DC-to-DC converters either up-convert or down-convert voltages between the two different stages of the device. In a system embodiment, the changes are: 1) from 1020 to the power storage unit (backup rechargeable battery or a temporary power storage unit such as a capacitor or a supercapacitor); 2) from the power storage unit to the EC device 1010; and 3) in case the EC device during bleach is used to recharge the backup or the temporary storage. The controller 1026, which is a part of the system, coordinates these actions and communicates with the wireless communication present in system. The control system 930 may be in any area around the perimeter of the window and may be wired or wireless. The value of the output voltage 1012, $V_{out}$, may be regulated to depend on the outdoor temperature and the desired degree of coloration incorporated in the colored state.

The system may also determine the state of coloration of the EC device without integrating an optical sensor by reading the open circuit potential of the EC cell and inputting this in the controller. In case there is a change in this potential over time (due to self-discharge of some of the stored charge in the device with concomitant loss of coloration), the EC window could be powered periodically to bring the state of coloration to the desired value.

As discussed earlier once the optical density (OD) changes (reduces) by a certain amount the coloring voltage could be reapplied. Thus one can pick an arbitrary value of open circuit potential change or use the 20% relative transmission change discussed earlier. The 20% transmission change can be converted to the change in OD relative to the open circuit coloring achieved immediately after coloration to a desired optical state The change in OD may be estimated from the change in the open circuit potential of the cells as above, or it may be also pre-programmed in the lookup table related to the various coloration potentials used.

Furthermore, the user may control the window in different ways: i) manual control to transition the color to desired shade/transparency wherein the manual switch is hard-wired to the window, ii) wireless control using computing or mobile devices by manually dialing-in the desired shade/transmission, iii) automatic control through cloud control as programmed by the user, home automation services, or other entities, and iv) triggered by another event such as turning on/off and audio/visual device or an alarm system, such as a wake-up alarm). For instance, each window may be mapped to the sun exposure timing, outdoor luminosity (which may change due to cloud cover) and outdoor temperature to automatically select the EC device state to optimize and balance between the comfort and or energy efficiency. More details on this is provided in the priority documents included by reference herein.

The state of coloration of a variable transmission window that utilizes EC panels may be electrically checked by checking the potential between the two opposing conductive coatings (transparent conductors) that make up the EC device. This helps with positively identifying the state so that appropriate command may be applied from the control system to change its state. Knowing the state helps to calculate the energy being saved by keeping the window in that state which is helpful in monitoring the economic impact of these windows. A system may adopt this idea for a subscription model to reduce the impact of capital cost on the installation of such systems. In this case the installation company pays for the installation or a portion thereof and collects part of the energy savings and any other optional premiums such as for maintenance as monthly payments.

To ascertain proper functioning of EC devices, a system may monitor their I-V (current-potential) characteristics and corrected for panel temperature conditions. When powering is done using a voltage-time profile, a system may monitor the current consumption. Too small of a current (as compared to a nominal initial value) may indicate a resistance developing and the panels may not be coloring deep and/or fast enough, and too much of a current may indicate a short which may also lead to panels not coloring deep or may color non-uniformly. For an EC or a PV panel, the electrical characteristics may be sensed and monitored remotely by a company responsible for their maintenance, and if a panel malfunctions a technician may be dispatched who could service and replace the appropriate panels. If an EC cell develops strong cosmetic defects then it also is to be replaced, but usually the electrical characteristics are easier to monitor remotely contain signals when the EC panels do not function properly. In addition to the electrical characteristics a system could also take images of the panel (or windows) at frequent intervals and compare them with previously taken images (optical monitoring) to check for any visual impairment and notifying the service provider once unacceptable damage is observed. This is done using camera located inside the building, the activity of which may be combined with or coordinated by the variable transmission EC control system For field installed EC panels, it is desirable that a thermistor, a capacitor or any other temperature sensor is placed (printed or bonded) on the surface and near a system corner or in two or more positions which are at diagonally opposite corners to measure temperature of the panel. This may be placed on surfaces indicated by arrow 1 or arrow 2 (See FIGS. 12 and 13). Multiple positions of the sensor may be incorporated in case part of the panel is shaded and may be at a different temperature. These may be wireless sensors and may derive power from a solar cell integrated with them, via RF powering, or use of thermo-electric convertors. The electrical driving of the EC panel (i.e., driving parameters—voltage, current profile, etc.) may be carried out corresponding to an average temperature obtained if multiple sensors are used. In an embodiment, temperature for which the driving parameters are used are those established for the highest temperature reading that is obtained from the panel, the highest temperature being recorded by any of the sensors on that panel, so that no part of the panel is damaged by aggressive driving conditions. For large installations where several EC panels face the same direction, a system may employ the temperature sensors only on some of the panels to get an estimate of an average temperature profile, and again electrical driving of the EC panel may be carried out at an average temperature, but the driving be done under the conditions established for the highest temperature being experienced at that time. In case the highest temperature exceeds a point (safe temperature) where any electrical driving will damage the EC panels, then the panel is simply maintained in that state (in an open circuit mode), wherein no electrical impulses are applied, or no electrical driving is done until the temperature reaches or drops to within safe limits.

For these considerations tables and charts (lookup tables and charts) are developed for the EC panels' performance which considers their construction, their size, temperature, and voltage/current profiles and establishes not to exceed values, e.g., potentials, total charge to reach the steady state current value, peak current, steady state current, time to reach steady state current, temperature, and so forth. These values may then be used to determine if an EC panel has failed, and servicing may be as illustrated in FIG. 7, a decision flow chart for EC panels to self-identify a need for servicing. This also provides troubleshooting to see of the problem is caused by shorts in the busbar and/or the circuitry and address them appropriately.

Integrated Glass Units and Solar Cells

The solar cells in a building may be integrated in several ways. Since these windows consume low power, tiny solar cells may be integrated with window frames that provide limited energy only for changing the state of windows and provide a retrofit solution for buildings which do not have wiring in the window area. A system may also mount the solar cells on the window frames that face the interior of the building. These could convert the illumination available inside the room or the building to trickle charge the battery even when it is dark outside. This solution works well for smaller installations such as residential and businesses where there are isolated windows or smaller installations.

A system may integrate the solar cells and the variable transmission windows in a different way in buildings with larger glass installations, such as large atria, towers, and so forth.). Solar cells provide power to change the transmission of the windows and to supplement power used by the building for other functions to reduce its environmental footprint. For buildings with predominantly glass exteriors, the EC elements are typically located only in the view (vision) area, and may be even be limited to windows or window areas that are within the visual reach of the occupants, the height may be any depending on the size of the room or enclosure, typically an average height of a building floor is about 4 meters, of which about 60 to 70% is the vision area and the rest goes in ceilings, floors and duct work. From outside, the latter region (30 to 40%) between each floor is covered by a spandrel. The façade panels and spandrel areas may contain solar cells located behind a glass sheet. These solar panels may be completely opaque, wherein the light falling on these is harvested to provide maximum electrical power. The opaque panels used in the spandrel or any non-transparent areas have a higher efficiency in converting light to energy (e.g., it is desired for these opaque panels to use photovoltaic (PV) panels with an efficiency of 10% or greater as measured under standard conditions, e.g. using methods suggested by International Electrotechnical Commission (IEC), IEC 61853-1, 2011 Ed-1-Photovoltaic module performance testing and energy rating). The solar cell panels allowing partial light transmission if used in the transparent areas of the window have less than 10% efficiency. This is because part of the light passes through these panels is not harvested.

Partial light transmission panels are created in one of two ways. In the first method, it is done by using opaque solar cells as described earlier, but they are placed in a pattern where part of the area is covered by them and part of the area is transparent giving an appearance of a mesh. Typically, when this is done using a panel which has a series or a line of opaque solar cells covering a width of about 5 mm or less along with a clear spacing between these lines which is about 10 mm or more in width, for example see PV-IGU-150 from Solaria (Freemont, Calif.). The patterns are typically opaque solar cells arranged in a lines or mesh. Another way is using thin film solar cells (such as those based on amorphous silicon) where the solar cell stack has a certain transparency. Due to high cost and increased complexity, the thin film solar cells are generally not combined with variable transmission panels and may be used by themselves in those areas of the buildings where variable transmission may not be incorporated but it is still desired to allow some sunlight in, such as in stairwells, transoms, and so forth. Example of solar cells integrated with glass may be found at Solaria Corporation (Freemont, Calif.) and at Onyx Solar (New York, N.Y.).

An example of integration of EC panels and solar cells in a multi-storied building with predominantly glass exterior is shown schematically in FIG. 11. This shows a four-storied building with predominantly glass exterior. The vision area is the clear window area for that floor and the spandrel area is what hides the floors, ceilings, ducts, utilities, and so forth, between the floors. The façade may be glass or concrete or any other type of construction material. A system may use EC devices for the vision area or/and on the doors. The solar cells may be deployed in the spandrel area or even in the façade if that is made of glass.

FIGS. 11 and 13 describe the use of solar cells in the spandrel/façade area. Since these areas are opaque, wherein solar panels are designed to harvest maximum amount of sunlight to convert that to the electrical power. The panels comprising solar cells are constructed in an IGU type of format as shown in this example using glass sheet 550 and 562. With a gap 560. In some embodiments, at least one of the surfaces 2 or 3 is coated with a low-e coating. The gap is about the same as for the IGU unit with an EC panel described above. Generally solar cells are prefabricated and placed between two plastic films (details not shown in the figure) and then laminated using glass sheets 562a and 562b. It is desirable to have the total thickness of this IGU to be similar to that of the EC IGU for ease of installation and more uniform appearance. When the solar cells are used in the opaque areas such as spandrel; these may be packed densely so that most of the light hitting these panels is employed to generate power.

The crystalline solar cell panels are high efficiency, long lasting and if packed densely will be opaque towards light transmission (e.g., see PowerSpandrel-350 from Solaria As mentioned, above glass panel 562b may have some reflective properties (similar to EC IGUs) so that the appearance of the glass from outside looks similar in both the vision area and the spandrel. However, use of colored or partially reflective glass cuts down on the light being harvested by the solar cells, and thus the power produced is lowered. In case the building design allows a system to have different exterior appearance for the spandrel and the vision areas, it is best to have a highly light transmissive glass for 562b. Typically these are low iron glasses so that absorption of light is low. Some examples of low iron glasses are Starphire™ from PPG (Pittsburgh, Pa.) and Optiwhite™ from Pilkington (St. Helens, UK). The iron oxide content in low iron glasses is typically lower than about 0.02%.

The thickness for 512a and 512b in the EC panel (FIG. 12) could be similar to the thickness 562a and 562b (e.g., 3.2 mm or more so that these may be strengthened or tempered). In a system embodiment thickness of 502 (FIG. 12) is the same as 550 of FIG. 13.

EXAMPLES

Example 1

Tungsten oxide containing lithium oxide was deposited by dip coating from a solution on a TEC15 substrate (obtained from Nippon Sheet Glass, Toledo, Ohio). The substrate size was 9.4 cm×13.3 cm. The procedure to deposit tungsten oxide coating is described in U.S. Pat. No. 6,373,618 (Example 1). The thickness of the finished coating was about 400 nm. A SICL coating of poystyrenesulfonate (PSSNa, molecular weight 1 million) was deposited by spin coating from a 50:50 (by volume) water:ethanol solution containing 3.5% by weight of the polymer. The coated substrate was heated to 110° C. for 2 hours to drive off the solvent. The coating thickness was about 500 nm.

The tungsten oxide and the SICL coatings were then etched from the perimeter area (about 5 mm in width from three sides and about 10 mm width on one of the long sides) of the substrate. A cell was fabricated by dispensing an epoxy around the perimeter of one of the substrates. This epoxy contained 300 micrometer (diameter) spherical glass beads. The epoxy was dispensed on the etched area. The second TEC 15 substrate was lowered onto the first substrate while providing an offset of about 5 mm along one of the long edges. This substrate had two 1.6 mm diameter holes along its diagonal about 10 mm away from these corners. Care was taken that the epoxy touched the tungsten oxide coated substrate in the etched area. The spacers provided a separation of 300 micrometers between the two substrates, which would be the thickness of the electrolyte.

The epoxy was cured at elevated temperature to yield an empty cavity. The cavity was filled with an electrolyte by injecting through one of the holes on the cell substrate. The electrolyte was made using a plasticizer containing 80% propylene carbonate and 20% 1-Butyl-3-Methyl Pyrrolidinium bis(trifluoromethanesulfonyl)imide (BMP). To this was added 1 wt % water, 0.025M $LiN(SO_2CF_3)_2$ (LiNTF) 0.025M ferrocene and 2 wt % of Solef 31508 (obtained from Solvay, Princeton, N.J.). The holes were then sealed with Teflon plugs followed by glass cover slides which were bonded by a UV curable adhesive and a silane. A spring clip busbar was attached to each of the two substrates along the long edge of the device to make electrical connections. The active area of the device was about 12 cm×7.6 cm.

A potential of 1.3V was applied (with the EC coating as negative) to color the cell. The cell colored from 71.5% to 10.1% at 550 nm. When the cell was left in the open circuit in the colored state. Its transmission changed from 10.1 to 11.2 in 18 hours. After coloration when the cell was shorted, it had bleached completely when observed after 20 minutes.

Example 2

A cell was made as in Example 1 using smaller substrates with an active area of 36 sq. cm of about a square shaped and instead of an epoxy seal, the spacing was determined by a polyimide tape and the substrates were held together by a clamp, however, rather than ferrocene, the electrolyte contained in similar molarity 2,2,6,6-Tetramethyl-1-piperidinyloxy (TEMPO).

The cell colored at 1.5V from 78.4% to 14.5% at 550 nm in five minutes. Another cell which was identical but with having no SICL layer, or no PSSNA layer, and no water added to the electrolyte, the cell changed from 80% to 22.1% under similar conditions. In another cell without SICL layer but with water in the electrolyte a change from 80.5 to 21.1% was seen after 5 minutes of applying 1.7V and for the same cell the transmission at 550 nm was 10.4% after 5 minutes at 2V. In yet another cell, TEMPO was replaced by 4-Hydroxy TEMPO benzoate and contained water in the electrolyte (cell without SICL layer). This cell changed from 78.6% to 23.1% at 550 nm at 1.5V.

Example 3

A cell was made as in Example 2; however, the electrolyte contained a donor-acceptor dye with a ferrocene-viologen structure rather than ferrocene and the electrolyte also had 1% added water. The Dye was 4,4'-Bipyridinium, 1-(4-ferrocenylbutyl)-1'-methyl-, salt with NTF anion.

The cell colored at 1.3V from 77.2% to 8.8% at 550 nm in five minutes. After coloration when the cell was shorted, it had bleached completely when observed after 20 minutes. A similar cell was made with no water in the electrolyte and it colored to 23.7% under similar conditions.

Example 4

92) A cell was made as in Example 3, however, the SICL layer was a 200 nm thick $LiAlF_4$. The $LiAlF_4$ layer was deposited by thermal evaporation. This was da system on an Angstrom EvoVac deposition system. The deposition of $LiAlF_4$ was achieved by using two precursors LiF (Alfa Aesar, 99.5%) and $AlF_3$ (Alfa Aesar, 99.5%). These precursors were individually loaded into tantalum evaporation boats. The deposition rates for LiF and $AlF_3$ were set to 0.6 Å/s and 1.4 Å/s, respectively. The electrolyte contained water, the donor accepter dye was the same and in similar concentration as in the earlier example, and the Solef content was 4 wt %.

The cell colored at 1.3V from 71.7% to 15.6% at 550 nm in ten minutes. The device consumed 20.7 $mC/cm^2$ (active area) in 10 minutes. A similar cell was made but without water in the electrolyte, this colored from 72% to 11.7% in 10 minutes under similar conditions, the peak current for the device was 4.6 mA.

Example 5

A cell was made as in Example 2, however, the electrolyte contained ferrocene and the EC coating further contained molybdenum oxide (along with tungsten oxide and lithium oxide). The atomic ratio of Mo:W was 1:10. The cell colored at 1.3V from 71.7% to 5.4% at 550 nm in about a minute. When shorted, the cell bleached in about 10 minutes. After coloration when the cell was left in the open circuit mode it bleached in 17 hours to about 19.5%, at 550 nm.

Example 6

A cell was made as in Example 4, but the electrolyte did not contain any water. This cell colored to 11.6% at 550 nm at 1.3V.

Example 7

A cell was made as in Example 2; however, TEMPO was replaced with 0.05M of LiI. The cell colored from 78% to 29.9% at 550 nm when powered using 1.3V for 10 minutes. It bleached completely when a potential of −0.7V was applied for 510 s. Another cell was made with similar electrolyte composition but with no added water. The cell performed like the one with water with the bleach time extended to about 654 s.

Example 8

A cell cavity was made as in Example 4, however, the redox in the electrolyte was similar to in Example 7. The electrolyte had no water and had 0.1 M LiI and 0.1 M polyvinyl pyrrolidone (PVP). PVP was K17 obtained from BASF (Florham Park, N.J.), and the molarity was calculated based on the molecular weight of the monomer. The cell colored from 79% to 39.7% at 550 nm when powered using 1.3V for 5 minutes. The cell bleached completely when a reverse potential of 0.7V was applied for 746 s.

Example 9

A cell was made as in Example 1, where the SICL layer was a 150 nm thick $LiAlF_4$ composition and was deposited as described in Example 4. The thickness of the EC coating was 450 nm and the electrolyte contained the donor-acceptor dye (as described in Example 3) instead of ferrocene. Further the electrolyte had 4 wt % of the Solef polymer and did not contain added water.

The cell colored from 76.1% to 6.8% at 550 nm when powered using 1.3V in 5 minutes and bleached completely at −0.5V in 12 minutes at room temperature, when the cell was left in the open circuit mode at 80 C its transmission changed to 16.6%. The cell was cycled at room temperature for 53 cycles (1.3V to color for 300 s and −0.5V to bleach for 1,000 s) followed by 105 cycles at 80° C. (1.3V to color for 120 s and −0.5V to bleach at 480 s). The transmission of the cell in the colored and the bleached state and kinetics when tested at room temperature after cycling was unchanged as compared to before cycling.

Example 10

A cell was made as in Example 1, with a few differences. The thickness of the EC coating was 450 nm and the electrolyte contained the donor-acceptor dye (as described in Example 3) instead of ferrocene and had 4 wt % of Solef polymer.

The cell colored from 76.9 to 6.2% at 550 nm when powered using 1.3V and bleached in 430 s when shorted. In another experiment using the same cell, the coloration voltage of 1.3 was applied for predetermined times and the cell transmission, charge consumed, and the open circuit potential was recorded. The same was done when the cell was bleached by shorting in steps and almost identical amount of total charge was recovered. The transmission data while coloring was converted to optical density using the bleached state transmission as 100%. The integrated charge after each step. When optical density was plotted as a function of integrated charge a linear curve was obtained (see FIG. 19 which provides an example of the cell potential and optical density as a function of charge). Data is compiled in Table 1.

TABLE 1

| Color Time, 1.3 V (sec) | % T at 550 nm | Optical Density at 550 nm | Open Circuit Potential (v) | Cumulative charge (mC/cm$^2$) | % Charge |
|---|---|---|---|---|---|
| 0 | 77 | 0.00 | 0 | 0.0 | 0% |
| 15 | 45.5 | 0.23 | 0.72 | 7.8 | 26% |
| 30 | 30.1 | 0.41 | 0.88 | 12.3 | 42% |
| 60 | 18.2 | 0.63 | 1.02 | 17.8 | 60% |
| 120 | 10.9 | 0.85 | 1.15 | 23.3 | 79% |
| 180 | 8.3 | 0.97 | 1.21 | 26.2 | 89% |
| 300 | 6.2 | 1.09 | 1.27 | 29.5 | 100% |

The cell was colored to 6.9% and left in an open circuit mode in the colored state. The cell bleached to 7.4% after 30 minutes at room temperature, as seen this change was less than 2%, wherein the colored transmission after 30 minutes was lower than, within, 8.9% (6.9%+2%) after 30 minutes. The amount of charge leaked causing this change was estimated from the change in optical density in FIG. 8. The average leakage current in the above period to cause this change in optical density, or transmission, was estimated as 0.70 μA/cm$^2$.

Example 11

An example of a custom surface modification of single walled carbon nanotubes with ferrocene carboxylic, incorporates a Single Walled Carbon Nanotube structure (SW-CNT) obtained from "Cheap Tubes" (Grafton, Vt.). The characteristics of the SWCNT are provided in Table 2.

TABLE 2

| Purity | 99% |
|---|---|
| Outer diameter | 1-4 nm |
| Length | 3-30 microns |
| Surface modified | —NH$_2$ Primary amine |
| Functionality | N—H, O═C—N—H |

These SWCNT's were further surface modified to attach an anodic ferrocene dye by reacting the primary amine with ferrocene carboxylic acid. To a 200 ml round bottom flask fitted with a stir bar and condenser was added 60 ml of propylene carbonate (Ferro Corporation, Baton Rouge, La.) and 233 mg of ferrocene carboxylic acid (Sigma Aldrich, Chemical Company Milwaukee, Wis.). This mixture was heated to 80° C. to form a complete solution.

To a 50 ml beaker were added 50 mg of SWCNT and 17 ml of propylene carbonate and dispersed using an ultrasonic probe at a power output of 64 W for 5 minutes with a cycle time of 5 second on and 5 seconds off. The dispersed SWCNT's were added to the dissolved ferrocene carboxylic acid solution and stirred at 80° C. for 2 hours to form the salt. The mixture was then heated to 120° C. for 24 hours to form the amide with the liberation of water. Cooled to room temperature and filtered through a 0.45-micron nylon filter and washed sequentially with 50 mls each of propylene carbonate, ethanol, and acetone and dried in a vacuum oven at 60° C. for 5 hours. Weight of product was 91.1 mg corresponding to a loading of 18 wt % ferrocene carboxylic acid on the SWCNT's.

Example 12

An example of a modification of a single walled carbon tube structure with ferrocene carboxaldehyde, incorporates SWCNTs obtained from "Cheap Tubes," as described in Example 11 hereinabove, and reacted with ferrocene carboxaldehyde (Sigma Aldrich, Chemical Company Milwaukee, Wis.) as follows. To a 125 ml round bottom flask was added 60 mls of anhydrous ethanol and 420 mg of ferrocene carboxaldehyde. The mixture was stirred at room temperature to form a complete solution. To this was added 63.3 mg of SWCNT and using an ultrasonic probe at a power output of 80 W for 5 minutes with a cycle time of 5 second on and 5 seconds off to disperse the carbon nanoparticles. The dispersion was stirred for one hour at 25° C. and 410 mg of sodium cyanoborohydride (Sigma Aldrich) added and the dispersion stirred for 24 hours at room temperature. The dispersion was filtered through a 0.45 micron nylon filter and washed sequentially with 100 mls each of deionized water and ethanol and dried in a vacuum oven at 60° C. for overnight. Weight of product was 74 mg corresponding to a loading of 17 wt % ferrocene on the SWCNT's. IR analysis of the product showed the characteristic absorption peaks for ferrocene at 1405, 1060, 814 and 480 $cm^{-1}$.

Example 13

For preparation of electrolyte film containing ferrocene modified SWCNTs, a solid black electrolyte material was prepared as follows: 3.36 g of polyurethane PUL446-107 (obtained from Huntsman, The Woodlands, Tex.) was added to a flask and 33.6 mls of anhydrous tetrahydrofuran (THF). This was stirred at 60° C. for two hours to form a clear colorless solution. 0.784 ml of the ionic liquid, 1-butyl, 1-methylpyrrolidinium bis(trifluoromethanesulfonyl)imide (Iolitec, Germany), 3.136 ml of propylene carbonate (Sigma Aldrich) and 0.0306 g of lithium trifluoromethanesulfonate (Sigma Aldrich) were added and the mixture stirred 15 minutes. To this was added 1.6 mg of the ferrocene modified SWCNT' as described in Example 1 above. This was sonicated using an ultrasonic probe at a power output of 68 W with a cycle time of 5 second on and 5 seconds off in four 15-minute intervals with cooling between each interval. To remove the THF, the solution was heated under vacuum in a three-step process as follows; the solution was first heated to 65° C. for 30 minutes followed by 75° C. for one hour and finally 95° C. for 2 hours. This produced a black rubbery solid material.

Example 14

Preparation of an electrolyte film without modified SWCNTs includes preparation of a slightly opaque solid electrolyte, as described in Example 13 hereinabove, with the difference that no ferrocene modified SWCNT's were added and no sonication was used. The solid electrolyte was placed on a sheet of polyester on a heated hot block at 125°. Once it was softened, 300-micron spacer beads (Novum Glass LLC, Rolla, Mo.) were sprinkled on top. Another sheet of polyester was placed on top and using a pressure roller the material was spread out into 300 microns thick. Cooled to room temperature and the polyester sheets could be removed to give a clear colorless free-standing film.

Example 15

Preparation of an EC cell using a combination of solid electrolytes prepares an electrochromic window using a combination of the electrolytes prepared in Examples 13 and 14 hereinabove. The EC window was composed of TEC 15 glass with a 360 nm coating of lithium oxide doped tungsten oxide (EC layer) prepared as described in U.S. Pat. Nos. 5,216,536 and 6,266,177, laminated to another piece of TEC15 glass using a bilayer of 300 microns of the clear electrolyte (Example 14) and 60 microns of electrolyte containing the ferrocene modified SWCNT's (Example 13). Another way to form a multilayer film first with the electrolyte and the dye containing layer (ferrocene containing layer) prior to their lamination with the substrates. Schematics of such a device structure is illustrated in FIG. 19.

The EC window was prepared by first placing 0.5 g of the solid black electrolyte containing the ferrocene modified SWCNT's on the TEC 15 substrate and heating to 125° C. Once the electrolyte was softened it was pressure rolled into a 60-micron film using a stainless steel draw down rod. This film was thin enough that it appeared clear when placed on top of the TEC 15. A polyester protective sheet was placed on top and on top of this a second heating block at 125° C. This sandwich was kept at temperature for IS minutes and then cooled to room temperature. The top polyester sheet was removed by pulling, exposing the electrolyte on the TEC 15 substrate. A sheet of the electrolyte prepared in example 4 was cut to the same size as the electrolyte on the TEC 15 substrate and placed on top of it. This was placed on the hot block at 125° C. with the electrolyte side facing up. The lithium oxide doped tungsten oxide coated TEC 15 substrate was placed slightly offset on top of the electrolyte with the tungsten oxide side facing the electrolyte. A second heat block at 125° C. was placed on top and the two substrates were laminated by the two electrolytic layers (on of which had the ferrocene dye). The laminate was kept at 125 C for 30 minutes under pressure. The system could cool to room temperature and metallic clip on busbars were applied to each electrode.

The cell was colored at 2.5 volts (negative to the tungsten oxide electrode) and at 550 nm the cell went from an initial % transmission of 68 to 14 in 25 minutes. Applying a reverse potential of −1.3 volts the cell went from 14% T to 68% T in 8 minutes.

One method of construction conventional EC devices is by using a single substrate and depositing the layers on top of each other and reducing some of the layers by intercalating them with lithium until the device is complete. The significant disadvantage is the cost, too many layers (steps), slow processes and use of very expensive equipment. Another disadvantage is low yield as any imperfection will result in an electrical short, as the process involves many steps, and it is not known if the device is functional until the very end of the process. Since there is only a fixed number of lithium ions which go back and forth, with aging the reversibility decreases and increasingly sophisticated changes to drivers are needed to ensure good performance, which results in high electronics cost.

In another type of conventional construction was shown in FIG. 1. In this example, the EC device starts with two transparent substrates (glass or plastic) and each is coated with a TC layer(s). Optionally, one or both substrates may be pre-coated with TC layer(s). The advantage of these types of devices is lower capital cost, both substrates may be pre-coated with inexpensive transparent conductors and since the two substrates are processed independently until they are combined with an electrolyte, thus overall such devices end up being lower in cost as compared to thin film device.

After application of the TC coating, the process applies an EC layer to only one of the substrates. A counter electrode layer is applied to the other substrate. The process then reduces a system of the layers on the substrates. Reduction may be done chemically, or electrochemically by intercalating lithium ions. With the coatings facing each other (facing inwards) these substrates are assembled with a spaced apart parallel gap; the parallel gap is either filled with a polymeric electrolyte or the substrates are laminated together using a sheet of a polymeric electrolyte. The perimeter is sealed, allowing places for placement of busbars and electrical connections to the conducting portions of the smart window.

The second type of device although lower cost as compared to the first type still uses expensive processing steps such as Coatings required on both substrates in addition to the transparent conductors, and most importantly requiring a reduction of one of the layers (intercalation of lithium ions) which has to be done under highly inert conditions and is a costly step requiring extra materials and significant time. These devices also require expensive electronics to combat aging due to limited number of lithium ions in the system.

Applications of the present invention include as use for privacy to prevent viewing between areas, including reducing visibility into a building or room. These may be used in any situation where it is desirable to control light and/or heat energy passing through a window or substrate. This may apply to hospital and medical procedure areas, such as to avoid the use of blinds which get contaminated easily and are difficult to clean. Additionally, there are industrial uses for protecting light or heat-sensitive systems during manufacture. These also have application to electronic device screens, where it is desired to respond to environmental conditions and reduce glare or other effects to make the viewing experience easy, comfortable and enjoyable. This may apply to projection screens and displays.

The present invention blocks damaging UV rays, reduces glare and eye strain. These are environmentally friendly methods and apparatuses having high durability and stability over a range of conditions. This is may be measured as coloration cycles.

These applications benefit from the present invention by providing fast, efficient privacy control over a range of transparency values. They provide ways to efficiently use space inside a building by creating privacy areas, or virtual offices/cubicles.

These applications provide a comfortable work or home environment by creating private work spaces, such as are felt in large open offices. They reduce fading of the internal elements, such as carpets, furniture, and so forth.

The present invention provides low energy control of a smart window. The foregoing description of the invention has been presented for purposes of illustration and description and is not intended to be exhaustive or to limit the invention to the precise form disclosed, and obviously, many modifications and variations are possible considering the above teaching. The embodiments were chosen and described to best explain the principles of the invention and its practical application to thereby enable others skilled in the art to best utilize the invention in various embodiments and with various modifications as are suited to the use contemplated. It is intended that the scope of the invention be defined by the claims appended hereto.

Various embodiments are described herein for an electrochromic device for use in a window or other structure. The device configures multiple layers between substrates, wherein the configuration incorporates an ion isolation mechanism. In some embodiments, this mechanism is an SICL configured to prevent transport of dye ions from an electrolyte layer to the electrochromic layer. Another mechanism is the use of nanoparticles in a dye-containing layer or portion of the electrolyte; the dye ions tether to the nanoparticles and prevent the dye ions from transporting to the electrochromic layer. A low coloration potential across multiple layers of the electrochromic device initiates a redox reaction in the electrochromic layer and the dye containing layer, wherein ions in the electrochromic layer are reduced or oxidized and dye ions are oxidized or reduces, respectively. The redox reactions change the coloration state of the electrochromic device. Once ions are oxidized/reduced, they maintain that state as the dye ions are isolated from the electrochromic layer.

In some embodiments, an electrochromic device is incorporated into an integrated glass unit. A control system may be incorporated to provide control of the coloration state of an electrochromic device. The control system monitors status of the electrochromic device, such as to adjust the coloration potential, implement a coloration scheme, interface and react to energy harvesting and so forth.

The discussion, description, examples and embodiments presented within this disclosure are provided for clarity and understanding. A variety of materials and configurations are presented, but there are a variety of methods, configurations and materials that may be used to produce the same results.

What is claimed is:

1. An electrochromic device comprising a pair of electrodes separated by an electrolyte film
   (a) wherein at least one of the said electrodes comprises conductive carbon nanotubes in a concentration of less than 2% by weight and at least one redox material and
   (b) the said conductive carbon nanotubes have at least one of (i) metallic phase which is greater than 50% by weight and (ii) a free metal content which is less than 5% by weight.

2. An electrochromic device as in claim 1 wherein the carbon nanotubes are selected from the group of single walled carbon nanotubes, double walled carbon nanotubes or multi-walled carbon nanotubes, or mixtures thereof.

3. An electrochromic device as in claim 1, wherein the said redox material has electrochromic properties.

4. An electrochromic device as in claim 1, where the redox material is selected from at least one of organic, metal-organic and an inorganic material.

5. An electrochromic device as in claim 1 wherein the redox material is tethered within the said electrode.

6. An electrochromic device as in claim 1 wherein the electrode comprising conductive carbon nanotubes has a thickness between 1 to 500 μm.

7. A method to make an electrochromic device of claim 1, wherein each of the said electrodes is deposited on a pair of transparent substrates and the electrolyte film is laminated between the said substrates where the said electrodes contact the two sides of the electrolyte film.

8. A method to make an electrochromic device as in claim 7 where one of the electrodes comprises conductive carbon nanotubes and the other electrode is a coating of an electrochromic metal oxide.

9. A method to make an electrochromic device as in claim 7, wherein the transparent substrates are pre-coated with transparent electrically conductive coatings, and the said electrodes are deposited on the said transparent conductive coatings.

10. A method to make an electrochromic device of claim 1, wherein one of the conductive carbon nanotubes-containing electrodes is deposited on a first side of the electrolyte film to form a multilayered film and the said multilayered film is laminated between a pair of transparent substrates.

11. A method to make an electrochromic device as in claim 10 where the other electrode comprises an electrochromic metal oxide and is deposited on one of the transparent substrates prior to lamination and contacts the second side of the electrolyte film.

12. A method to make an electrochromic device of claim 1, wherein both of the electrodes are deposited on each of the two sides of the electrolyte film, and the so produced multilayered film is laminated between a pair of transparent substrates.

13. A method to make an electrochromic device of claim 12, wherein both of the electrodes contain conductive carbon nanotubes.

14. A window system containing the electrochromic device of claim 1 connected to a control system, wherein the control system is configured to recover at least 20% and less than 80% of the electrical energy contained in the said electrochromic device, when the device state is changed transitions from a darker or less light transmitting optical state to a more transparent optical state.

15. A method of making an electrochromic device containing an electrolyte film and a first electrode comprising both conductive nanoparticles and a redox material, comprising forming said electrolyte film, depositing the said electrode on a first side of the electrolyte film to form a multilayered film, and then laminating the multilayered film between a pair of transparent substrates.

16. A method to make an electrochromic device as in claim 15, wherein a second electrode is deposited on one of the transparent substrates prior to the lamination so that the second side of the electrolyte film contacts the second electrode.

17. A method to make an electrochromic device as in claim 15, wherein a second electrode comprising conductive particles and a redox material is deposited on the second side of the electrolyte film and then the multilayered film is laminated between a pair of transparent substrates.

18. A method to make an electrochromic device as in claim 15, wherein the transparent substrates are coated with transparent electrically conductive coatings prior to lamination.

19. A window system containing an electrochromic device connected to a control system, wherein the device transitions from a higher energy state represented by a less transmitting optical state to a lower energy state represented by a higher optical transmitting optical state; the said control system is configured to recover at least 20% and less than 80% of the electrical energy difference contained in the said states of the device, when the device transitions from a lower transmitting optical state to a higher transmitting optical state, wherein the said electrochromic device contains an electrode having carbon nanotubes.

20. A window system as in claim 19, wherein the electrochromic device comprises an electrode containing conductive nanoparticles and at least one redox material.

21. The electrochromic device of claim 1, having an optical haze of less than 2%.

* * * * *